United States Patent
Goel et al.

(10) Patent No.: US 9,330,495 B2
(45) Date of Patent: May 3, 2016

(54) EXTENDING DX11 GPU FOR PROGRAMMABLE VECTOR GRAPHICS

(71) Applicant: QUALCOMM Incorporated, San Diego, CA (US)

(72) Inventors: Vineet Goel, Winter Park, FL (US); Usame Ceylan, Orlando, FL (US)

(73) Assignee: QUALCOMM Incorporated, San Diego, CA (US)

(*) Notice: Subject to any disclaimer, the term of this patent is extended or adjusted under 35 U.S.C. 154(b) by 317 days.

(21) Appl. No.: 13/841,407

(22) Filed: Mar. 15, 2013

(65) Prior Publication Data

US 2014/0043342 A1 Feb. 13, 2014

Related U.S. Application Data

(60) Provisional application No. 61/681,498, filed on Aug. 9, 2012, provisional application No. 61/713,377, filed on Oct. 12, 2012, provisional application No. 61/723,274, filed on Nov. 6, 2012, provisional (Continued)

(51) Int. Cl.
| | |
|---|---|
| G06F 15/00 | (2006.01) |
| G06T 17/20 | (2006.01) |
| G06T 9/00 | (2006.01) |
| G06T 11/20 | (2006.01) |

(52) U.S. Cl.
CPC . *G06T 17/20* (2013.01); *G06T 9/00* (2013.01); *G06T 11/203* (2013.01); *G06T 2200/28* (2013.01)

(58) Field of Classification Search
CPC ....... G06T 11/203; G06T 17/20; G06T 11/20; G06T 2210/12
See application file for complete search history.

(56) References Cited

U.S. PATENT DOCUMENTS

| | | | |
|---|---|---|---|
| 7,190,367 B2 | 3/2007 | Perry et al. | |
| 7,684,641 B1 * | 3/2010 | Toksvig | 382/274 |
| 8,044,955 B1 | 10/2011 | Yhann | |

(Continued)

FOREIGN PATENT DOCUMENTS

EP     2107528 A1    10/2009

OTHER PUBLICATIONS

Kilgard M.J., "An Introduction to NV_path_rendering", NVIDIA Corporation, Jun. 8, 2011, 81 pp.

(Continued)

*Primary Examiner* — Hau Nguyen
(74) *Attorney, Agent, or Firm* — Shumaker & Sieffert, P.A.

(57) ABSTRACT

The present disclosure provides for path rendering including receiving, with a graphics processing unit (GPU), data indicative of a path segment of a path to be rendered. The systems and methods render the path segment by performing a fill of the path segment, which includes tessellating the path segment into a first plurality of primitives including a triangle per primitive, storing a first plurality of primitives in a stencil buffer, and drawing a bounding box of the path segment and rendering the bounding box with a stencil test enabled. The systems and methods also stroke the path segment, including tessellating the path into a second plurality of primitives, re-tessellating the second plurality of primitives, cutting the second plurality of primitives according to a dash pattern, creating a cap at a location of a cut, and creating a triangulation of a stroke and rasterizing the stroke based on the triangulation.

40 Claims, 39 Drawing Sheets

Related U.S. Application Data application No. 61/755,312, filed on Jan. 22, 2013, provisional application No. 61/755,359, filed on Jan. 22, 2013, provisional application No. 61/755,391, filed on Jan. 22, 2013.

(56) References Cited

U.S. PATENT DOCUMENTS

| | | | |
|---|---|---|---|
| 8,243,070 | B1 | 8/2012 | Brown |
| 2005/0195188 | A1 | 9/2005 | Goel et al. |
| 2006/0050072 | A1 | 3/2006 | Goel |
| 2008/0198168 | A1 | 8/2008 | Jiao et al. |
| 2009/0237401 | A1 | 9/2009 | Wei et al. |
| 2010/0057931 | A1 | 3/2010 | Riemers |
| 2010/0289802 | A1 | 11/2010 | Falchetto |
| 2011/0057931 | A1 | 3/2011 | Goel et al. |
| 2011/0090228 | A1 | 4/2011 | Persson |
| 2011/0142360 | A1* | 6/2011 | Takemoto ............... 382/243 |
| 2011/0285711 | A1 | 11/2011 | Kilgard |
| 2011/0285720 | A1 | 11/2011 | Kilgard |
| 2011/0285724 | A1 | 11/2011 | Kilgard |
| 2011/0285740 | A1 | 11/2011 | Kilgard |
| 2011/0285741 | A1 | 11/2011 | Kilgard |
| 2011/0285742 | A1 | 11/2011 | Kilgard et al. |
| 2011/0285747 | A1 | 11/2011 | Kilgard |
| 2011/0310102 | A1 | 12/2011 | Chang |
| 2012/0075310 | A1 | 3/2012 | Michail et al. |
| 2012/0293515 | A1* | 11/2012 | Clarberg et al. ............ 345/441 |
| 2013/0120391 | A1* | 5/2013 | Brown ..................... 345/441 |
| 2014/0043330 | A1 | 2/2014 | Ceylan |
| 2014/0043341 | A1 | 2/2014 | Goel et al. |

OTHER PUBLICATIONS

NVIDIA Corporation: "NV_path_rendering Frequently Asked Questions", Jun. 13, 2011, 15 pp.

International Search Report and Patentability from International Application No. PCT/US2013/051503, dated Nov. 7, 2014, 8 pp.

Conversy S., et al., "The svgl toolkit: enabling fast rendering of rich 2D graphics" Technical Report-Ecole Des Mines De Nantes, No. 02/01/info, 2002, XP002539626 France, 11 pp.

Figueiredo Luiz Henrique de., "IV.4 Adaptive Sampling of Parametric Curves" In: Alan W. Paeth: "Graphics Gems V", 1995, Morgan Kaufmann, San Francisco, CA, pp. 173-178, XP002715690, ISBN: 0-12-543455-3.

Hexadecimal: "GPU Experiments: Tessellation example", Feb. 19, 2010, XP055085172, Retrieved from the Internet: URL: http://gpuexperiments.blogspot.de/2010   /02/tessellation-example.html [retrieved on Oct. 24, 2013], 4 pp.

International Search Report and Written Opinion—PCT/US2013/051503—ISA/EPO—Nov. 20, 2013, 13 pp.

Kilgard, et al., "GPU-accelerated Path Rendering", Computer Graphics Proceedings, SIGGraph Asia, 2012, 10 pp.

Loop, et al., "Resolution Independent Curve Rendering using Programmable Graphics Hardware," Transactions on Graphics (TOG), Proceedings of ACM SIGGRAPH, Jul. 2005, vol. 24, No. 3, pp. 1000-1009.

Segal , et al., "The OpenGL Graphics System: A Specification", Chapter 11: Programmable Vertex Processing, Version 4.3 (Core Profile)—Aug. 6, 2012, XP002715730, pp. 322-370, sections 11.2, 11.2.2, 11.2.3.3; figures 11.1-11.4.

Zink et al., "Practical Rendering & Computation with Direct3D 11," Overview of Direct 3D, CRC Press, Nov. 2, 2011, pp. 4-7.

"OpenGL Programming Guide: The Official Guide to Learning OpenGL, Version 1.1, Chapter 14," Jan. 1, 1997, 21 pp.

Yeo, et al., "Efficient Pixel-Accurate Rendering of Curved Surfaces," In Proceedings of I3D'12 (2012), 9 pp. (Applicant points out that, in accordance with MPEP 609.04(a), the 2012 year of publication is sufficiently earlier than the effective U.S. filing date and any foreign priority date of Mar. 15, 2013 so that the particular month of publication is not in issue.).

Peters, "Mid-Structures Linking Curved and Piecewise Linear Geometry," In Proceedings of SIAM conference, Nov. 2004, 16 pp.

"Graphics Pipeline," Windows, Dec Center—Desktop, retrieved from http://msdn.microsoft.com/en-us/enus/%20library/windows/desktop/ff476882%28v=vs.85%29.aspx, 2 pp.

Second Written Opinion from International Application No. PCT/US2013/051503, dated Jul. 22, 2014, 7 pp.

Rice, et al., "Open VG Specification," Version 1.1, Dec. 3, 2008, retrieved from www.khronos.org/registry/vg/specs/openvg-1.1.pdf, 253 pp.

* cited by examiner

EXTENDING DX11 GPU FOR PROGRAMMABLE VECTOR GRAPHICS

This application claims the benefit of U.S. Provisional Application No. 61/681,498, filed Aug. 9, 2012; U.S. Provisional Application No. 61/713,377, filed Oct. 12, 2012; U.S. Provisional Application No. 61/723,274, filed Nov. 6, 2012, U.S. Provisional Application No. 61/755,312, filed Jan. 22, 2013, U.S. Provisional Application No. 61/755,359, filed Jan. 22, 2013, and U.S. Provisional Application No. 61/755,391, filed Jan. 22, 2013, the entire content each of which is incorporated herein by reference.

TECHNICAL FIELD

This disclosure relates to techniques for graphics processing, and more particularly, to techniques for path rendering with a graphics processing unit.

BACKGROUND

Visual content for a display may be generated using path rendering techniques for vector graphics. Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG) API.

Path rendering is typically implemented by a central processing unit (CPU). However, such an approach may be CPU-intensive, and may therefore limit the amount of CPU processing cycles available for other CPU tasks. Conventional techniques for vector graphics, including path rendering, may be implemented entirely in a CPU or partially in the CPU and partially in a GPU.

SUMMARY

The present disclosure provides for systems and method of for path rendering including drawing a path segment, filling the path segment, including (1) tessellating the path into line segments, (2) rasterizing and scan-filling using a cell buffer, and (3) drawing a bounding box of the path using a fill color and a stencil from the cell buffer, and stroking the path segment, including (1) tessellating the path into line segments, (2) cutting the line segments according to a dash pattern, and (3) creating a triangulation of a stroke and rasterize the stroke.

In one example, the disclosure describes a method that includes receiving, with a graphics processing unit (GPU), data indicative of a path segment of a path to be rendered, rendering the path segment, with the GPU, by performing a fill of the path segment, filling the path segment including tessellating the path segment into a first plurality of primitives including a triangle per primitive, storing a first plurality of primitives in a stencil buffer, and drawing a bounding box of the path segment and rendering the bounding box with a stencil test enabled, and stroking the path segment, including tessellating the path into a second plurality of primitives, re-tessellating the second plurality of primitives, cutting the second plurality of primitives according to a dash pattern, creating a cap at a location of a cut, and creating a triangulation of a stroke and rasterizing the stroke based on the triangulation.

In another example, the disclosure an apparatus configured to perform graphics processing including a graphics processing unit configured to receive data indicative of a path segment of a path to be rendered, and render the path segment by performing a fill of the path segment, the fill including tessellate the path segment into a first plurality of primitives including a triangle per primitive, storing a first plurality of primitives in a stencil buffer, and draw a bounding box of the path segment and render the bounding box with a stencil test enabled, and stroke the path segment, including tessellate the path into a second plurality of primitives, re-tessellate the second plurality of primitives, cut the second plurality of primitives according to a dash pattern, create a cap at a location of a cut, create a triangulation of a stroke and rasterizing the stroke based on the triangulation.

In another example, the disclosure describes an apparatus including means for receiving data indicative of a path segment of a path to be rendered, means for rendering the path segment by performing a filling of the path segment, the means for filling the path segment, including means for tessellating the path segment into a first plurality of primitives including a triangle per primitive, means for storing a first plurality of primitives in a stencil buffer, and means for drawing a bounding box of the path segment and means for rendering the bounding box with a stencil test enabled, and means for stroking the path segment, including means for tessellating the path into a second plurality of primitives, means for re-tessellating the second plurality of primitives, means for cutting the second plurality of primitives according to a dash pattern, means for creating a cap at a location of a cut, and means for creating a triangulation of a stroke and rasterizing the stroke based on the triangulation.

In another example, the disclosure describes a computer-readable storage medium. The computer-readable storage medium having stored thereon instructions that upon execution cause one or more processors to receive data indicative of a path segment of a path to be rendered, and render the path segment by perform a fill of the path segment, the fill including tessellate the path segment into a first plurality of primitives including a triangle per primitive, storing a first plurality of primitives in a stencil buffer, and draw a bounding box of the path segment and render the bounding box with a stencil test enabled, and tessellating the path into a second plurality of primitives, re-tessellate the second plurality of primitives, cutting the second plurality of primitives according to a dash pattern, create a cap at a location of a cut, and creating a triangulation of a stroke and rasterizing the stroke based on the triangulation.

In one example, the disclosure describes a method that includes receiving, with a graphics processing unit (GPU), data indicative of a path segment of a path to be rendered, and rendering the path segment, with the GPU, by performing a fill of the path segment, filling the path segment including tessellating the path segment into a first plurality of primitives, rasterizing and scan-filling the path segment based on the first plurality of primitives using a cell buffer, and drawing a bounding box of the path segment and a stencil from the cell buffer.

The details of one or more examples are set forth in the accompanying drawings and the description below. Other features, objects, and advantages will be apparent from the description and drawings, and from the claims.

DETAILED DESCRIPTION

Figure 1:
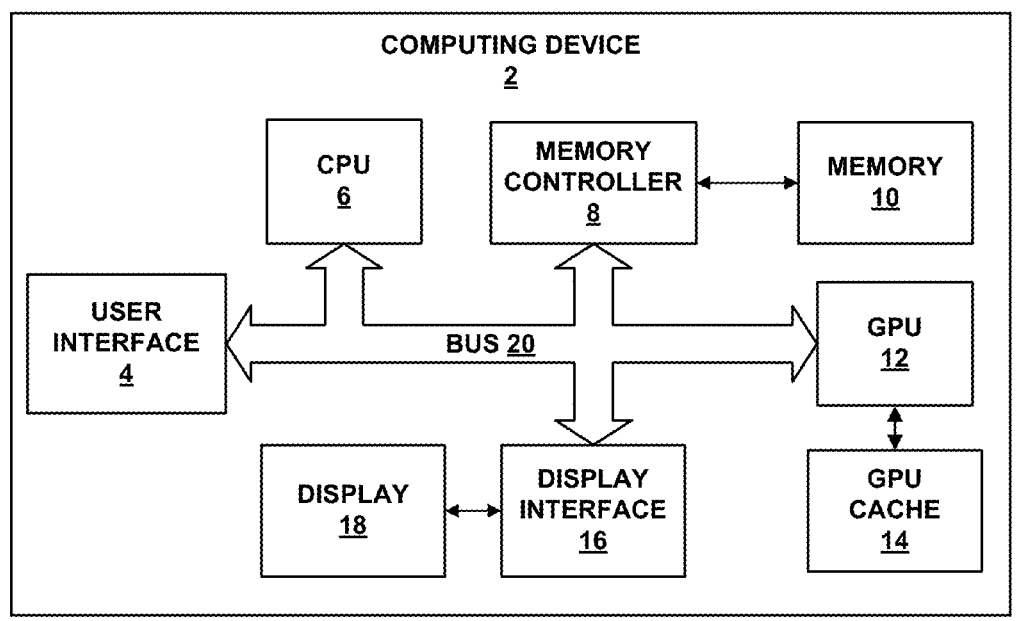
FIG. 1 is a block diagram illustrating an example computing device that may be used to implement the path rendering techniques of this disclosure.

This disclosure is directed to techniques for using a graphics processing unit (GPU) to perform path rendering. Path rendering may refer to the rendering of two-dimensional (2D) vector graphics paths (alternatively referred to herein as "paths"), each of which may include one or more path segments. When a path includes two or more path segments, the individual path segments may be of the same type or of different types. The types of path segments may include, for example, a line, an elliptic arc, a quadratic Bézier curve, and a cubic Bézier curve. In some examples, the path segment types may be defined in accordance with a standard vector graphics application programming interface (API), such as, e.g., the Open Vector Graphics (OpenVG) API.

As discussed above, conventional techniques for vector graphics, including path rendering, are implemented entirely in a CPU or partially in the CPU and partially in a GPU. Neither of these implementations allow for a single pass in the GPU. Additionally, neither implementation completely offloads vector graphics processing from the CPU. One is entirely based in the CPU, while the other uses both the CPU and the GPU.

As discussed, it can be undesirable to perform vector graphics processing in the CPU because such processing may be processor intensive and, accordingly, may limit the number of processing cycles in the CPU available to perform other functions. Additionally, in many cases, CPUs may consume more power when compared to GPUs. As many mobile devices may be battery powered, lower power consumption may be advantageous. Further, CPUs may not allow for as much parallel processing (e.g., for a comparable priced GPU). Generally, CPUs may also be more expensive when compared to GPUs.

Examples described herein provide systems and methods that may be applied to, for example, existing Microsoft DirectX11 compliant hardware (or equivalent hardware supporting tessellation), for example, by modifying the example system as described herein, to allow for path rendering which may be used in vector graphics processing. In an example, this disclosure provides for a single pass solution using the DirectX11 pipeline stages. Such an example may completely offload vector graphics processing from the CPU. Additionally, the disclosed techniques provide for programmable vector graphics processing as existing shader in the GPU and may be used to support other primitive types and joint/end rules.

GPUs typically implement a three-dimensional (3D) graphics pipeline that is designed to be compliant with one or more 3D graphics APIs. Because the prevailing 3D graphics APIs in use today do not require that compliant devices support path rendering commands, modern GPUs often provide little to no hardware acceleration for path rendering commands. For example, a typical 3D graphics pipeline implemented in a modern GPU may include a rasterizer that is designed to rasterize low-order, non-curved, 3D graphics primitives (such as, e.g., points, lines and triangles), but is not capable of directly rendering curved path rendering primitives (such as, e.g., elliptic arcs and Bézier curves).

One approach for path rendering uses a GPU pipeline to provide partial GPU hardware acceleration for the execution of path rendering commands. Some examples may avoid pre-processing completely. In an example implementation a first vertex of a path may be used as the pivot point for filling. Additional hardware may be added to a GPU in a setup engine to compute minimum coordinates and maximum coordinates of path vertices. These minimum and maximum values may be used to determine the bounding box shape.

One approach for path rendering uses a modern 3D GPU pipeline to provide partial GPU hardware acceleration for the execution of path rendering commands. This approach involves preprocessing a path segment with a central processing unit (CPU) in order to convert the path segment into one or more low-order, non-curved, 3D graphics primitives that can be rasterized by the GPU. For example, a CPU may tessellate a curved path segment (e.g., an elliptical arc or a Bézier curve) into a set of relatively small triangles that approximates the curvature of the path segment, and may cause the set of triangles to be rendered using the GPU. Such an approach, however, may be CPU-intensive, and may therefore limit the amount of CPU processing cycles available for other CPU tasks. Moreover, in some cases, a relatively large amount of triangles may be needed to render the path segment at a desired level of detail. The relatively large amount of triangles may consume a significant amount of memory storage space when storing the data, and may consume a significant amount of memory bandwidth when transferring the data to the GPU.

Another approach for providing partial-to-total GPU hardware acceleration for the execution of path rendering commands may involve modifying the architecture of the GPU to support a dedicated, hardware-accelerated, path rendering pipeline. However, because the prevailing 3D graphics APIs (e.g., the Microsoft® DirectX 11 API) do not require a GPU architecture to include a dedicated path rendering pipeline, such an approach does not result in a cross-platform, hardware-accelerated, path rendering solution that would be guaranteed to be supported by all GPUs which are compliant with a particular 3D graphics API (e.g., the DirectX (DX) 11 API).

The path rendering techniques in this disclosure may provide a GPU hardware-accelerated path rendering solution where the GPU is configured to tessellate a received indication of a path segment into a plurality of line segments, and to render the tessellated line segments using a 3D graphics pipeline. By using the GPU to tessellate a path segment into line segments, the burden of preprocessing path segments is lifted from the CPU, thereby freeing up processing resources for other CPU tasks. Moreover, the GPU may, in some examples, utilize a highly-parallel, modern GPU tessellation architecture to perform the tessellation operations, which may, in some examples, allow the GPU to tessellate a path segment in a more efficient manner than the CPU. In addition, because the tessellation occurs in the GPU, rather than in the CPU, a multitude of tessellated primitives do not need to be stored in system memory and do not need to be passed from the CPU to the GPU, thereby reducing the memory footprint needed for path rendering as well as the memory bandwidth needed for path rendering.

Tessellating the path segment may include tessellating the path segment using a fixed-function tessellation engine of the GPU and a domain shader program executing on a shader unit of the GPU. Additionally, in an example, a cell buffer may be used. The cell buffer may be a memory that includes a number of cells. For example, the cell buffer may be a sixteen by sixteen grid of sub-pixels. One cell may represent one pixel in a final image. The cell buffer may contain a matrix of x*y cells, with one cell representing one pixel in a final image, each cell in the cell buffer storing winding counter information, and wherein the cell buffer is the same size as a frame buffer.

In one example, every cell in the cell buffer represents one pixel in the final image. Every cell may store a winding counter information. Cell buffer size may be as big as the frame buffer size, but memory requirements may limit some examples. Accordingly, the frame buffer may be split into a number (x*y) of tiles of pixels with the cell buffer size is x*y cells. A device may draw one tile at a time, and then carry the winding counter information on the last column (rightmost) to the next tile (the one to the right). If the current tile is the first one in a row, there is no previous tile, hence there is no carryover. For these tiles, rasterized lines may be clamped to the first column.

In some examples, the GPU may be configured to tessellate and render a path segment using a graphics architecture that is specified by a particular 3D graphics API, such as, e.g., the DirectX 11 API, without requiring any additional hardware components and/or modifications to the graphics architecture. By utilizing only architectural features likely or guaranteed to be present by a particular 3D graphics API when performing path rendering in such examples, a cross-platform, hardware-accelerated, path rendering solution may be realized that is capable of being implemented on any device that is compliant with the 3D graphics API. For example, the techniques of this disclosure may, in some examples, provide a path rendering solution that is capable of being used on any DirectX 11 compliant graphics hardware. In some examples, some path rendering techniques (e.g., dashing and cusp handling) may be disabled in order to implement a DirectX 11 path rendering solution that utilizes the DirectX 11 architecture without any modifications.

Path rendering may be divided into two main operations: (1) filling a path segment and (2) stroking a path segment. In some examples, one or both of the filling and stroking operations may be performed to completely render a path. The filling operation may be configured to fill the interior region of a path segment with a specified fill color. The stroking operation may be configured to "widen" the edges of a path segment by working outward perpendicularly to the path. In addition to the main operations, path rendering may also involve applying various types of end caps to the ends of a path, and applying various types of joins between the endpoints of interior path segments of a path to create a smooth path.

After a path segment has been tessellated, a GPU that implements the path rendering techniques of this disclosure may be configured to generate 3D geometry corresponding to the tessellated path segment that allows one or both of a fill area for the path segment and a stroke area for the path segment to be rendered by the GPU. The 3D geometry may include low-order, non-curved, 3D graphics primitives (e.g., triangles) that are capable of being rasterized by existing 3D rasterization engines. By rendering the fill areas and/or stroke areas for a path segment based on the 3D geometry that is generated by a GPU from a plurality of tessellated line segments that approximate a path to be rendered, a 3D GPU pipeline may be used to provide either a 100% or a nearly 100% GPU solution for the execution of filling and stroking operations.

In some examples, to implement these methods in, for example, a DirectX11 pipeline architecture, or other similar 3D graphics pipelines, may be modified according to the techniques of this disclosure to include a number of extensions. For example, the DirectX11 pipeline may be modified to include a path primitive. The path primitive may allow the DirectX11 pipeline to process vector graphics by allowing for path rendering directly in a GPU implementing DirectX11 without using a separate CPU. For example, the path primitive may allow for filling, stroking, or both using the methods described herein.

FIG. 1 is a block diagram illustrating an example computing device 2 that may be used to implement the path rendering techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a GPU cache 14, a display interface 16, a display 18 and bus 20. User interface 4, CPU 6, memory controller 8, GPU 12 and display interface 16 may communicate with each other using bus 20. It should be noted that the specific configuration of buses and communication interfaces between the different components illustrated in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, a DirectX API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, patches, etc. In further examples, the graphics data to be rendered may include one or more path rendering primitives, such as, e.g., a line segment, an elliptic arc, a quadratic Bézier curve, and a cubic Bézier curve.

The present disclosure provides for systems and method of for path rendering including drawing a path segment, filling the path segment, including (1) tessellating the path into line segments, (2) rasterizing and scan-filling using a cell buffer, and (3) drawing a bounding box of the path using a fill color and a stencil from the cell buffer; and stroking the path segment, including (1) tessellating the path into line segments, (2) cutting the line segments according to a dash pattern, and (3) creating a triangulation of a stroke and rasterize the stroke. In some examples, one or more of these functions may be performed by GPU 12. For example, in various implementations none of these are performed in the CPU.

Memory controller 8 facilitates the transfer of data going into and out of memory 10. For example, memory controller 8 may receive memory read requests and memory write requests from CPU 6 and/or GPU 12, and service such requests with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from both CPU 6 and memory 10, in other examples, some or all of the functionality of memory controller 8 may be implemented on one or more of CPU 6, GPU 12, and memory 10.

Memory 10 may store program modules and/or instructions that are accessible for execution by CPU 6 and/or data for use by the programs executing on CPU 6. For example, memory 10 may store user applications and graphics data associated with the applications. Memory 10 may also store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of path data, path segment data, surfaces, texture buffers, depth buffers, cell buffers, vertex buffers, frame buffers, or the like. In addition, memory 10 may store command streams for processing by GPU 12. For example, memory 10 may store path rendering commands, 3D graphics rendering commands, and/or general-purpose GPU computing commands. Memory 10 may include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media.

GPU 12 may be configured to execute commands that are issued to GPU 12 by CPU 6. The commands executed by GPU 12 may include graphics commands, draw call commands, GPU state programming commands, memory transfer commands, general-purpose computing commands, kernel execution commands, etc. The memory transfer commands may include, e.g., memory copy commands, memory compositing commands, and block transfer (blitting) commands.

In some examples, GPU 12 may be configured to perform graphics operations to render one or more graphics primitives to display 18. In such examples, when one of the software applications executing on CPU 6 requires graphics processing, CPU 6 may provide graphics data to GPU 12 for rendering to display 18 and issue one or more graphics commands to GPU 12. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

In further examples, GPU 12 may be configured to perform general-purpose computing for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and graphics data to memory 10, which may be accessed by GPU 12.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 18 more quickly than rendering the images using CPU 6. In addition, the highly parallel nature of GPU 12 may allow GPU 12 to process certain types of vector and matrix operations for general-purposed computing applications more quickly than CPU 6.

GPU 12 may, in some examples, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within memory 10. The rendered image data may include rendered fill areas and stroke areas for a path segment to be rendered. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

Bus 20 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 20 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, GPU 12 may be configured to provide partial-to-total GPU-hardware acceleration for the execution of various path rendering commands. For example, CPU 6 may issue one or more path rendering commands to GPU 12, and GPU 12 may execute the path rendering commands. As one example, CPU 6 may issue to GPU 12 one or more path filling commands that instruct GPU 12 to perform a path filling operation, and GPU 12 may execute the path filling commands. As another example, CPU 6 may issue to GPU 12 one or more path stroking commands that instruct GPU 12 to perform a path stroking operation, and GPU 12 may execute the path stroking commands.

In some examples, GPU 12 may be configured to receive data indicative of a path segment of a path to be rendered, tessellate the path segment into a plurality of primitives, and render at least one of a fill area and a stroke area for the path segment based on the plurality of primitives. The GPU may render a fill area for the path segment when performing a fill operation, and may render a stroke area for the path segment when performing a stroke operation. The plurality of primitives, in some examples, may be a plurality of line segments.

In some examples, GPU 12 may use a two-pass rendering approach to perform a path filling operation. For example, as part of a first rendering pass, GPU 12 may receive data indicative of a path segment of a path to be rendered, tessellate the path segment into a plurality of line segments, and generate a plurality of triangle primitives based on the plurality of lines segments. GPU 12 may generate each of the plurality of triangle primitives based on a respective one of the plurality of line segments. GPU 12 may render each of the plurality of triangle primitives into a cell buffer such that the cell buffer stores data indicative of which pixels are inside of the fill area for the path segment. After rendering the primitives into the common cell buffer, GPU 12 may perform a second rendering pass. During the second rendering pass, GPU 12 may render one or more primitives that encompass the pixels that are inside the fill area for the path segment based on the data stored in the cell buffer and a fill color to generate a rasterized version of the fill area for the path segment. In this manner, GPU 12 may provide GPU-hardware acceleration for the performance of path filling operations.

To generate the plurality of triangle primitives, GPU 12 may, in some examples, generate the plurality of triangle primitives such that each of the triangle primitives has a common vertex that is common to (i.e., the same for) all of the triangle primitives for a path segment. In such examples, GPU 12 may generate the plurality of triangle primitives such that each of the triangle primitives has two additional vertices (i.e., two vertices in addition to the common vertex) that correspond to the endpoints of a respective one of the plurality of line segments. Each additional vertex may correspond to a respective one of the endpoints of a corresponding line segment.

To render each of the plurality of triangle primitives into a cell buffer, GPU 12 may use one of the following techniques. According to a first technique, GPU 12 may, for each of the plurality of triangle primitives, invert one or more values in stencil buffer 40 that correspond to the respective triangle primitive. According to a second technique, GPU 12 may, for each of the plurality of triangle primitives, increment one or more values in stencil buffer 40 that correspond to the respective triangle primitive if a vertex order for the respective triangle primitive is oriented in a clockwise direction.

In some cases, GPU 12 may be configured to use one or both of the following techniques to perform the path filling operation. According to a first technique, GPU 12 may tessellate the path segment into a plurality of line segments using a fixed-function tessellation engine of GPU 12 and a domain shader program executing on a programmable shader unit of GPU 12. According to as second technique, GPU 12 may generate the plurality of triangle primitives using a geometry shader program executing on a programmable shader unit of GPU 12. Using one or more of the tessellation engine, domain shader 52, and the geometry shader of GPU 12 to perform the path filling operation may allow the path filling operation to be performed, in some examples, using a GPU that is compliant with an on-chip, tessellation-enabled, 3D graphics API (e.g., the DX 11 API), without requiring modification of the API or modification of the graphics architecture specified by the API.

In further examples, GPU 12 may use a single-pass rendering approach to perform a path stroking operation. For example, GPU 12 may receive data indicative of a path segment of a path to be rendered, tessellate the path segment into a plurality of line segments, and generate a plurality of triangle primitives based on the plurality of lines segments. For each of the plurality of line segments, GPU 12 may generate one or more primitives (e.g., triangle primitives) that spatially correspond to a stroke area for the respective line segment, and render the one or more primitives for the respective line segment based on a stroke color to generate a rasterized version of the stroke area for the path segment. In this manner, GPU 12 may provide GPU-hardware acceleration for the performance of path stroking operations.

To generate one or more primitives (e.g., triangle primitives) that spatially correspond to a stroke area for the respective line segment, GPU 12 may, in some examples, generate a plurality of normal vertices for the respective line segment. Each of the normal vertices may be indicative of a normal vector that corresponds to a respective one of a plurality of points along the path segment. Each of the plurality of points along the path segment may correspond to a respective one of the endpoints of the respective line segment. GPU 12 may determine corner points of a stroke area for the respective line segment based on the plurality of normal vertices and a stroke width. GPU 12 may generate the one or more primitives that spatially correspond to the stroke area for the respective line segment based on the corner points of the stroke area.

In some cases, GPU 12 may use one or more of the following techniques to perform the path stroking operation. According to a first technique, GPU 12 may tessellate the path segment into a plurality of line segments using a fixed-function tessellation engine of GPU 12 and a domain shader program executing on a programmable shader unit of GPU 12. According to as second technique, GPU 12 may generate the one or more primitives using a geometry shader program executing on a programmable shader unit of GPU 12. According to a third technique, GPU 12 may generate the plurality of normal vertices using a domain shader program executing on a programmable shader unit of GPU 12. Using one or more of the tessellation engine, domain shader 52, and the geometry shader of GPU 12 to perform the path stroking operation may allow the path stroking operation to be performed, in some examples, using a GPU that is compliant with an on-chip, tessellation-enabled, 3D graphics API, such as, e.g., the DX 11 API, without requiring modification of the API or modification of the graphics architecture specified by the API.

The path rendering techniques described in this disclosure may be implemented in any of the components in computing device 2 illustrated in FIG. 1 including, e.g., CPU 6, GPU 12, and memory 10. In some examples, all or almost all of the path rendering techniques may be implemented in GPU 12 (e.g., in a graphics pipeline of GPU 12). In additional examples, CPU 6 may implement techniques for configuring the state of the graphics pipeline and binding shader programs to the graphics pipeline to implement a path rendering pipeline in GPU 12 that performs the path rendering techniques of this disclosure. In further examples, CPU 6 may be configured to place data indicative of a path to be rendered into one or more buffers (e.g., one or more vertex buffers) that may be accessed by GPU 12 to render one or more paths.

In some examples, GPU 12 may be configured for (1) tessellating the path into line segments, (2) rasterizing and scan-filling using a cell buffer, and (3) drawing a bounding box of the path using a fill color and a stencil from the cell buffer; and stroking the path segment, including (1) tessellating the path into line segments, (2) cutting the line segments according to a dash pattern, and (3) creating a triangulation of a stroke and rasterize the stroke.

In some examples, a relatively large amount of data may need to be transferred to a graphics processing unit (GPU) to render the path segment at a desired level of detail. The relatively large amount of data may consume a significant amount of memory storage space when storing the data, and may consume a significant amount of memory bandwidth when transferring the data to the GPU.

Figure 2:
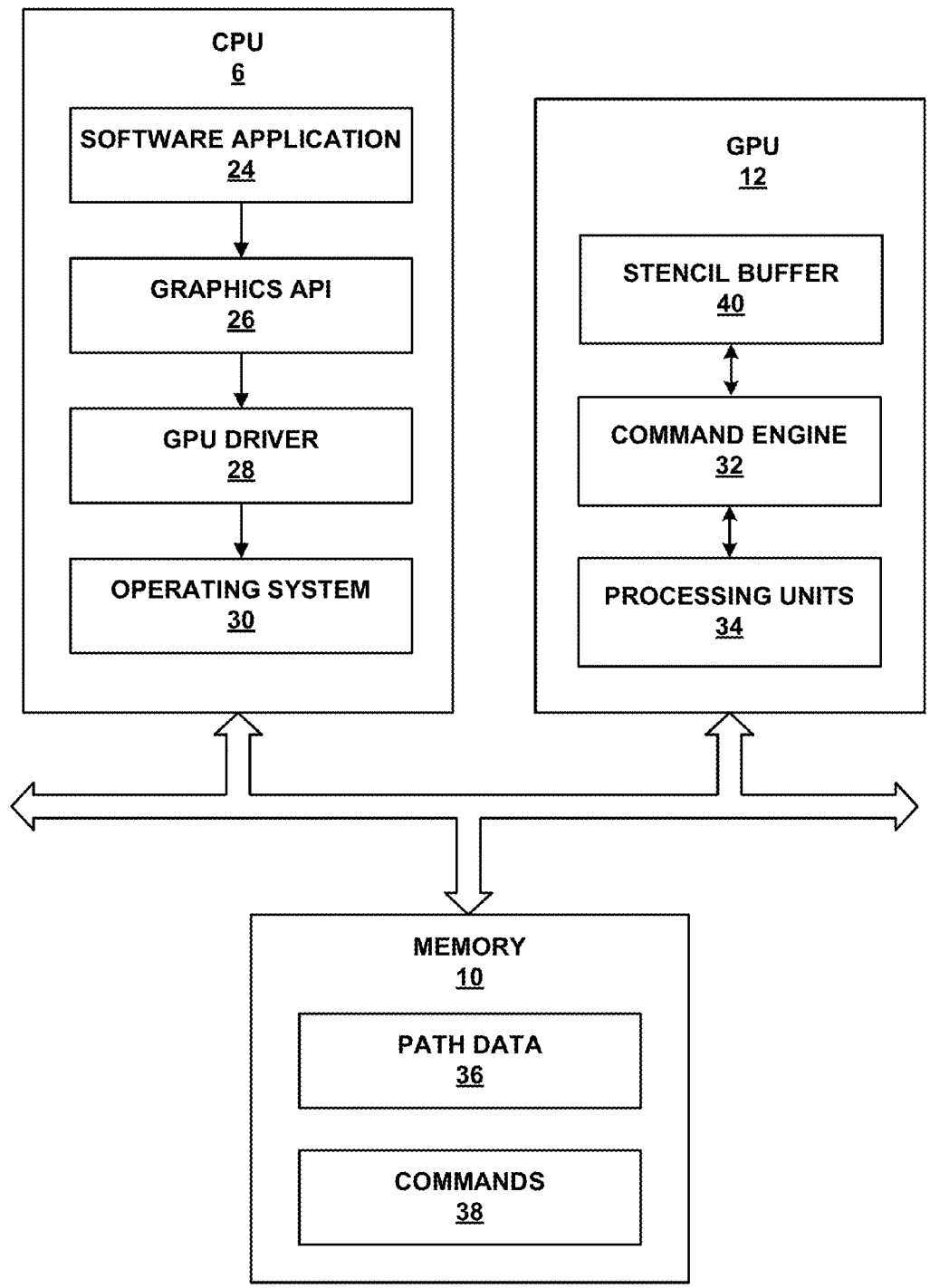
FIG. 2 is a block diagram illustrating the CPU, the GPU and the memory of the computing device in FIG. 1 in further detail.

FIG. 2 is a block diagram illustrating CPU 6, GPU 12 and memory 10 of computing device 2 in FIG. 1 in further detail. As illustrated in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 is configured to execute software application 24, a graphics API 26, a GPU driver 28 and an operating system 30. Software application 24 may include one or more instructions that cause graphics images to be displayed and/or one or more instructions that cause a non-graphics task (e.g., a general-purposed computing task) to be performed on GPU 12. Software application 24 may issue instructions to graphics API 26. Graphics API 26 may be a runtime service that translates the instructions received from software application 24 into a format that is consumable by GPU driver 28. GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

GPU 12 includes a command engine 32 and one or more processing units 34. In some examples, the one or more processing units 34 may form and/or implement a 3D graphics rendering pipeline, e.g., a DX 11 graphics rendering pipeline (i.e., a 3D graphics pipeline that is compliant with the DX 11 graphics API. In one example in accordance with this disclosure may include a new primitive types supported in the GPU (line, quadratic/cubic Bezier, elliptic arc). Different types of primitives should be able to be packed into the same vertex buffer, hence rendering them all in a single draw call. Dash pattern may be used as-is, new tessellator logic may be used to handle preprocessing the dash pattern. Having new primitive types and being able to pack different types of primitives into a single draw call will decrease the GPU input size, and significantly increase the performance because of vertex reuse. Creating joins/caps at IA stage may require some hardware modifications. The resulting join primitives may be use many indices due to potential repeated knots. This may also require primitive type as a system generated value available in different shader stages.

Command engine 32 is configured to receive commands from CPU 6 (e.g., via memory 10) and to cause GPU 12 to execute the commands. In response to receiving a state command, command engine 32 may be configured to set one or more state registers in GPU to particular values based on the state command, and/or to configure one or more of the fixed-function processing units 34 based on the state command. In response to receiving a draw call command, command engine 32 may be configured to cause processing units 34 to render the geometry represented by vertices 36 in memory 10 based on data indicative of the type of path to be rendered, which may be contained in the vertex data structures of the vertex buffers to be rendered. Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc.

In some examples, a stencil buffer 40 may be added to GPU 12 implementing, for example, the DirectX11 architecture In an example, output merger stage 60 may be configured to populate stencil buffer 40 such that stencil buffer 40 stores values which are indicative of a fill area for the path segment according to one or more stencil buffer filling techniques.

In other examples, a cell buffer that contains x*y cells may be used. A cell buffer may be added to GPU 12 implementing, for example, the DirectX11 architecture. Cell buffer may be a sixteen by sixteen grid of sub-pixels, e.g., x=y=16. One cell may represent one pixel in the final image, but cell name may be used to distinguish the cells and pixels as they store different information. In the example, each cell in cell buffer stores sixteen bytes of winding counter information. Cell buffer may be the size of the frame buffer, but normally the memory requirements of cell buffer would become too big. So the frame buffer may be split in to tiles of x*y pixels (and cells). This allows the drawing of the primitive one tile at a time.

Memory 10 may store path data 36 and one or more commands 38. In some examples, path data 36 may be stored as a plurality of vertices (or control points) in one or more vertex buffers allocated in memory 10. In some examples, the path data may be stored in a patch list data structure (e.g., a four control point patch list). Commands 38 may be stored in one or more command buffers (e.g., a ring buffer). CPU 6 (e.g., GPU driver 28 via operating system 30) may place path data 36 and commands 38 into memory 10 for consumption by GPU 12. GPU 12 (e.g., command engine 32) may retrieve and execute commands 38 stored in memory 10.

In examples where path data 36 is stored as vertices, the vertices may include one or more attributes that geometrically define a path to be rendered. For example, for a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points instead of four control points. For elliptic arcs, the vertices in the patch control list may include data indicative of an endpoint parameterization of the elliptic arc or data indicative of a center parameterization of the elliptic arc.

CPU 6 may also place data indicative of the type of path to be rendered (i.e., "path type data") into one or more otherwise unused vertex coordinates in the vertex buffer. In some examples, the different path types may correspond to a set of path types that are defined by a vector graphics API and are available for use by software application 24. In some examples, the different path types may correspond to a set of path types that are defined by the OpenVG API.

In some cases, the one or more attributes that geometrically define the path to be rendered may be resolution-independent. In other words, the attributes that geometrically define the path may be independent of the amount of tessellation to be performed to render the path segment and/or the amount of vertices to be generated to render the path segment.

Commands 38 may include one or more state commands and/or one or more draw call commands. A state command may instruct GPU 12 to change one or more of the state variables in GPU 12, such as, e.g., the draw color, the fill color, the stroke color, etc. In some examples, the state commands may include path rendering state commands that are configured to set one or more state variables associated with rendering a path. For example, the state commands may include a paint mode command that is configured to indicate whether a path to be rendered is to be filled, stroked, or both. As another example, the state commands may include a fill color command that specifies a color to be used for filling operations and/or a stroke color command that specifies a color to be used for stroking operations. As a further example, the state commands may specify one or more parameters for the stroke operation, such as, e.g., a stroke width, an end cap style (e.g., butt, round, square), a line join style (e.g., miter, round, bevel), a miter limit, etc. In some examples, in addition to or in lieu of using a state command to set one or more state parameters, the one or more of the state parameters may be set using one or more parameter values in a draw call command.

A draw call command may instruct GPU 12 to render the geometry defined by a group of one or more vertices (e.g., defined in a vertex buffer) stored in memory 10. In some examples, the draw call command may invoke GPU 12 to render all of the vertices 36 stored in a defined section (e.g., buffer) of memory 10. In other words, once GPU 12 receives the draw call command, control is passed to GPU 12 for rendering the geometry and primitives represented by the vertices in the defined section (e.g., buffer) of memory 10.

The draw call commands may include one or both of 3D draw call commands and path rendering draw call commands. For 3D rendering draw call commands, the geometry defined by the group of one or more vertices in the vertex buffer may correspond to one or more 3D graphics primitives to be rendered (e.g., points, lines, triangles, quadralaterals, triangle strips, patches, etc), and the 3D rendering draw call command may instruct GPU 12 to render the one or more 3D graphics primitives. For path rendering draw call commands, the geometry defined by the group of one or more vertices in the vertex buffer may correspond to one or more path primitives to be rendered (e.g., a line segment, an elliptic arc, a quadratic Bézier curve, and a cubic Bézier curve, etc), and the path rendering draw call command may instruct GPU 12 to render the one or more path primitives.

In some examples, the path rendering techniques described in this disclosure may be implemented in any of the components illustrated in FIG. 2 including, e.g., graphics API 26, GPU driver 28, command engine 32 and processing units 34. In some examples, all or almost all of the path rendering techniques may be implemented in a graphics pipeline in GPU 12 formed by processing units 34. In additional examples, software application 24, graphics API 26 and/or GPU driver 28 of CPU 6 may implement techniques for configuring the state of the graphics pipeline and binding shader programs to the graphics pipeline to implement a path rendering pipeline in GPU 12 that performs the path rendering techniques of this disclosure. In further examples, software application 24, graphics API 26 and/or GPU driver 28 of CPU 6 may be configured to place data indicative of a path to be rendered into one or more buffers (e.g., one or more vertex buffers) that may be accessed by GPU 12 to render one or more paths. In some examples, GPU 12 may be configured for (1) tessellating the path into line segments, (2) rasterizing and scan-filling using a cell buffer, and (3) drawing a bounding box of the path using a fill color and a stencil from the cell buffer.

Figure 3:
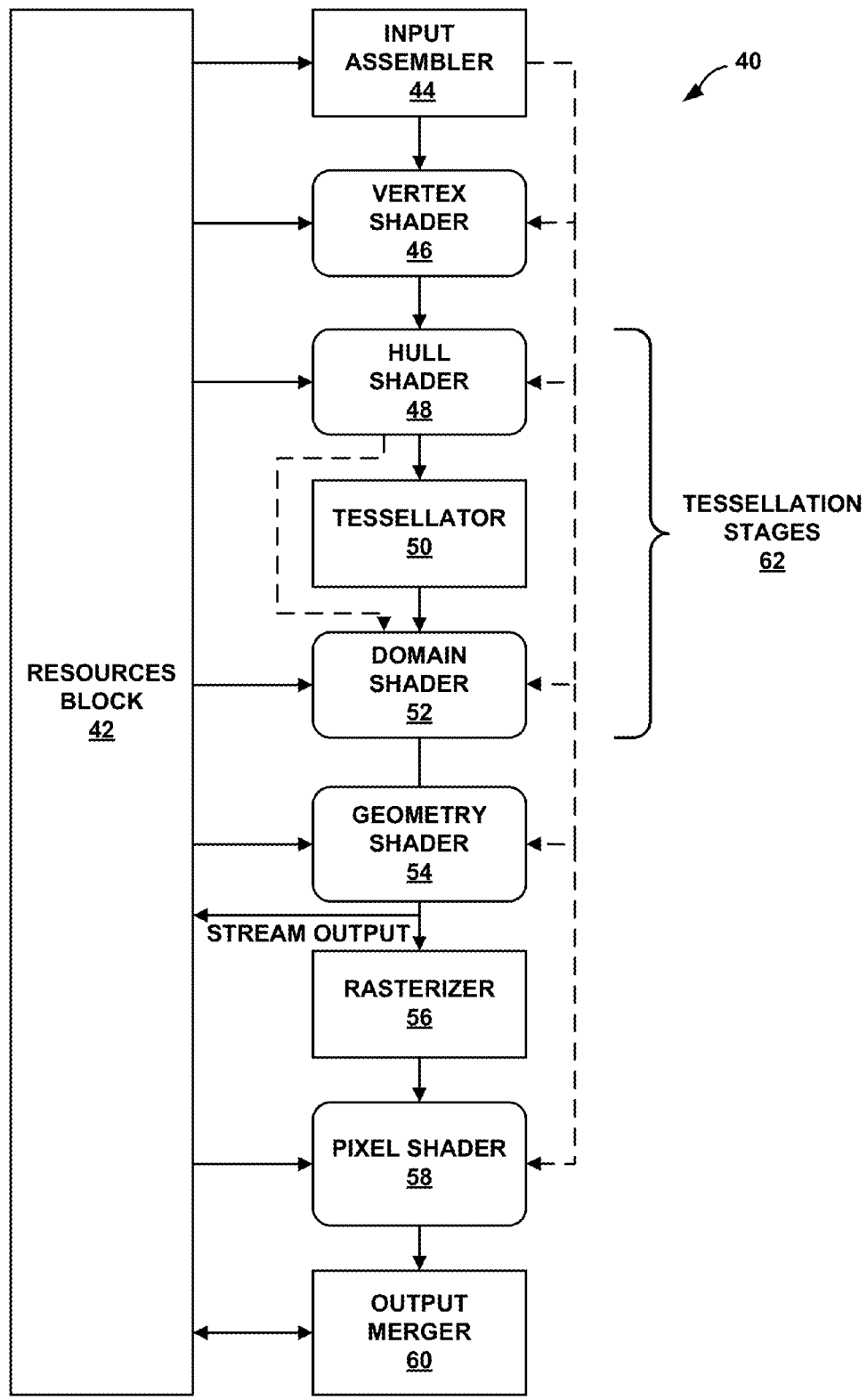
FIG. 3 is a block diagram illustrating an example graphics pipeline using tessellation.

FIG. 3 is a conceptual diagram illustrating an example graphics pipeline that may perform the path rendering techniques of this disclosure. In some examples, the graphics pipeline may correspond to the Microsoft® DirectX (DX) 11 graphics pipeline. As illustrated in FIG. 3, the example graphics pipeline includes a resources block 42 and a plurality of processing stages. The plurality of processing stages include an input assembler (IA) stage 44, a vertex shader (VS) stage 46, a hull shader (HS) stage 48, a tessellator stage 50, a domain shader (DS) stage 52, a geometry shader (GS) stage 54, a rasterizer stage 56, a pixel shader (PS) stage 58, and an output merger stage 60. HS stage 48, tessellator stage 50, and domain shader stage 52 may form the tessellation stages 62 of the graphics pipeline.

As illustrated in FIG. 3, many of the pipeline stages may also be communicatively coupled to resources block. The resources block may include memory resources such as buffers and textures. The remaining blocks indicate pipeline stages. The blocks with straight corners represent fixed-function pipeline stages, and the blocks with rounded corners represent programmable stages. Each of the programmable stages may be configured to execute a shader program of a particular type. For example, vertex shader 46 may be configured to execute a vertex shader program, hull shader 48 may be configured to execute a hull shader program, etc. Each of the different types of shader programs may execute either on a common shader unit of the GPU or on one or more dedicated shader units that are dedicated to executing shader programs of one or more particular types. Hull shader 48 stage, tessellator 50, and domain shader 52 stage may be collectively referred to as tessellation stages 62.

Additional background information regarding the general operation of the DirectX 11 graphics pipeline may be found at http://msdn.microsoft.com/en-us/library/windows/desktop/ff476882%28v=vs.85%29.aspx, as of Nov. 26, 2012, and is hereby incorporated by reference. Further information regarding the general operation of the DirectX 11 graphics pipeline may be found in Zink et al., "Practical Rendering & Computation with Direct3D 11," CRC Press (2011), the entire contents of which is incorporated herein by reference.

As illustrated in FIG. 3, in some examples, hull shader 48 converts elliptical arcs from an endpoint representation to a parametrical representation. The input assembly (IA) stage creates endcaps and joins. IA may create join primitives where two path segments meet. IA may also create starting and ending caps for open paths. An open path is a path that does not enclose a region. To successfully create a join, the join position and tangents of two path segments at the join position may be used. For a cap, the position and tangents at the first and last points of the path may be used. Tangents of path segments may be found by simply subtracting control points, however, in case of repeated control points, all control points may be processed to determine an endpoint tangent. In an example, IA may have to put both path segments' vertices into a join primitive. The worst case scenario may be where two cubic curves meet, each having 4 vertices (control points), 1 shared, so total of 7 vertices required for a join primitive from IA.

As discussed above, the two main path rendering operations are: (1) filling a path segment; and (2) stroking a path segment. Solutions for performing each of these operations with a graphics rendering pipeline (e.g., the DirectX 11 graphics pipeline) will now be described.

In an example, the path segment comprises a line and stroking comprises widening the line by thickening the line in two directions perpendicular to the line. Alternatively, the path segment comprises a curve and stroking further may include splitting the curve into line segments, determining a stroke width, and creating a pair of triangle strips positioned to widen at least one of the line segments.

An example system of this disclosure provides an approximately 100% GPU solution for path rendering. Using the current GPU architecture, (e.g., an architecture operating in accordance with DirectX11) this may be inefficient. Using a modified GPU architecture may provide for an efficient GPU solution for path rendering.

As used herein, a "path" comprises a number of path segments, which may be, for example, a line, an elliptic arc, a quadratic Bézier, or a cubic Bézier curve. A Bézier curve is a type of parametric curve that can be scaled indefinitely. Additionally, a path may or may not be "closed." A closed path is one in which the last vertex of the path is connected to the first vertex of the path via a line and forms a closed shape. A path can overlap itself numerous times.

Path rendering can be divided into two main tasks, (1) filling and (2) stroking. In some examples, these tasks may be handled separately. Filling a path is defined as filling the interior region of a given path by the fill color. Stroking a path comprises "widening" the edges of the path using a straight-line pen held perpendicularly to the path.

When filling a path, the interior region of a given path may be filled by a color. The interior region of a path may be defined using either of the odd-even or non-zero fill rules. The odd-even rule is an algorithm implemented in vector-based graphics software which determines how a graphical shape with more than one closed outline will be filled. The odd-even rule determines the "insideness" of a point by drawing a ray from the point to infinity in any direction and counting the number of path segments from the given shape that the ray crosses. If this number is odd, the point is considered inside the curve and will be filled; if even, the point is considered outside the curve and will not be filled. Accordingly, an area inside a curve is an area that will be filled to form a shape and an area outside a curve is an area that will not be filled to form a shape (at least not for that particular shape). In two-dimensional computer graphics, the non-zero winding rule is a means of determining whether a given point falls within an enclosed curve.

Some examples may use pre-processing, while other examples may include no pre-processing. Centroid pivot point in pre-processing may give us a slight increase in filling performance over first vertex pivot point. Determining bounding box in the GPU may require some hardware modifications. Converting elliptic arcs to parametrical form in hull shader 48 will result in the conversion being done at every frame. An elliptic arc will need to go through hull shader conversion up to three times in a frame (arc itself, and two joins/caps at arc endpoints).

Vertices may define a path consisting of a line segment, a cubic segment, another line segment and a quadratic segment. It may be a closed path (i.e. encloses a region). Some examples may make the following API draw call: (1) drawNonIndexedPrimType(numIndices=7, closed=true), (2) primitive types will be the following list: [line, cubic, line, quadratic], (3) IA will start generating primitives based on the primitive types. Since this is a closed path, there are no caps.

In an example, the output may be as follows: (1) PrimType, Indices; (2) line 0, 1; (3) Join_Line_Cubic 0, 1, 2, 3, 4; (4) Cubic 1, 2, 3, 4; (5) Join_Cubic_Line 1, 2, 3, 4, 5; (6) Line 4, 5; (7) Join_Line_Quadratic 4, 5, 6, 0; (8) Quadratic 5, 6, 0; (9) Join_Quadratic_Line 5, 6, 0, 1. Since we have 4 different types of path segments (line, quadratic, cubic, elliptic), we have 4 different cap types and 4×4=16 different join primitive types.

In an example, filling a path means filling the interior region of a given path by a given fill color. The interior region may be defined using either of the even/odd or non-zero fill rules. One example algorithm to handle filling a path is as follows: (1) tessellate a given path into line segments, (2) create a triangle per line segment using Geometry Shader 54 by connecting the pivot point to line segments while honoring winding order. The clockwise or counterclockwise triangles are then rendered to stencil buffer 40. For Even/Odd filling, every triangle, regardless of winding order, will flip the stencil value of the interior region. For Non Zero filling, clockwise triangles will increase and counterclockwise triangles will decrease the stencil value of the interior region. For both rules, outer region remain unaffected. (3) pass 2: render the bounding box area with stencil test enabled. Stencil pass condition is stencil value>0, regardless of the fill rule. Passing stencil values are then reset to zero (pass operation), hence leaving us with a fresh stencil buffer 40 of all zeros.

One example of filling may include the following flow: (1) load constant buffer with fill color and pivot point per path, (2) set appropriate stencil state (even-odd or non-zero), and (3) pass one draw call [4 Control Point Patch]. Passing one draw call may include using vertex shader 46 to transform vertices, using hull shader 48 [Domain: Isoline, Output Type: Line] to determine optimum tessellation level, or use fixed level tessellation, using domain shader 52 to compute tessellated vertices (position only), and using geometry shader 54 to connect the input lines to the pivot point coordinates from the constant buffer to create clockwise and counterclockwise triangles. In some examples, the pixel shader may be null.

An example may include a set to cover the stencil state. A second pass draw call may use a vertex shader 46 to bypass the output from the vertex shader (VS) 46. In this instance, the output from the VS 46 is same as the input, no operation is being done in the VS 46. The pixel shader may return fill color from the constant buffer. Additionally, vertex shader (VS) 46 may transform vertices using world, view and projection matrices. Hull shader (HS) 48 may determine tessellation level by using joins and caps, collapsed cubics and degenerate ellipses with 0.0f (Drop) and lines: 1.0f Note that a tessellation level of 0 indicates that primitive is dropped. For example, in some cases some caps/joins may be dropped. For line primitives, tessellation level=1 may be used. A line does not need to tessellated into a plurality of new lines.

In an example, the HS 48 performs a transform. For arcs, part of the vertex information are ellipse parameters to which it may be advantageous to avoid appling a transformation matrix. Some examples may calculate optimum tessellation level for cubics and elliptic arcs, or use fixed tessellation.

In some examples, the tessellation engine may be a Dx11 tessellator unit, with isoline domain, integer partitioning, line output. In an example, domain shader 52 [v may be ignored]. Domain shader 52 may evaluate tessellated vertices' locations for lines, cubics and elliptic arcs. For lines u is either 0.0f or 1.0f. In an example, the tessellator may output two domain-coordinates u and v. In some examples, coordinate v may be ignored and coordinate u may be used to tessellate our primitive. The coordinate u is the parametrization from 0.0 to 1.0. If the tessellation factor is n, u will be 0/n, 1/n, 2/n . . . n/n.

Endpoints may be outputted directly. For curves u will range from 0.0f to 1.0f, in equal increments depending on the tessellation level. For all u's, position will be found using the curve representation equation. For elliptic arcs u will range from 0.0f to 1.0f, in equal increments depending on the tessellation level. For all u's, positions will be found using the arc parametric representation. In an example, geometry shader 54 connects the input lines to the pivot point coordinates from the constant buffer to create triangles. Winding order will determine whether to increase or decrease stencil value for triangle coverage, in non-zero fill mode. In odd-even fill mode, triangle coverage will flip stencil values, regardless of the triangle winding. In an example, vertex shader 46 may be bypassed and the pixel shader may return fill color. One example 2-pass flow for filling is:

VS→HS→Tess→DS→GS
VS'→PS

If Target Independent Rendering (TIR) can be used to resolve stencil buffer 40 directly to the frame buffer, the need for the extra bypass vertex shader 46 may be eliminated. The bounding box calculation may no longer be needed at the pre-process stage. Additionally, an extra stencil state for the "cover" pass may not be needed because there will be no "cover" pass. In some examples this may increase filling performance. An example flow is as follows:

VS→HS→Tess→DS→GS→PS

Stroking of a path may include "widening" the edges of the path along a straight-line perpendicularly to the path. Some examples tessellate and evaluate the path, at each evaluated point we widen the point according to the normal at that point and create triangulation to form segments. The union of all segments is the stroke line.

An example algorithm for stroking a path is as follows, (1) tessellate the path into line segments with normal at endpoints, (2) if re-tessellation is enabled, re-tessellate the line segments where endpoint normals deviate too much in direction to create new line segments, (3) if dashing is enabled, cut line segments according to the dash pattern, (4) create caps at cut locations, tessellate round joins and caps, (5) create triangulation to represent stroke lines, caps and joins, (5) render triangles with depth test enabled.

An example flow is as follows (1) update constant buffer with stroke color, stroke width, miter limit, join rule, cap rule, dash pattern, inverse of round tessellation factor (may be constant), (2) enable depth testing, (3) first pass, (4) second pass. The first pass may be a draw call to vertex shader 46 to transform vertices, to hull shader 48 to convert collapsed cubics and degenerate ellipses to lines (no pre-processing) and determine optimum tessellation level, or use fixed level tessellation. In first pass domain shader 52 may determine tessellated vertices' locations and determine tessellated vertices' normals (converted to angle representation). Geometry shader 54 may stream out lines for second rendering pass. The pixel shader may not be used in some examples.

The second pass may be a draw call bypassing the using vertex shader 46 and using hull shader 48 to compute tessellator inputs for tessellation delta, segment length, inverse of length, and SV_PrimType. An example may use a modified tessellator to tessellate joins, cut/re-tessellate line segments, and create cap tessellations at cut locations. Domain shader 52, (SV_PrimType) may linear interpolate position and normal from original line segment/join and convert normal from angular form to coordinates. Geometry shader 54 may increase the width of line segments, create triangles for joins/caps. The pixel shader may return stroke color.

In an example, after the cell buffer contents are determined, if the filling rule is non-zero, take the absolute value of the contents and clamp every value to sample count. For odd-even filling, take the (2*sample count) modular of every value, and if a value is greater than the sample count, set it to be the distance from 2*sample count. This is illustrated in the code excerpt below:

```
for (int y=0; y<CELLBUFFER_SIZE; y++)
{
int total = 0;   for (int x=0; x<CELLBUFFER_SIZE; x++)
        {
            total += frame[y*CELLBUFFER_SIZE+x];
            if (fillMode == 'F') // Non Zero
                frame[y*CELLBUFFER_SIZE+x] = min(
SAMPLE_COUNT, abs(total) );
            else // if (fillMode == 'E') // Even odd
            {
                assert (fillMode == 'E');
                int value = abs(total) % (2*SAMPLE_COUNT);
                if (value > SAMPLE_COUNT)
                    value = 2*SAMPLE_COUNT - value;
                frame[y*CELLBUFFER_SIZE+x] = value;            }
        }
}
```

Unlike the similar odd-even rule, the non-zero winding rule relies on determining the direction of stroke for each part of the curve. For a given curve C and a given point P, the non-zero winding rule is determined as follows: (1) construct a straight line out from P in any direction towards infinity, (2) find all the intersections of C with this ray, and (3) score up the winding number. Scoring the winding number includes: (1) for every clockwise intersection (the curve passing through the ray from left to right, as viewed from P) subtract 1; (2) for every counter-clockwise intersection (curve passing from right to left, as viewed from P) add 1. If the total winding number is zero, P is outside C; otherwise, it is inside.

A simple, non-self-intersecting closed path divides the plane into two regions, a bounded inside region and an unbounded outside region. Note that knowing the orientation of the outermost path (i.e., clockwise or counter-clockwise) is not necessary to differentiate between the inside and outside regions.

A path that self-intersects, or that has multiple overlapping subpaths, requires additional information in order to define the inside region. Two rules that provide different definitions for the area enclosed by such paths, known as the non-zero and even/odd fill-rules, are supported by OpenVG. To determine whether any point in the plane is contained in the inside region, imagine drawing a line from that point out to infinity in any direction such that the line does not cross any vertex of the path. For each edge that is crossed by the line, add 1 to the counter if the edge crosses from left to right, as seen by an observer walking along the line towards infinity, and subtract 1 if the edge crosses from right to left. In this way, each region of the plane will receive an integer value.

The non-zero fill rule says that the point is inside the shape if the resulting sum is not equal to 0. The even/odd rule says that the point is inside the shape if the resulting sum is odd, regardless of sign (e.g., −7 is odd, 0 is even). Consider the star-shaped path shown in FIG. 8 below, indicated with solid lines. The orientation of the lines making up the path is indicated with arrows. An imaginary line to infinity starting in the central region of the star is shown as a dashed line pointing to the right. Two edges of the star cross the line to infinity going left to right, indicated by the downward-pointing arrows. The central region therefore has a count of +2. According to the even/odd rule, it is outside the path, whereas according to the non-zero rule it is inside. Implementations must be able to deal with paths having up to 255 crossings along any line. The behavior of more complex paths is undefined.

In one example, the algorithm for filling a path is as follows:
1. Tessellate the path into line segments
2. Rasterize and scan-fill using the cell buffer
3. Draw the bounding box of the path using fill color and the stencil from the cell buffer In an example of cell buffer rasterization, after the line segments are produced in domain shader 52, they are sent to the cell buffer. Stroking a path comprises "widening" the edges of the path using a straight-line "pen" held perpendicularly to the path. The path may then be tessellated and evaluated. At each evaluation point, the point may be widened according to the normal at that point. Triangulation may be used to form segments as discussed below with respect to FIG. 12. The union of all segments is the stroke line.

In one example, the algorithm for stroking a path is as follows:
1. Tessellate the path into line segments
2. Cut the line segments according to the dash pattern
3. Create the triangulation of the stroke and rasterize it To implement these methods in, for example, a DirectX11 pipeline architecture, or other similar 3D graphics pipelines, may be modified according to the techniques of this disclosure to include a number of extensions. For example, the DirectX11 pipeline may be modified to include a path primitive. The path primitive may allow the DirectX11 pipeline to process vector graphics by allowing for path rendering directly in a GPU implementing DirectX11 without using a separate CPU. For example, the path primitive may allow for filling, stroking, or both using the methods described herein.

In some examples, the GPU implements a DirectX11 application programming interfaces for handling graphics tasks. The GPU further implements a draw call function configured to process a number of indices and path segment types. The GPU may also further implement an information primitive type.

For the first pass, the CPU may place data indicative of a path segment to be rendered into one or more vertices of a vertex buffer. The primitive topology for the vertices in the vertex buffer may be, for example, a patch control list. For a line, the vertices in the patch control list may include data indicative of coordinates for the endpoints of the line (e.g., (x0, y0) and (x1, y1)). For a cubic Bézier curve, the vertices in the patch control list may include data indicative of the coordinates of the four control points that define the curve (e.g., (x0, y0), (x1, y1), (x2, y2), (x3, y3)). For a quadratic Bézier curve, the vertices in the patch control list may include data indicative of coordinates for three control points instead of four control points. For elliptic arcs, the vertices in the patch control list may include data indicative of an endpoint parameterization of the elliptic arc or data indicative of a center parameterization of the elliptic arc. The CPU may also place data indicative of the type of path to be rendered into an otherwise unused vertex coordinate.

One example of an input format for rendering path primitives will now be described. It should be understood that this is merely one example of how data indicative of a path to be rendered may be provided to the GPU and that other examples are possible and within the scope of this disclosure. In this example, the GPU receives each path segment as a four (4) control point patch list primitive. Each of the vertices (e.g., control points) in the path list, in this example, includes three (3) float vectors that define attributes for the respective vertex (e.g., control point).

For a line path segment, the input may take the following form or a similar form:
{XMFLOAT3(X0, Y0, 2.0f)},
{XMFLOAT3(X1, Y1, 1.0f)},
{XMFLOAT3(0.0f, 0.0f, 1.0f)},
{XMFLOAT3(0.0f, 0.0f, 1.0f)}, In this example, each line represents a vertex or control point of a four control point patch, and each parameter in the parentheses represents an attribute of a respective vertex or control point. The last attribute for the first control point, in this example, stores data indicative of the type of path to be rendered (i.e., "path type" or a "primitive type modifier"). Specifically, the primitive type modifier in this example is 2.0f, which means that the primitive is a line primitive (i.e., a line path segment). X0, Y0, X1, Y1 are the coordinates for the endpoints of the line where (X0, Y0) represents a first endpoint and (X1, Y1) represents a second endpoint. The remaining vertex information in this example is not used to represent actual data.

The input for a cubic Bézier path segment may take the following form or a similar form:
{XMFLOAT3(X0, Y0, 3.0f)},
{XMFLOAT3(X1, Y1, 1.0f)},
{XMFLOAT3(X2, Y2, 1.0f)},
{XMFLOAT3(X3, Y3, 1.0f)}, In this example, each line represents a vertex or control point of a four control point patch, and each parameter in the parentheses represents an attribute of a respective vertex or control point. The last attribute for the first control point, in this example, stores data indicative of the type of path to be rendered (i.e., "path type" or a "primitive type modifier"). Specifically, the primitive type modifier in this example is 3.0f, which means that the primitive is a cubic Bézier path segment. X0-X3 and Y0-Y3 are the coordinates of the control points for the cubic Bézier path segment where (X0, Y0) represents a first control point, (X1, Y1) represents a second control point, etc. The remaining vertex information in this example is not used to represent actual data. Similar input may be used for a quadratic Bézier path segment except that three control points may be provided instead of four control points, and the primitive type modifier may be different to distinguish the primitive from a cubic Bézier path segment.

The input for an elliptic arc path segment may take the following form or a similar form:

{XMFLOAT3(X0, Y0, 4.0f)},
{XMFLOAT3(X1, Y1, 1.0f)},
{XMFLOAT3(rH, rV, 1.0f)},
{XMFLOAT3(angle, 0.0f, 1.0f)}, In this example, each line represents a vertex or control point of a four control point patch, and each parameter in the parentheses represents an attribute of a respective vertex or control point. The last attribute for the first control point, in this example, stores data indicative of the type of path to be rendered (i.e., "path type" or a "primitive type modifier"). The primitive type modifier, in this example, may be any of 4.0, 4.1, 4.2 or 4.3 corresponding, respectively, to a large clockwise (LCW) elliptic arc, a large counter-clockwise (LCCW) arc, a small clockwise (SCW) elliptic arc, and a small counter-clockwise (SCCW) elliptic arc. X0, X1 and Y0, Y1 are endpoint coordinates where (X0, Y0) represents a first endpoint and (X1, Y1) represents a second endpoint, rH and rV represent horizontal and vertical radii, respectively, and angle represents the rotation angle of the elliptic arc.

In some examples, stroking operations may use 3 additional fields on the vertex input to handle endcaps, joins and open paths. For example, certain vertex coordinates may store data indicative of whether the path segment is the beginning of a new open path, the end of an open path, and whether the primitive may be dropped. The following is an example template that includes the above-described vertex coordinates:

{XMFLOAT3(X0, Y0, 2.0f)},
{XMFLOAT3(X1, Y1, 2.0f)},
{XMFLOAT3(0.0f, 0.0f, 2.0f)},
{XMFLOAT3(0.0f, 0.0f, 2.0f)},

In this template, a 2.0f on the z coordinate (i.e. third coordinate or attribute) of the second vertex indicates that the path segment is the beginning of a new open path and may signal to the GPU to put a startcap at the beginning of the path segment. A 2.0f on the z coordinate of the third vertex indicates that the path segment is the ending of an open path and may signal to the GPU to put an endcap at the end of the path segment. A 2.0f on the z coordinate of the last vertex indicates that the current primitive is to be dropped (e.g., it is the closing line of an open path).

The input assembler 44 obtains the vertices from the vertex buffer and passes the vertices to vertex shader stage 46 for processing. In some examples, vertex shader stage 46 may execute a "pass-through" shader program that simply outputs the input vertex for each instance of the shader program. In an example, vertex shader stage 46 may transform vertices using world, view and projection matrices.

Tessellator stages 62 (i.e., hull shader 48, tessellator 50, and domain shader stages 52) may tessellate the path segment defined by the input data into a plurality of line segments. The plurality of line segments may approximate the curvature of the path to be rendered. In general, tessellator 50 may determine values at which one or more parametric equations that represent a particular type of path segment should be evaluated. Domain shader 52 may evaluate the parametric equations at the values determined by tessellator 50, and output a vertex for each evaluation. Some examples may use a Dx11 tessellator unit, with isoline domain, integer partitioning, line output. Tessellator 50 may cut the line segment according to the dash pattern and re-tessellation delta, using u coordinates. It may then create caps at every cut location using v coordinates and set the type to be cap or line segment.

Domain shader 52 may output the vertices in an ordered sequence where each set of adjacent vertices represents a tessellated line segment. The line segments may collectively approximate the path segment that was defined in the vertex buffer. For example, domain shader 52 may output the following set of vertices {0, 1, 2, 3, 4, 5} that define the following line segments: {0, 1}, {1, 2}, {2, 3}, {3, 4}, {4, 5}.

In some examples, tessellator processing stage 50 and domain shader processing stage 52 may be configured to uniformly tessellate a path segment into a plurality of line segments according to the following technique. Specifically, tessellator unit 50 may output coordinates for parametric evaluation (e.g., t=0/T, 1/T, 2/T . . . T/T, where T is the tessellation factor). Depending on the type of primitive, domain shader 52 may evaluate one or more parametric equations at the values that are output by tessellator 50.

In another example, domain shader 52 may evaluate tessellated vertices' locations and normals for lines, cubics and elliptic arcs. Domain shader 52 may also convert normals to angular form and mark output as line segment. For lines: u is either 0.0f or 1.0f. Endpoints may be outputted directly. For normal, i.e. lines meeting perpendicularly, both will be found from endpoints difference and will be the same. Curves: u will range from 0.0f to 1.0f, in equal increments depending on the tessellation level. For all u's, position will be found using the curve representation equation. For u=0.0f or 1.0f, normals will be found by control point differences (repeated control points will be checked); for other u values, normals will be found by the derivative of the curve equation.

Elliptic arcs: u will range from 0.0f to 1.0f, in equal increments depending on the tessellation level. For all u's, positions and normals will be found using the arc parametric representation and its derivative, respectively. For linear interpolation the normal angle for cap and joins, convert back to Cartesian representation. Mark output as cap or join as appropriately. Round caps/joins: u will range from 0.0f to 1.0f, in equal increments depending on the round tessellation level. Position will be the same for all u values. When u=0.0f or 1.0f, we take the Cartesian representation of the endpoint tangents to calculate normals. For other u values, angular tangents will be lerped to find new tangents, and then converted to normals. Other caps/joins, u will be 0.0f or 1.0f. Position will be the same both. We take the Cartesian representation of the endpoint tangents to calculate normals.

Another domain shader (DS'), not shown, may provide for dashes and cusps in a line segment. Linear interpretation of normals and positions at tessellation locations. Domain shader 58 may convert normals from angular form back to Cartesian form. In an example, u of a line from point u to point v may be used to linear interpolate position and normal angle. The point v may be used to rotate the normal angle (used to create round caps). If no dashing and re-tessellation is required, one can use the following one-rendering pass flow:
VS→HS→Tess→DS→GS→PS If dashing or re-tessellation is desired, the following 2-pass flow will need to be used:
VS→HS→MTess→DS→Streamout (Existing tessellator is enough here).

Draw Auto→HS'→MTess→DS'→GS→PS

In such an example, only two additional shaders (marked with an apostrophe) are required, on top of the minor tessellator hardware addition.

For a line, T may, in some examples, be always equal to 1. In such examples, domain shader 52 may not necessarily need to perform any evaluation to generate vertices that correspond to the line path segment.

For a cubic Bézier curve, domain shader stage may evaluate the curve and generate output vertices according to the following parametric equation:

$$C0*(1-t)^3 + C1*3*(1-t)^2*t + C2*3*(1-t)*t^2 + C3*t^3$$

where C0, C1, C2, C3 correspond to the control points for the cubic Bézier curve, and t corresponds to the coordinates provided by domain shader 52 to be used for performing parametric evaluation.

Alternatively, for the cubic Bézier curve, domain shader stage 52 may evaluate the curve and generate output vertices according to the following parametric equations:

$$X0*(1-t)^3 + X1*3*(1-t)^2*t + X2*3*(1-t)*t^2 + X3*t^3$$

$$Y0*(1-t)^3 + Y1*3*(1-t)^2*t + Y2*3*(1-t)*t^2 + Y3*t^3$$

where (X0, Y0), (X1, Y1), (X2, Y2), (X3, Y3) correspond to the control points for the cubic Bézier curve, and t corresponds to the coordinates provided by domain shader 52 to be used for performing parametric evaluation.

For a quadratic Bézier curve, domain shader stage 52 may evaluate the curve and generate output vertices according to the following parametric equation:

$$C0*(1-t)^2 + C1*2*(1-t)*t + C2*t^2$$

where C0, C1, C2 correspond to the control points for the quadratic Bézier curve, and t corresponds to the coordinates provided by domain shader 52 to be used for performing parametric evaluation.

Alternatively, for the quadratic Bézier curve, domain shader stage 52 may evaluate the curve and generate output vertices according to the following parametric equations:

$$X0*(1-t)^2 + X1*(1-t)*t + X2*t^2$$

$$Y0*(1-t)^2 + Y1*(1-t)*t + Y2*t^2$$

where (X0, Y0), (X1, Y1), (X2, Y2) correspond to control points for the quadratic Bézier curve, and t corresponds to the coordinates provided by domain shader 52 to be used for performing parametric evaluation.

For an elliptic arc path segment, domain shader 52 stage may evaluate the curve and generate output vertices according to the following parametric equations:

$$x = \text{Center}_x + rh\ \text{Cos}*\cos(\text{angle}_t) - rv\ \text{Sin}*\sin(\text{angle}_t)$$

$$y = \text{Center}_y + rh\ \text{Sin}*\cos(\text{angle}_t) + rv\ \text{Cos}*\sin(\text{angle}_t)$$

where the parameterization angle $\text{angle}_t$ is determined from tessellator output t, where rh represents the horizontal radius of the unrotated ellipse, rv represents the vertical radius of the unrotated ellipse, rv Cos, rv Sin, rh Cos and rh Sin represent rv*Cos(angle), rv*Sin(angle), rh*Cos(angle) and rh*Sin(angle), respectively, and angle represents the counter-clockwise angle of the ellipse relative to the x axis measured prior to scaling by (rh, rv). In some examples, hull shader 48 stage may be configured to determine (e.g., precompute) cos (angle) and sin(angle) and/or to determine (e.g., precompute) the rv Cos, rv Sin, rh Cos and rh Sin values, and to provide these values to the domain shader stage 52 for use in evaluating the above-recited parametric equations for ellipses.

As discussed above with respect to elliptic arcs, the vertices in the patch control list, in some examples, may include data indicative of an endpoint parameterization. In such examples, a hull shader program 48 executing on a shader unit of the GPU 12 may be used to convert the data indicative of an endpoint parameterization of the elliptic arc to a data indicative of a center parameterization of the elliptic arc.

In an example, another hull shader program (HS'), not shown, may be added and may save an angular representations of round join and cap tangents into primitive data and determine tessellation level. For lines, non-round joins and caps, collapsed cubics and degenerate ellipses: 1.0f, calculate optimum tessellation level for cubics and elliptic arcs, or use fixed tessellation, and calculate optimum tessellation level for round joins and caps, or use fixed tessellation. Hull shader program 48 may compute tessellator inputs such as segment length, re-tessellation delta, inverse of length. In an example, segment length is the length of the line segment. Re-tessellation delta is the length of the line segment divided by re-tessellation amount. The maximum length of a line segment to come out of tessellator. Inverse of length is 1.0f/Segment Length.

An example technique for finding the correct center of an ellipse when converting an endpoint parameterization of an elliptic arc to a center parameterization of the elliptic arc is now described. The example technique may determine a center point (cx, cy) and the initial and final angles θ1 and θ2 of an ellipse and/or elliptic arc based on an endpoint representation of an ellipse defined by the set of parameters (x0, y0), (x1, y1), rh, rv, φ, $f_S$, and $f_A$. An ellipse with center point (cx, cy), radii rh and rv, and rotation angle rot may satisfy the implicit equation $(x')^2 + (y')^2 = 1$, where $x' = ((x-cx)*\cos(rot) + (y-cy)*\sin(rot))/rh$ and $y' = (-(x-cx)*\sin(rot) + (y-cy)*\cos(rot))/rv$. The transformation from (x, y) to (x', y') maps the desired ellipse into a unit circle centered at the origin.

To determine the center points of the pair of ellipses with common radii and rotation angle that pass through the two given points $(x_0, y_0)$ and $(x_1, y_1)$, a plane is first transformed into a suitably scaled and rotated coordinate system such that the equation of each ellipse becomes $(x'-cx')^2 + (y'-cy')^2 = 1$. Then the centers (i.e., $(cx_0', cy_0')$ and $(cx_1', cy_1')$) of the two unit circles whose circumferences pass through two given points may be found. Finally, the center points are placed through an inverse transformation to obtain solutions in the original coordinate system.

The center points of the two unit circles that pass through points $(x_0, y_0)$ and $(x_1, y_1)$ are given by $(x_m \pm \Delta y*d, y_m \mp \Delta x*d)$, where $x_m = (x_0+x_1)/2$, $y_m = (y_0+y_1)/2$, $\Delta x = (x_0-x_1)$, $\Delta y = (y_0-y_1)$, and $d = \sqrt{(1/(\Delta x^2+\Delta y^2) - 1/4)}$. If d is infinite or imaginary, no solution exists due to the input points being coincident or too far apart, respectively. The angles θ1 and θ2 may be found by finding the slope of the endpoints on the circle and computing arctangents.

The following pseudo-code illustrates the process of computing ellipse centers according to the above-described technique. The findUnitCircles function is called by findEllipses following inverse transformation of the original ellipse parameters.

```
/* Given: Points (x0, y0) and (x1, y1)
 * Return: TRUE if a solution exists, FALSE otherwise
 * Circle centers are written to (cx0, cy0) and (cx1, cy1)
 */
static VGboolean findUnitCircles(double x0, double y0,
                double x1, double y1,
                double *cx0, double *cy0,
                double *cx1, double *cy1)
{
    /* Compute differences and averages */
    double dx = x0 - x1;
    double dy = y0 - y1;
```

-continued

```
    double xm = (x0 + x1)/2;
    double ym = (y0 + y1)/2;
    double dsq, disc, s, sdx, sdy;
    /* Solve for intersecting unit circles */
    dsq = dx*dx + dy*dy;
    if (dsq == 0.0) return VG_FALSE; /* Points are coincident */
    disc = 1.0/dsq - 1.0/4.0;
    if (disc < 0.0) return VG_FALSE; /* Points are too far apart */
    s = sqrt(disc);
    sdx = s*dx;
    sdy = s*dy;
    *cx0 = xm + sdy;
    *cy0 = ym - sdx;
    *cx1 = xm - sdy;
    *cy1 = ym + sdx;
    return VG_TRUE;
}
/* Given: Ellipse parameters rh, rv, rot (in degrees),
* endpoints (x0, y0) and (x1, y1)
* Return: TRUE if a solution exists, FALSE otherwise
* Ellipse centers are written to (cx0, cy0) and (cx1, cy1)
*/
VGboolean findEllipses(double rh, double rv, double rot,
            double x0, double y0, double x1, double y1,
            double *cx0, double *cy0, double *cx1, double *cy1)
{
    double COS, SIN, x0p, y0p, x1p, y1p, pcx0, pcy0, pcx1, pcy1;
    /* Convert rotation angle from degrees to radians */
    rot *= M_PI/180.0;
    /* Pre-compute rotation matrix entries */
    COS = cos(rot); SIN = sin(rot);
    /* Transform (x0, y0) and (x1, y1) into unit space */
    /* using (inverse) rotate, followed by (inverse) scale */
    x0p = (x0*COS + y0*SIN)/rh;
    y0p = (-x0*SIN + y0*COS)/rv;
    x1p = (x1*COS + y1*SIN)/rh;
    y1p = (-x1*SIN + y1*COS)/rv;
    if (!findUnitCircles(x0p, y0p, x1p, y1p,
        &pcx0, &pcy0, &pcx1, &pcy1)) {
            return VG_FALSE;
    }
    /* Transform back to original coordinate space */
    /* using (forward) scale followed by (forward) rotate */
    pcx0 *= rh; pcy0 *= rv;
    pcx1 *= rh; pcy1 *= rv;
    *cx0 = pcx0*COS - pcy0*SIN;
    *cy0 = pcx0*SIN + pcy0*COS;
    *cx1 = pcx1*COS - pcy1*SIN;
    *cy1 = pcx1*SIN + pcy1*COS;
    return VG_TRUE;
}
```

Further details regarding converting an endpoint parameterization of an elliptic arc to a center parameterization of the elliptic arc may be found in the "OpenVG Specification, Version 1.1," Dec. 3, 2008, available at: http://www.khronos.org/registry/vg/specs/openvg-1.1.pdf, the entire content of which is incorporated herein by reference. In particular, Section 18.4 of the OpenVG specification describes a technique for converting an endpoint parameterization of an elliptic arc to a center parameterization of the elliptic arc, incorporated herein by reference Geometry shader 54 may be invoked once for each of the line segments produced by the domain shader 52. For each line segment, geometry shader 54 may generate a triangle primitive using a common control point as a first vertex of the triangle and using the two endpoints of the respective line segment as the second and third vertices of the triangle. For example, an example was provided above where the domain shader 52 generated the following set of vertices {0, 1, 2, 3, 4, 5} that define the following line segments: {0, 1}, {1, 2}, {2, 3}, {3, 4}, {4, 5}. For the above-listed sequence of line segments, geometry shader may generate the following triangles: {C, 0, 1}, {C, 1, 2}, {C, 2, 3}, {C, 3, 4}, {C, 4, 5}, {C, 4, 5} where C is any single vertex.

In an example geometry shader 54 may increase the width of a line type segments in both normal directions at endpoints to create stroke area. In some cases this may result in a quad, for which we output two triangles. In some other cases, where the curvature is high compared to line length and/or stroke width is thick, a "butterfly" may result. Butterflies require two triangles, but there may be rare bleeding issue due to t-joints. To eliminate t-joints, an extra teo triangles may be output, which can be packed into 8 vertices using triangle strip primitive type. It is an extremely rare phenomenon, so it is up to the programmer to use whether two triangle (maxvertices: 6) or 4-triangle (maxvertices: 8) approach. An example may (1) create one triangle for round caps/joins (tessellated) and bevel joins, (2) create two triangles for square caps and miter joins, and (3) add z coordinate from the constant buffer to every output vertex.

In an example of preprocessing the path and packing of the vertex data may perform minimal preprocessing of path data prior to rendering. In some examples, preprocessing happens only once per path, and the result is not affected by world/user/perspective transformations. Preprocessing can be avoided, and an alternative solution without pre-processing is explained in the next section.

An example may iterate through all the vertices of a path, tracking the total, maximum and minimum values of vertices' x and y coordinates. The average of all vertices (centroid) will be used as the pivot point when performing filling. In some examples, the centroid of all vertices of a path is a good pivot point. The maximum and minimum coordinates define the bounding box for our path. This bounding box speeds up the filling process dramatically. Although not a very tight one, this is the quickest way to find a bounding box for a path. Some examples may implement different bounding boxes (or any other shape) algorithm depending on the needs of particular systems.

An example may convert elliptic arcs from endpoint representation to parametric representation. One way to represent an arc is the endpoint representation: Endpoints, radii and the rotation angle of the ellipse are defined. This representation may need to be converted to parametric representation before sending path data to GPU. The example may also need to find tangents at endpoints to find joins and caps corresponding to these locations. Hence, to be able to preprocess joins and caps, elliptic arcs need to be pre-processed as well. Some examples may create starting and ending Caps for open paths and Joins where path segments meet. Endpoint tangents need to be calculated to create cap and join primitives. Example systems may avoid finding starting and ending caps, and they can be handled when we are handling dashing. This may negligibly increase the modified tessellator unit size.

An example may pack the data into the format that will be understood by our DX11 program, and create the vertex buffers per path. This means embedding the primitive type (line, quadratic curve, cubic curve, elliptic arc, cap/join) into the first vertices z coordinate. Every primitive is a 4 control point patch, regardless of whether all 4 control points are used or not. Below is an example line primitive packed into a 4 control point patch. Note the z coordinate of the first vertex defining the primitive type:

```
// line = 2.0f
{ XMFLOAT3( -0.4f, 0.8f, 2.0f) }, // start point
    { XMFLOAT3( 0.4f, 0.8f, 1.0f) }, // end point
    { XMFLOAT3( 0.0f, 0.0f, 1.0f) },
    { XMFLOAT3( 0.0f, 0.0f, 1.0f) },
```

Every primitive may be conditioned to be unique even though they share vertices between adjacent primitives. Hence it is strictly patch-4 primitive type which results in no vertex reuse. The dash pattern may need to be pre-processed for stroke paths. The system may handle negative and zero dash pattern entries, remove last entry for odd number of entries, find the current dash pattern entry and how much dash is left based on the dash offset. Sometimes, although a dash pattern may be defined; there is no dashing (all zero entries, or a single entry in dash pattern). This pre-process may allow for the determination of such cases and skip dashing. Below is an example dash pattern and offset combination that shows the dash pattern pre-processing steps.

Dash Pattern: [10, 0, 20, −5, 8, 10, 15]
Offset: −120

The above dash pattern has 7 entries. We remove the last entry to have a dash pattern with even number of entries:

Dash Pattern: [10, 0, 20, −5, 8, 10,]
Offset: −120

We take the absolute value of the negative entries, and zero entries are removed by adding the following entry to the previous entry:

Dash Pattern: [30, +5, 8, 10]
Offset: −120

An example system may compute the dash pattern length, which is 53 and add 53 to the negative offset value until we reach an offset greater than or equal to 0. The offset then becomes −120+53+53+53=39. Now the example system may find what entry it points to. First entry is 30, which is less than the offset value 39. The example system may advance to the next entry and subtract 30 from the offset. New offset is 39−30=9. Current entry is 5, which is again less than the offset value 9. The example system may advance to the next entry and subtract 5 from the offset. New offset is 9−5=4. Current entry 8 is greater than the offset value 4. The offset may be subtracted from the current entry, which gives us the value 8−4=4. The index for the entry whose value is 8 becomes the "dash index", and the remainder value of 4 on that entry becomes the "dash left". Hence, the result of the pre-processing is as follows:

Dash Pattern: [30, 5, 8, 10]
Dash Index: 2 (pointing to the entry valued 8)
Dash Left: 4.

Figure 4:
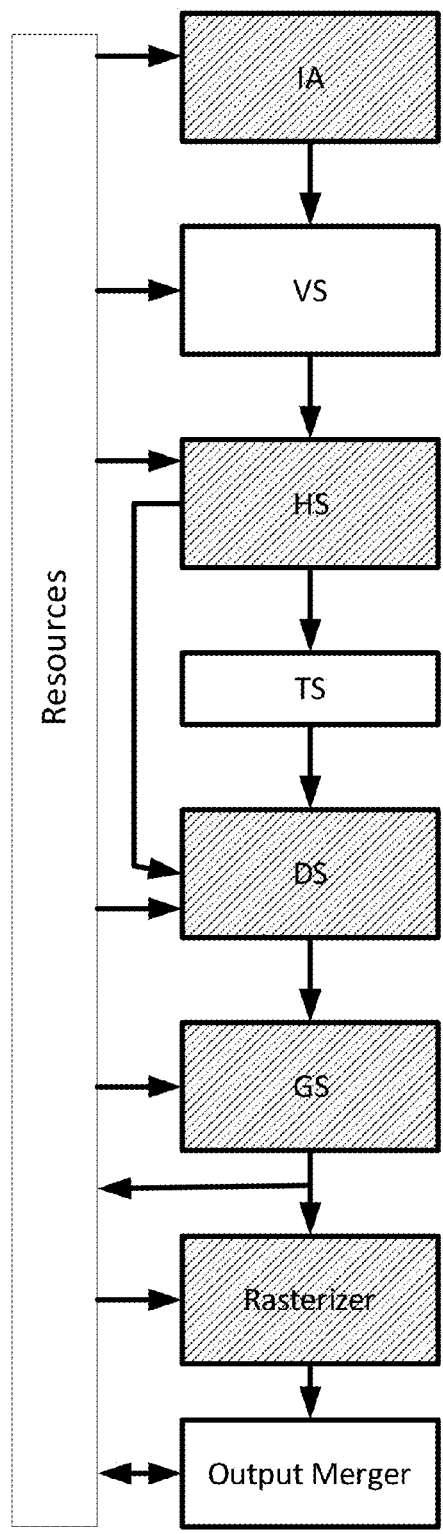
FIG. 4 is a block diagram illustrating an example graphics pipeline using tessellation in accordance with one or more examples described in this disclosure.

The rasterizer 56 may rasterize each of the triangles into a cell buffer (e.g., a buffer stored in the resources block of FIG. 3). During the first pass, the pixel shader 58 may be disabled or set to a "pass-through" mode to pass input pixels directly to the output merger stage 60. The output merger stage 60 may be configured to populate stencil buffer 40 such that stencil buffer 40 stores values which are indicative of a fill area for the path segment according to one or more stencil buffer filling techniques. In various examples, in accordance with this disclosure, a cell buffer might be used rather than stencil buffer 40, as illustrated in FIG. 4. Generally, if a stencil buffer 40 is used a second rendering pass with bounding box to render the path fill using stencil data may be needed. In some examples, using a cell buffer may allow for a single pass solution, rather than a solution requiring multiple passes. In some examples, a cell buffer may be a dedicated hardware unit that may allow for 1-pass rendering. The cell buffer may be part of the rasterizer 56 in some examples. In an example, pixel shader 58 may return stroke color.

According to a first stencil buffer filling technique, for each of the rasterized primitives, the output merger stage may invert the values in stencil buffer 40 that correspond to pixels which are covered by the rasterized primitive. With this technique, after all of the primitives have been rasterized to stencil buffer 40, any inverted values in stencil buffer 40 may represent a fill area for the path segment to be rendered.

According to a second stencil buffer filling technique, for each of the rasterized primitives, the output merger stage may increment values in stencil buffer 40 that correspond to pixels which are covered by the rasterized primitive if a vertex order for the rasterized primitive is oriented in a clockwise direction, and decrement values in stencil buffer 40 that correspond to pixels which are covered by the rasterized primitive if a vertex order for the rasterized primitive is oriented in a counter-clockwise direction. With this technique, after all of the primitives have been rasterized to stencil buffer 40, any non-zero values in stencil buffer 40 may represent a fill area for the path segment to be rendered.

FIG. 4 is a block diagram illustrating an example graphics pipeline modified to perform path rendering accordance with one or more examples described in this disclosure. Functional blocks that may be modified to perform path rendering accordance with one or more examples described in this disclosure are indicated with a cross-hatch pattern. In an example, a DirectX11 or other architecture may include an extended graphics pipeline to support a new "path" primitive type. This path primitive type along with other shader stages in 3D API may enable stroking and/or filling of paths completely within GPU, thus offloading the CPU. In some examples this may be a low power solution because some graphics processor unit shaders may be more power efficient than a CPU. These may also allow programmable path rendering using the end cap types, joint rules and primitive type described herein.

The DirectX11 pipeline may include a draw call that includes a number of indices and a number of path segment types. Indices may be used to, for example, fetch the control points, in the same way as a vertex buffer. The draw call may, for example, fetch both indices and path segment types. Path segment types may include line, quadratic curve, cubic curve, arc, etc. In some examples primitives may be added to allow for computing the tessellation level, e.g., in the hardware shader. Additionally, in some examples an information primitive type, also referred to as a generating primitive type, may be added to allow for the production of triangles (for strokes) and lines (for fill) in, for example, geometry shader 54.

Accordingly, hardware in a GPU implementing DirectX11 and the systems and methods described herein may include hardware to process the path and information primitive types. Additionally, a cell buffer may be added to the GPU implementing the DirectX11 architecture. In an example, the cell buffer may be a sixteen by sixteen grid of sub-pixels.

Figure 5:
FIG. 5 is a diagram illustrating an example of stroking, which may include widening a line by thickening the line in two directions perpendicular to the line in accordance with one or more examples described in this disclosure.

FIG. 5 is a diagram illustrating an example of stroking, which may include widening a line by thickening the line in two directions perpendicular to the line in accordance with one or more examples described in this disclosure. For example, the illustrated path segment of FIG. 5 is a line. Stroking the line can include widening the line by thickening the line, e.g., by a stroke width "w," in two directions perpendicular to the line.

Figure 6:
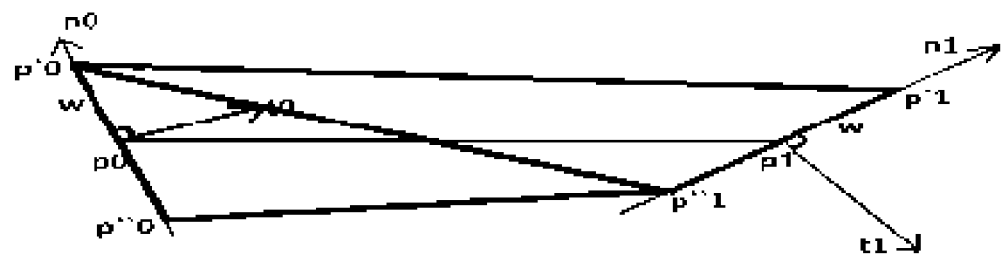
FIG. 6 is a diagram illustrating an example of stroking, in which a pair of triangle strips may be positioned to widen at least one of the line segments in accordance with one or more examples described in this disclosure.

FIG. 6 is a diagram illustrating an example of stroking, in which a pair of triangle strips may be positioned to widen at least one of the line segments in accordance with one or more examples described in this disclosure. In the illustrated example of FIG. 6 the path segment is a curve. The curve may be split into line segments. A stroke width may be determined and a pair of triangle strips may be positioned to widen at least one of the line segments, as is illustrated in FIG. 6. A given line segment may include points p0, p1 and normalized tangent vectors t0, t1 at those points. The variable "w" is the stroke width, as illustrated in both FIGS. 5 and 6. To find p' and p" points, create trianglestrip (p"0, p'0, p"1, p'1). First find n0 and n1 by the following equations:

$$n0 \cdot xy = (t0 \cdot y, -t0 \cdot x) \text{ and } n1 \cdot xy = (t1 \cdot y, -t0 \cdot x)$$

Then $$p'0/p"0 = p0 +/- w*n0 \text{ and}$$

$$p'1/p"1 = p1 +/- w*n1$$

To find p' and p" points, create trianglestrip (p"0,p'0,p"1, p'1).

First find n0 and n1 by the following equations:

$$n0 \cdot xy = (t0 \cdot y, -t0 \cdot x) \text{ and } n1 \cdot xy = (t1 \cdot y, -t0 \cdot x)$$

Then $$p'0/p"0 = p0 +/- w*n0 \text{ and}$$

$$p'1/p"1 = p1 +/- w*n1$$

Figure 7:
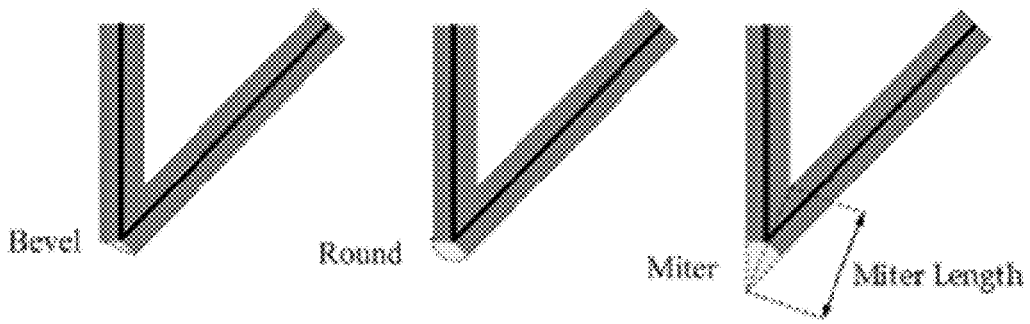
FIG. 7 is a diagram illustrating an example of joining path segments as a bevel, round, or miter in accordance with one or more examples described in this disclosure.

FIG. 7 is a diagram illustrating an example of joining path segments as a bevel, round, or miter in accordance with one or more examples described in this disclosure. Joins are applied where path segments meet. The systems and methods described herein may process joins between two path segments in a number of ways. For example, path segments may be joined as a bevel, round, or miter as illustrated in FIG. 7.

Figure 8:
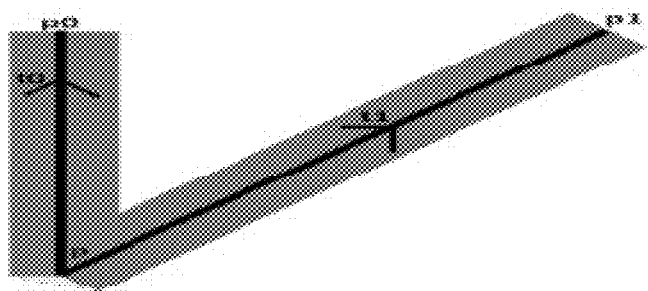
FIG. 8 is a diagram illustrating an example of joining path segments as a bevel in accordance with one or more examples described in this disclosure.

FIG. 8 is a diagram illustrating an example of joining path segments as a bevel in accordance with one or more examples described in this disclosure. Inputs for processing a joint may include p0, p1, p and join type. The inputs p0, p1, and p for a bevel are illustrated in FIG. 8. Tangents may then be calculated as t0=p0−p, t1=p1−p. These tangents may then be normalized.

For a bevel triangle, (p'0, p, p' 1) may be created as illustrated in FIG. 8.

$$n0 = (t0 \cdot y, -t0 \cdot x)$$

$$n1 = -t1 \cdot y, t1 \cdot x)$$

$$p'0 = w*n0 + p$$

$$p'1 = w*n1 + p$$

Figure 9:
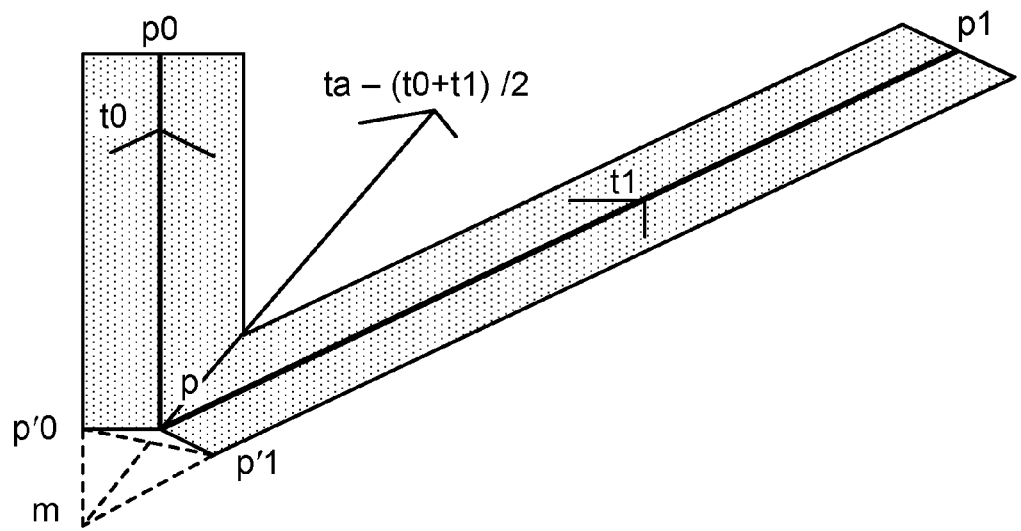
FIG. 9 is a diagram illustrating an example of joining path segments as a miter in accordance with one or more examples described in this disclosure.

FIG. 9 is a diagram illustrating an example of joining path segments as a miter in accordance with one or more examples described in this disclosure. For a miter triangle, (p'0, p, p'1) and (m, p'0, p'1) may be created as illustrated in FIG. 9.

Find p'0 and p'1 as in bevel join.

Find ta=(t0+t1)/2

$$f = ta \cdot x2 + ta \cdot y2$$

$$c = -w/\text{sqrt}(f - f2)$$

$$m = c*ta + p$$

Figure 10:
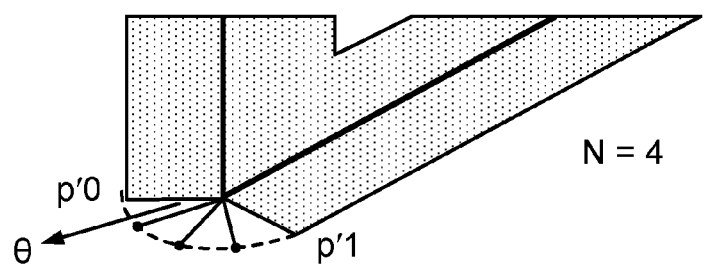
FIG. 10 is a diagram illustrating an example of joining path segments as a round in accordance with one or more examples described in this disclosure.

FIG. 10 is a diagram illustrating an example of joining path segments as a round in accordance with one or more examples described in this disclosure. A rounded end is illustrated in FIG. 10. N=number of segments.

$$\theta = a \cos(\text{dot}(t0, -t1))/N$$

$$\text{start} = n0*w$$

For i=1 ... N
If (i==N)
    end=$n1*w$(for water tightness)
Else
    end·x=start·x*cos θ−start·y*sin θ
    end·y=start·x*sin θ+start·y*cos θ
    Triangle(start+p,end+p,p)

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 11:
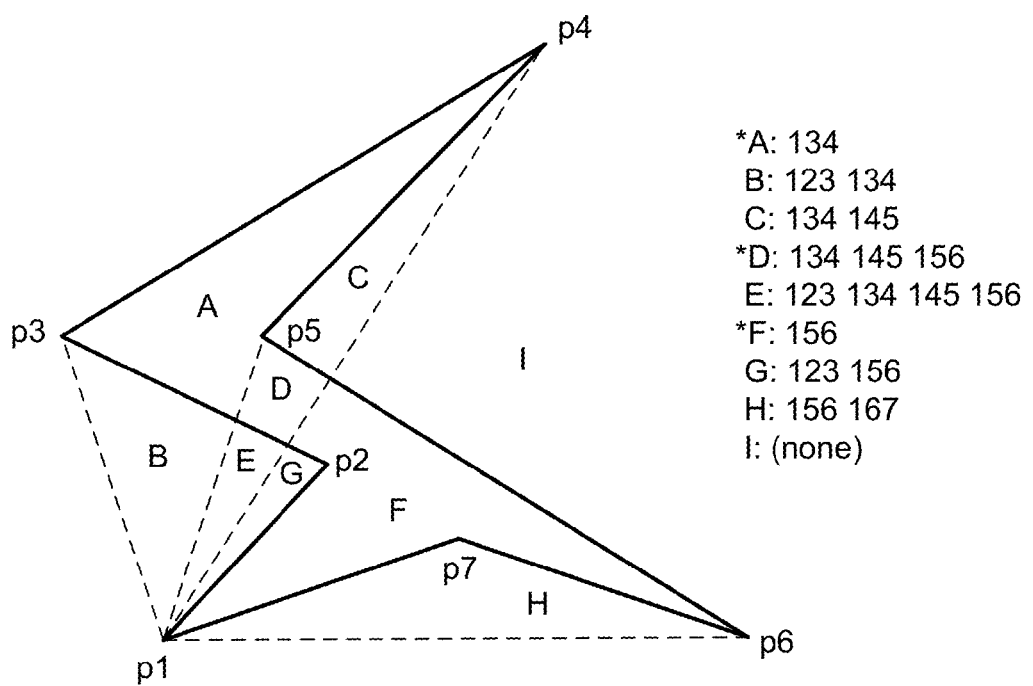
FIG. 11 is a conceptual diagram illustrating an example polygon to be filled using the path filling techniques of this disclosure.

FIG. 11 is a conceptual diagram illustrating an example polygon to be filled using the path filling techniques of this disclosure. The polygon may represent, in some examples, a path and/or a path segment to be filled. In some examples, a two-pass filling algorithm may be performed with respect to the plurality of connected line segments (p0p1, p1p2, p2,p3, etc.) illustrated in FIG. 11 as follows:

Pass 1
1. Clear the stencil buffer and disable writing into the color buffer. Pick an arbitrary point C
2. Break the boundary of the Polygon into sequence of directed line segments p0p1,p1p$^2$, ...
3. Construct a triangle fan center at C: Cp0p1, Cp1p2, Cp2p3 ...
4. Draw every triangle and set the stencil operation to be INVERT(EVEN/ODD) or INCR(NOZERO)

Pass 2
1. Draw a big quad/triangle covering the whole screen and draw to the pixels where stencil value is not zero.

In some examples, point p1 illustrated in FIG. 11 may be selected as the common point (C) for generating a triangle fan, and a triangle fan may be generated that includes the following triangles: {p1, p2, p3}, {p1, p3, p4}, {p1, p4, p5}, {p1, p5, p6}, {p1, p6, p7}. The target fill region for the path illustrated in FIG. 11 is the union of regions A, D and F.

As illustrated in FIG. 11, regions A, D and F are the only regions that are within an odd number of the triangles formed by the triangle fan. Thus, if these triangles are rendered according to the first stencil buffer filling technique where the values in stencil buffer 40 that correspond to pixels which are covered by the rasterized primitive are inverted, then, after all of the primitives have been rasterized to stencil buffer 40, any inverted values in stencil buffer 40 may correspond to the union of regions A, D and F (i.e., the fill area for the path segment to be rendered).

In addition, regions A, D and F are the only regions that are within an unbalanced number of clockwise and counter-clockwise triangles formed by the triangle fan. Regions that are within an unbalanced number of clockwise and counter-clockwise triangles may refer to regions where the total number of triangles of which the region is inside is not equal to the total number of triangles of which the region is outside. Thus, if these triangles are rendered according to the second stencil buffer filling technique where the values in stencil buffer 40 are either incremented or decremented depending on whether the triangle is oriented in a clockwise or counter-clockwise direction, then after all of the primitives have been rasterized to stencil buffer 40, any non-zero values in stencil buffer 40 may correspond to the union of regions A, D and F (i.e., the fill area for the path segment to be rendered).

Further details regarding the use of a stencil buffer 40 to fill a polygon may be found in the "OpenGL Programming Guide: The Official Guide to Learning OpenGL, Version 1.1," available at: http://www.glprogramming.com/red/chapter14.html#name13, the entire contents of which is incorporated herein by reference.

The first pass completes after rendering all of the primitives generated by geometry shader 54 into stencil buffer 40. During the second pass, a bounding box (e.g., formed from two triangle primitives) that encompasses the fill area is rendered into a render target (e.g., the frame buffer) with the stencil test enabled. The data in stencil buffer 40 may cause pixels inside of the fill area to light up with a fill color (specified by the CPU prior to the second rendering pass), and cause pixels that are outside of the fill area to remain dark. During the second pass, the tessellation stages and geometry shader 54 may be disabled. The vertex shader may be configured to perform standard vertex shader operations (e.g., transforms) for rendering 3D graphics primitives. The pixel shader may be configured to perform standard operations and/or configured to operate in a "pass-through" mode. Once the second pass is complete, the render target (e.g., the frame buffer) may store a rasterized version of the fill area for the path segment.

The stroking operation may utilize a single-pass approach that may generally involve the following steps:
1. Tessellate a path segment into a plurality of line segments.
2. Calculate normals for the endpoints of the line segments.
3. Determine a stroke area by widening the line segments using the normals.
4. Generate primitives corresponding to the stroke area.
5. Render the primitives to a render target with depth test enabled.

The input processing and tessellation operations are substantially similar to the input processing and tessellation operations described with respect to the filling operation, and therefore will not be described in further detail.

In addition to domain shader 52 evaluating parametric equations to generate vertices, as described above with respect the filling operation, domain shader 52 may also generate normals for the endpoints of the line segments during the stroking operation. To generate the normals, domain shader 52 may evaluate additional parametric equations for each of the values generated by tessellator 50, and output a normal vertex for each evaluation. The normal vertex may be indicative of a normal vector for a point on the path segment that corresponds to the parameter value generated by tessellator 50.

In general, the tangent formulae for curves and elliptic arcs (which may be used to determine the normal) are the derivatives of the parametric formulas described above with respect to generating the vertices for the curves and arcs. For example, for a cubic Bézier curve, domain shader 52 stage may generate normals for the output vertices of the curve according to the following parametric equation:

$$C0*-3*(1-t)^2+C1*(-6*(1-t)*t+3*(1-T)^2)+C2*(-3*t^2+6*(1-t)*t)+C3*3*t^2$$

where C0, C1, C2, C3 correspond to the control points for the cubic Bézier curve, and t corresponds to the coordinates provided by domain shader 52 to be used for performing parametric evaluation. A derivative of the parametric equation for the quadratic Bézier curve provided above may be used to generate normals for a quadratic Bézier curve in a similar fashion.

Alternatively, for the cubic Bézier curve, domain shader stage 52 may generate normals for the output vertices of the curve according to the following parametric equations:

$$X0*-3*(1-t)^2+X1*(-6*(1-t)*t+3*(1-t)^2)+X2*(-3*t^2+6*(1-t)*t)+X3*3*t^2$$

$$Y0*-3*(1-t)^2+Y1*(-6*(1-t)*t+3*(1-t)^2)+Y2*(-3*t^2+6*(1-t)*t)+Y3*3*t^2$$

where (X0, Y0), (X1, Y1), (X2, Y2), (X3, Y3) correspond to the control points for the cubic Bézier curve, and t corresponds to the coordinates provided by domain shader 52 to be used for performing parametric evaluation. A derivative of the parametric equations for the quadratic Bézier curve provided above may be used to generate normals for a quadratic Bézier curve in a similar fashion.

For an elliptic arc path segment, domain shader 52 stage may generate normals for the output vertices of the curve according to the following parametric equations:

$$\text{Tan}_x = -rh\, \text{Cos}*\sin(\text{angle}_t) - rv\, \text{Sin}*\cos(\text{angle}_t)$$

$$\text{Tan}_y = -rh\, \text{Sin}*\sin(\text{angle}_t) + rv\, \text{Cos}*\cos(\text{angle}_t)$$

where the parameterization angle $\text{angle}_t$ is determined from tessellator output t, where rh represents the horizontal radius of the unrotated ellipse, rv represents the vertical radius of the unrotated ellipse, rv Cos, rv Sin, rh Cos and rh Sin represent rv*Cos(angle), rv*Sin(angle), rh*Cos(angle) and rh*Sin(angle), respectively, and angle represents the counter-clockwise angle of the ellipse relative to the x axis, measured prior to scaling by (rh, rv). In some examples, hull shader stage may be configured to determine (e.g., precompute) cos(angle) and sin(angle) and/or to determine (e.g., precompute) the rv Cos, rv Sin, rh Cos and rh Sin values, and to provide these values to domain shader stage 52 for use in evaluating the above-recited parametric equations for ellipses.

After finding the tangent, the normal vector may be found according to the following equation:

$$\text{normal} = \text{normalize}(-\text{Tan}_y, \text{Tan}_x).$$

As discussed above with respect to elliptic arcs, the vertices in the patch control list, in some examples, may include data indicative of an endpoint parameterization. In such examples, a hull shader program executing on a shader unit of the GPU may be used to convert the data indicative of an endpoint parameterization of the elliptic arc to a data indicative of a center parameterization of the elliptic arc.

Geometry shader 54 may receive the line segments and the normals produced by domain shader 52, and generate primitives (e.g., triangles) that spatially correspond to the stroke area for each of the line segments. The stroke area for each of the line segments may collectively approximate the stroke area for the original path segment.

In general, each line segment may be defined by two consecutive points p0, p1 on a path and the normals n0, n1 at each of point, respectively. To determine the stroke area for a line segment, geometry shader 54 may calculate the four corner points (u0, l0, u1, l1) of the stroke area for the line segment according to the following equations:

$$u0 = p0 + n0 * \text{StrokeWidth}$$

$$l0 = p0 - n0 * \text{StrokeWidth}$$

$$u1 = p1 + n1 * \text{StrokeWidth}$$

$$l1 = p1 - n1 * \text{StrokeWidth}$$

where p0 and p1 are endpoints of the line segment for which the stroke area is being calculated, n0 is the normal vector corresponding to p0, n1 is the normal vector corresponding to p1, and StrokeWidth is the stroke width defined by the user application and passed to the GPU.

Figure 12:
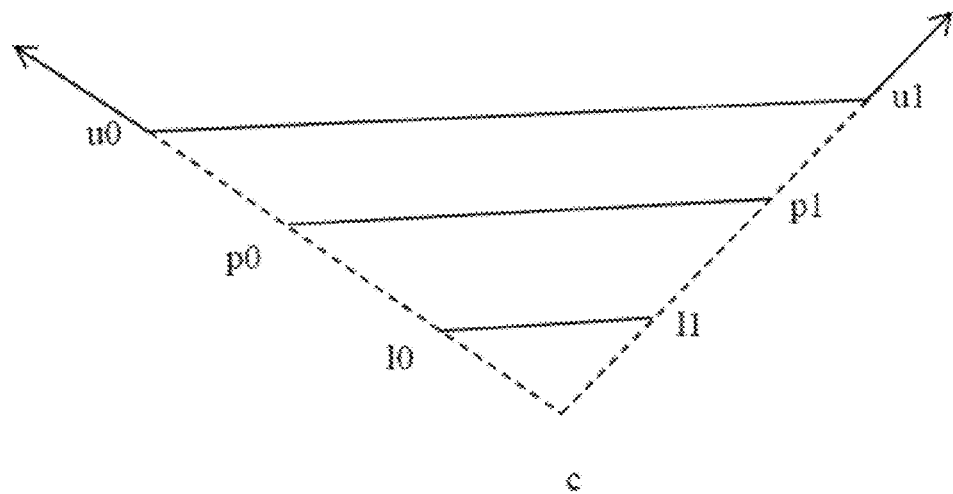
FIG. 12 is a conceptual diagram illustrating an example stroke area configuration where the intersection point of normal vectors is inside of the stroke area.
Figure 13:
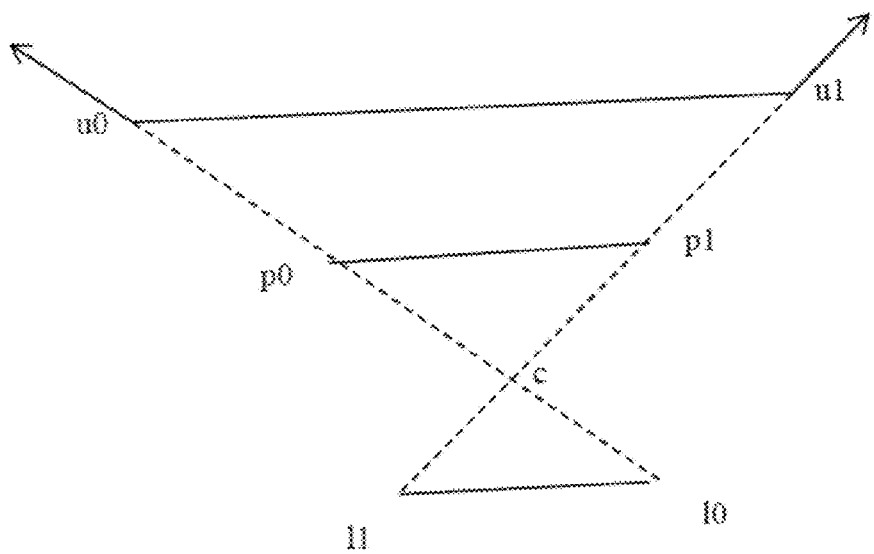
FIG. 13 is a conceptual diagram illustrating an example stroke area configuration where the intersection point of normal vectors is outside of the stroke area.

FIGS. 12 and 13 illustrate two different stroke area configurations for a given line segment. Depending on the value of the stroke width, two different cases may be applicable to the shape of the stroke area as illustrated in FIGS. 12 and 13. The point c is defined as the point where the normal vectors intersect (i.e., the intersection of the line formed by u0 and l0 and the line formed by u1 and l1), and may be referred to as the intersection point.

Geometry shader 54 may determine whether the intersection point is outside of the stroke area (e.g., FIG. 12) or inside of the stroke area (e.g., FIG. 13), and generate one or more primitives that spatially correspond to the stroke area based on the determination. To determine whether the intersection point is outside of the stroke area, geometry shader 54 may determine whether strokewidth<min(u0c,u1c). If strokewidth<min(u0c,u1c), geometry shader 54 may determine that the intersection point is outside of the stroke area. Otherwise, geometry shader 54 may determine that the intersection point is inside of the stroke area.

If the stroke width is small enough (strokewidth<min(u0c, u1c) so that the two line segment u0u1 and l0l1 have the same orientation, then the shape of stroke area for the line segment is a quad (FIG. 12). Otherwise the shape of the stroke area for the line segment is two head to head triangles (i.e., a butterfly) (FIG. 13).

If the intersection point is outside of the stroke area (e.g., FIG. 12), then geometry shader 54 may generate two triangles to form a quad that spatially corresponds to the stroke area. For example, geometry shader 54 may generate two triangles using the following combinations of vertices {u0, u1, l1} and {l1, l0, u0}.

If the intersection point is inside of the stroke area (e.g., FIG. 13), then geometry shader 54 may generate two triangles to form a butterfly that spatially corresponds to the stroke area. For example, geometry shader 54 may generate two triangles using the following combinations of vertices {u0, u1, c} and {c, l0, l1} if the {u0, u1, c} triangle is oriented in a clockwise direction, and generate two triangles using the following combinations of vertices {u0, u1, c} and {c, l1, l0} if the {u0, u1, c} triangle is oriented in a counter-clockwise direction.

To determine if the {u0, u1, c} triangle is oriented in a clockwise direction, geometry shader 54 may determine whether $\sin(a0+a1)>0$ in the equations defined below. If $\sin(a0+a1)>0$, then geometry shader 54 may determine that the {u0, u1, c} triangle is oriented in a clockwise direction. Otherwise, geometry shader 54 may determine that the {u0, u1, c} triangle is oriented in a counter-clockwise direction. The distances u0c and u1c, which may be used to determine the shape of the quad and also find out the coordinate of the center point C may be determined based on the following formulas:

$$v = \text{normalize}(n1 - n0)$$

$$\sin(a0) = n0 \times v, \cos(a0) = n0 \cdot v$$

$$\sin(a1) = v \times n1, \cos(a1) = v \cdot n1$$

$$\sin(a0 + a1) = \sin(a0)\cos(a1) + \cos(a0)\sin(a1)$$

$$u0c = \sin(a1)\frac{|u1-u0|}{\sin(a0+a1)}, \quad u1c = \sin(a0)\frac{|u1-u0|}{\sin(a0+a1)}$$

$$c = u0 - n0 \cdot u0c$$

where n0 is the normal for endpoint p0, and n1 is the normal for endpoint p1.

If strokewidth<min(u0c,u1c), then the stroke area for the line segment may be a simple quad. The GPU may draw two (2) triangles (u0,u1,l1) and (l1,l0,u1). In some examples, regardless of the position of p0,p1,n0,n1, the two triangles may always be clockwise.

If strokewidth>min(u0c,u1c), then there are 2 cases. If $\sin(a0+a1)>0$, which means triangle (u0,u1,c) is clockwise, then the triangles to be drawn is (u0,u1,c) and (c,l0,l1). If $\sin(a0+a1)<0$, then triangles to be drawn are (u1,u0,c), (c,l1, l0).

In some cases, when primitives corresponding to the stroke areas of line segments are generated (e.g., by geometry shader 54), the neighboring line segments may form a T junction if one or both of the stroke areas forms a butterfly shape (e.g. FIG. 13). This is because the center point C is not at the same position for the different line segments.

Figure 14:
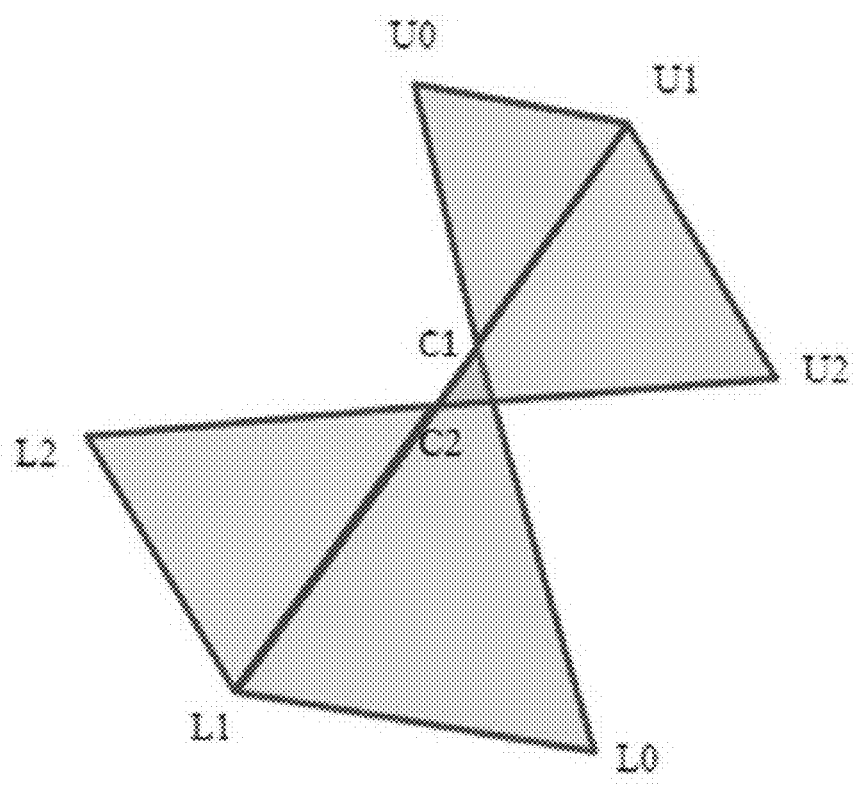
FIG. 14 is a conceptual diagram illustrating an example T-junction that may be formed between two triangles that form a stroke area.

FIG. 14 is a conceptual diagram illustrating an example T-junction that may be formed between triangles (U0,U1,C1) and (U1,U2,C2). The T-junction may cause one or more pixels to be missing (e.g., not properly rendered and/or occluded) in the final rendering result. In some examples, in order to address the above-mentioned issue, the GPU may draw 2 redounded triangles (C1,U0,L0), (C1,U1,L1). In some examples, to make sure that the two triangles will not be culled because of back face culling, the back face culling feature of the GPU (e.g., of the rasterizer) may be disabled or turned off. The rasterizer may rasterize each of the primitives generated by geometry shader 54 into a render target (e.g., the frame buffer). During the output merger stage, all pixels that are covered by the primitives generated by geometry shader 54 may be lit up with a stroke color (specified by the CPU prior to the rendering pass). The pixel shader may be configured to perform standard operations and/or configured to operate in a "pass-through" mode during the rendering pass. The single rendering pass completes after rendering all of the primitives generated by geometry shader 54. Once the rendering pass is complete, the render target (e.g., the frame buffer) may store a rasterized version of the stroke area for the path segment.

In addition to the path rendering operations of filling and stroking, the techniques of this disclosure may include applying various types of end caps to the ends of a path, and applying various types of joins between the endpoints of interior path segments of a path. In some examples, these operations may be able to be implemented using the techniques of this disclosure on a DX11 pipeline.

Techniques are now described for rendering joins. Joins may be applied at where different path segments meet. In some examples, there may be three different types of joins: (1) bevel, (2) miter, and (3) round.

In an example, the cell buffer contains x*y cells. One cell represents one pixel in the final image, but cell name is used to distinguish the cells and pixels as they store different information. Each cell in the cell buffer stores sixteen bytes of winding counter information. The cell buffer may be the size of the frame buffer, but normally the memory requirements of the cell buffer would become too big. So the frame buffer can be split in to tiles of x*y pixels (and cells). This allows the drawing of the primitive one tile at a time.

Figure 15:
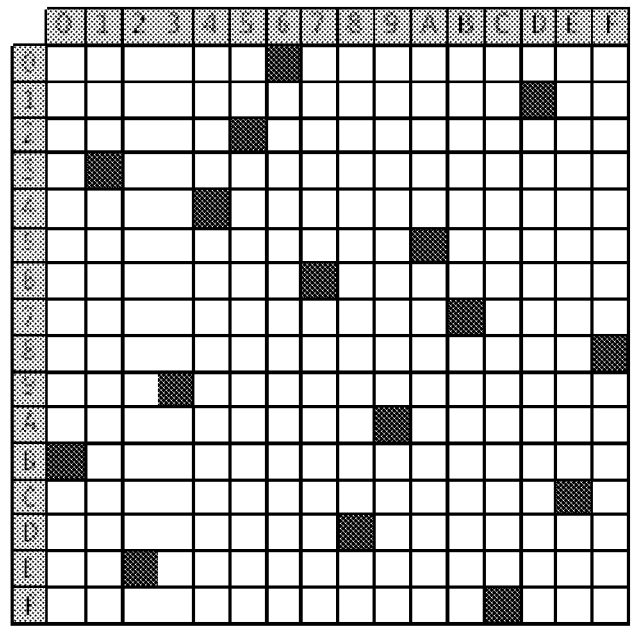
FIG. 15 is a diagram illustrating an example of a pixel split into a sixteen by sixteen grid of sub-pixels.

FIG. 15 is a diagram illustrating an example of a pixel split into a sixteen by sixteen grid of sub-pixels. In the illustrated example, there are sixteen sample positions positioned in to the grid using the 16-Queens rule. The rule definition is to place 16 chess queens on an 16×16 board such that no queen can attack another. There are many different solutions, but for our purpose, the most important rule is that for any horizontal or vertical sub-pixel row/column there is only one sample. This property gives all sixteen shades for anti-aliasing of nearly horizontal and nearly vertical edges, and this gives the most noticeable anti-aliasing improvement. The true 16-Queens rule does the same for 45 degree edges also.

Each of the sixteen sample points of a pixel are an eight bit counter value. In one example, the counter may be a winding counter. The winding counter values may be incremented or decremented during the edge-drawing phase. Once all the edges have been drawn, the fill process examines the value of these counter values and calculates the pixel coverage value for anti-aliasing. The worst-case storage requirement is x*y*16 bytes where x and y are the dimensions of the tile. However, there are ways to reduce the required bandwidth to access the winding counters as in most of the cases the winding counter values are very small (either positive or negative). This information may be used compress the data, for example by storing the least significant bits of each winding counter (16 bits) as two bytes and have internal per pixel flags to determine the pixel type. The pixel type can be for example: empty, negative 16 bit, positive 16 bit, fully expanded 16 bytes. In other examples, more compression levels could be added.

Figure 16:
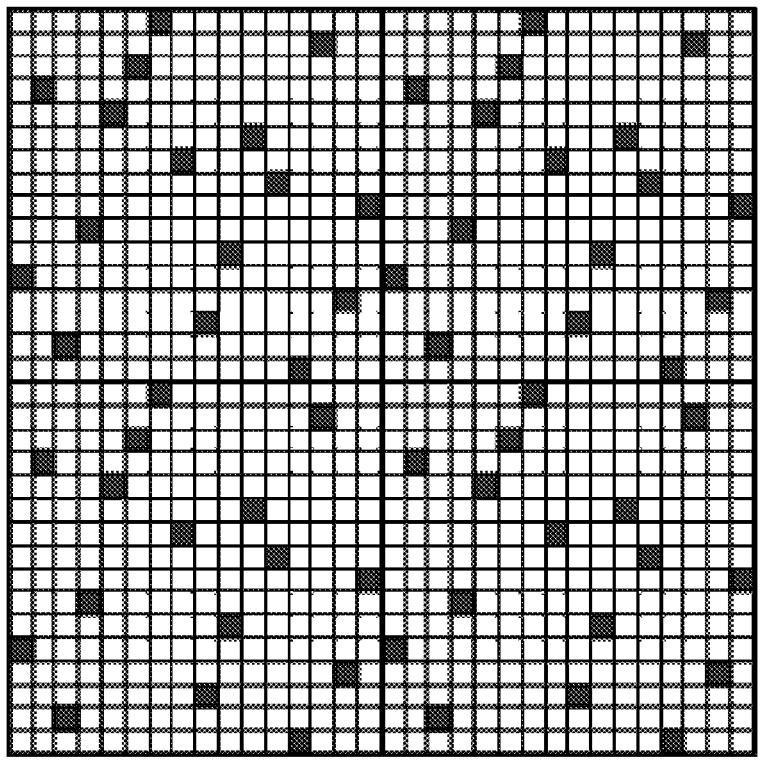
FIG. 16 is a diagram illustrating an example of four neighboring pixels split into four sixteen by sixteen grids of sub-pixels.

FIG. 16 is a diagram illustrating an example of four neighboring pixels split into four sixteen by sixteen grids of sub-pixels. In an example, the distribution of the samples over the pixels would be as uniform as possible. In some examples, the sample positions may be changed to the implementation if better sample positions are determined.

Figure 17:
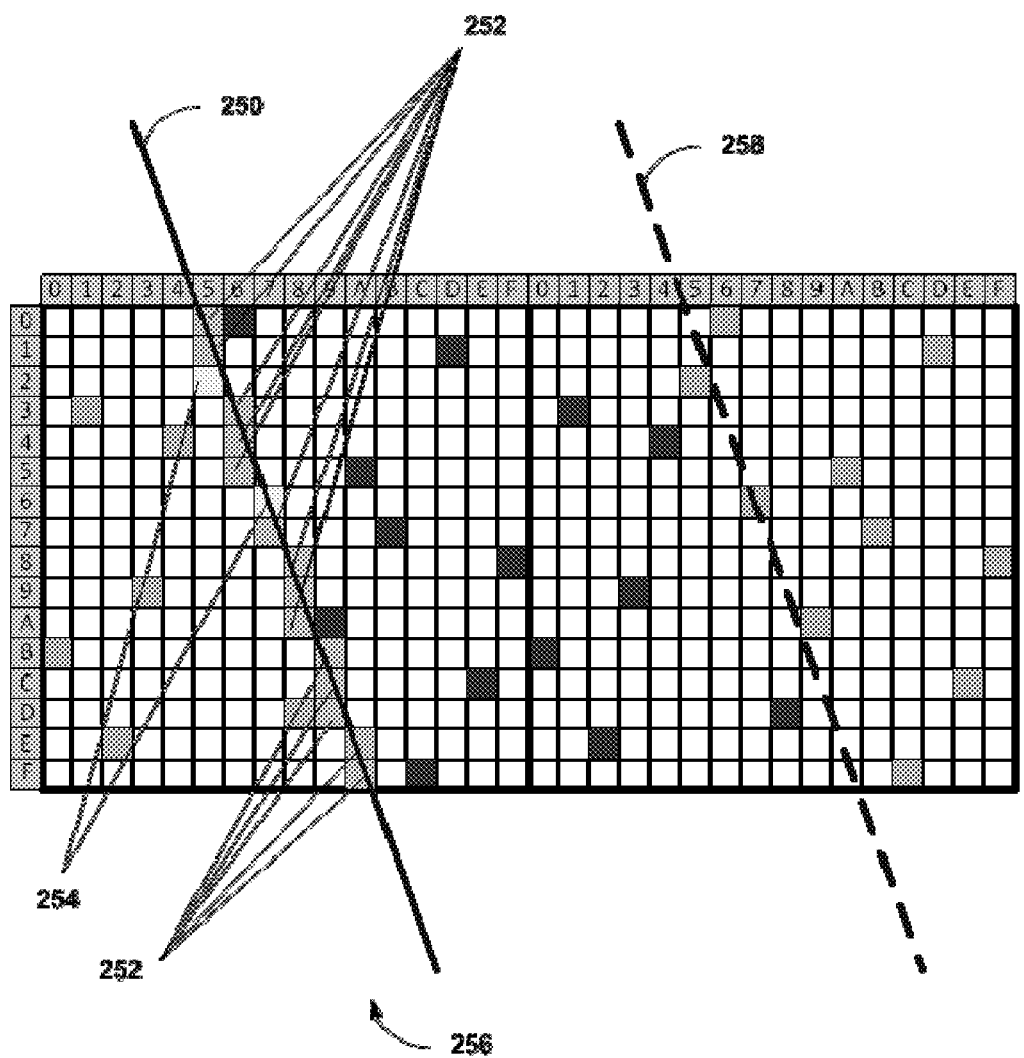
FIG. 17 is a diagram illustrating an example of edge sampling.

FIG. 17 is a diagram illustrating an example of edge sampling at edge 250. The sub-pixels generated by the edge traversal are at 252. The edge sub-pixels that fall exactly on sample point are at 254. Unaffected sample point are shown generally to the left of edge 250 in area 256. In some cases of an edge crossing the pixel will affect the winding counters of two horizontally consecutive pixels. An example may use a rule such as, if a sample point is either exactly on, or to the right of the edge sub-pixel, it is considered to be set for the current pixel. Otherwise it is set on the next pixel to the right. One way to understand this is to consider a copy of the edge exactly one pixel to the right (shown at 258) and every sample point between these two lines are set, with the exception that only the original edge includes the sample points that fall exactly on the edge 250. This rule may be universal for all edges. It should be noted that the same information may be stored inside the one pixel but that would require more than one bits per sample. The one bit per sample may be chosen for later data compression purposes of storing the winding counter values. For any edge 250, there is only one sub-pixel sample generated for each of it's sub-pixel rows. This means that if the edge is five sub-pixels in Y direction but 300 sub-pixels in X direction, still only five samples are generated and sampled.

The result of the sampling is collected as sixteen bit values (e.g., masks). Internally, there are left side and right side masks which are flushed out with certain rules. As the masks are flushed out, it means that the set bits affect the corresponding winding counters of that pixel. If the edge is upward, the winding counters are incremented. If the edge is downward the winding counters are decremented. As the edge sub-pixels are being generated it is checked if the next sub-pixel is within the current pixel, to the left, to the right or on different pixel row. If the new sub-pixel is on a different pixel row, then the both left and right side masks are flushed out. If the new sub-pixel is to the pixel right of the current pixel, the left side mask is flushed and then replaced by the right side mask. If the new sub-pixel is to the pixel left of the current pixel, the right side mask is flushed and then replaced by the left side mask. This may be done to reduce the amount of flushing. Basically, in the above example the left side and right side masks are each other's inverse. In other examples, that may not always be true. For example, very short edges or almost horizontal edges don't cover the whole pixel in vertical direction. In those examples, the left and right side masks are not each other's inverse.

Figure 18A:
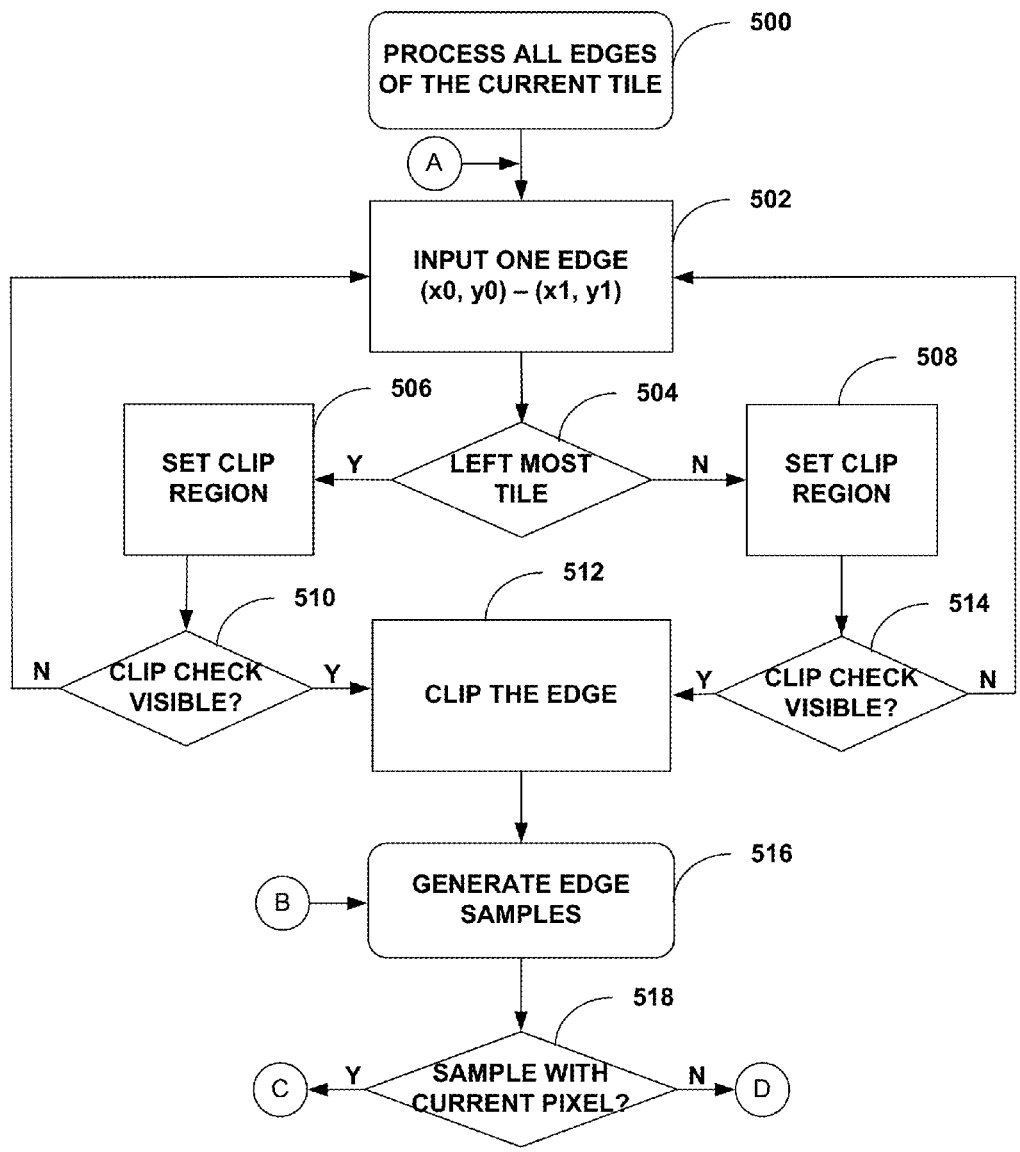
FIGS. 18A and 18B are a flowchart illustrating an example method in accordance with one or more examples described in this disclosure.
Figure 18B:
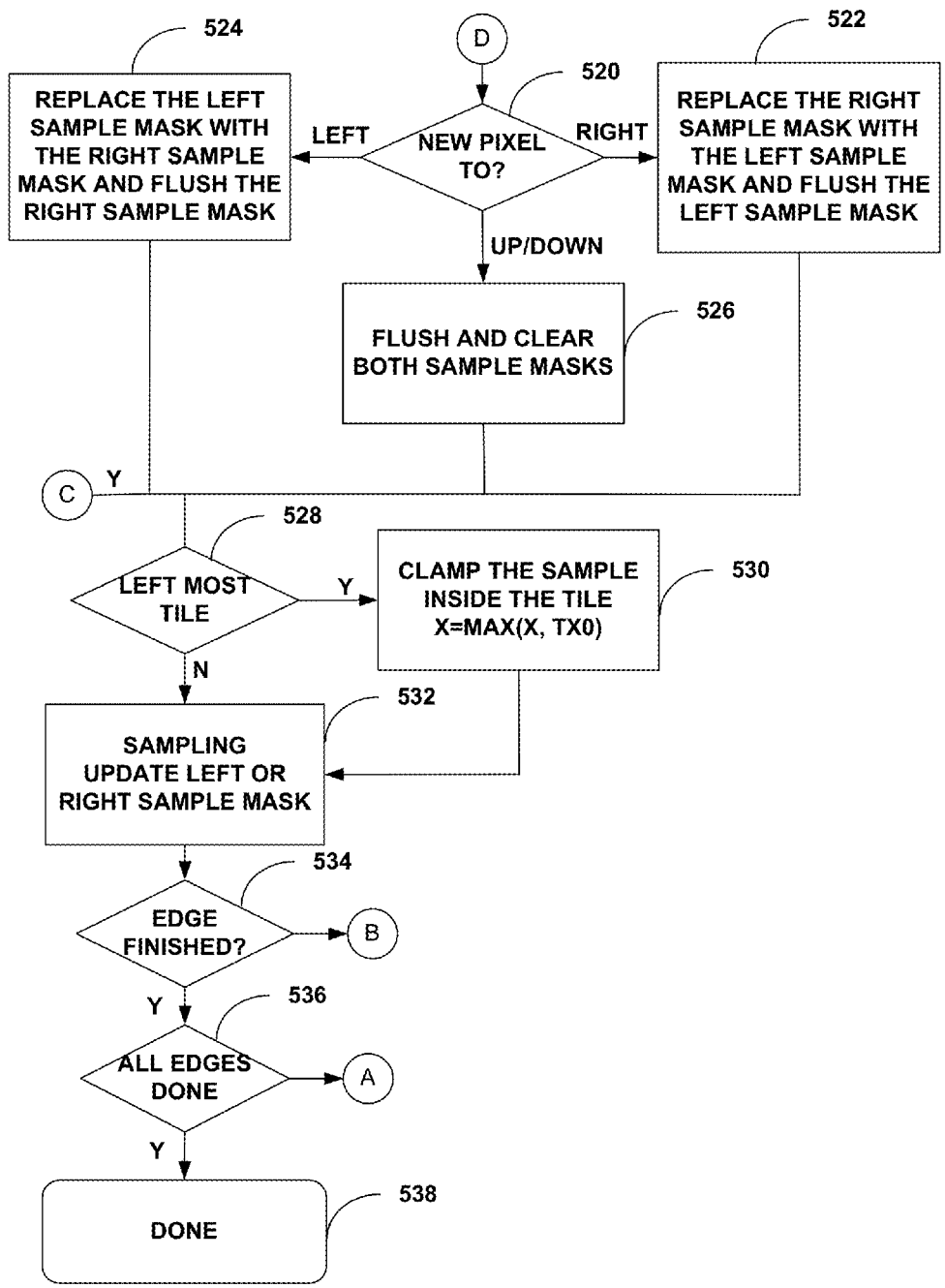

FIGS. 18A and 18B are a flowchart illustrating an example method in accordance with one or more examples described in this disclosure. As illustrated in FIGS. 18A and 18B, a GPU 12 processes all the edges of a current tile (500). One edge may be input into the GPU 12 with the edge having points (x0, y0) and (x1, y1) (502). GPU 12 determines if the tile is the left most tile (504). If it tile is the left most tile, GPU 12 sets the clip region as (−inf, ty0, tx1, ty1 (506) where tx0 tx1 ty0 ty1 are tile boundaries. If it tile is not the left most tile, GPU 12 sets the clip region as (tx0−1, ty0, tx, ty1) (508). GPU 12 determines if a clip check is visible (510, 514) and if so clips the edge (512). If not an edge is input (502).

GPU 12 generates edge samples (516) and determines if the samples are in the current pixel (518), as will be discussed with respect to FIGS. 20A-20Z. If the sample are in the current the GPU 12 determines if it is the left most tile (528), if not then GPU 12 determines if the new pixel is left, right, or up/down (520). If the new pixel is right the GPU 12 replaces the right sample mask with the left sample mask and "flushes," e.g., deletes the left sample mask (522). If the new pixel is left the GPU 12 replaces the left sample mask with the right sample mask and "flushes," e.g., deletes, the right sample mask (524). If the new pixel is up or down then GPU 12 flushed and clears both sample masks (526).

If the new tile is the left most tile, then GPU 12 may clamp the sample inside the tile, with x=max(x, tx0) (530). If not, GPU 12 sampling updates the left or right mask (532). This is also performed (532) if the tile is not the left most tile (528).

If the edge is not finished, GPU again generates edge samples (516), otherwise GPU 12 determines if all edges are done (536). When all the edges are done the process completes, i.e., is done (538). If all of the edges are not complete then one edge is input (502).

Figure 19:
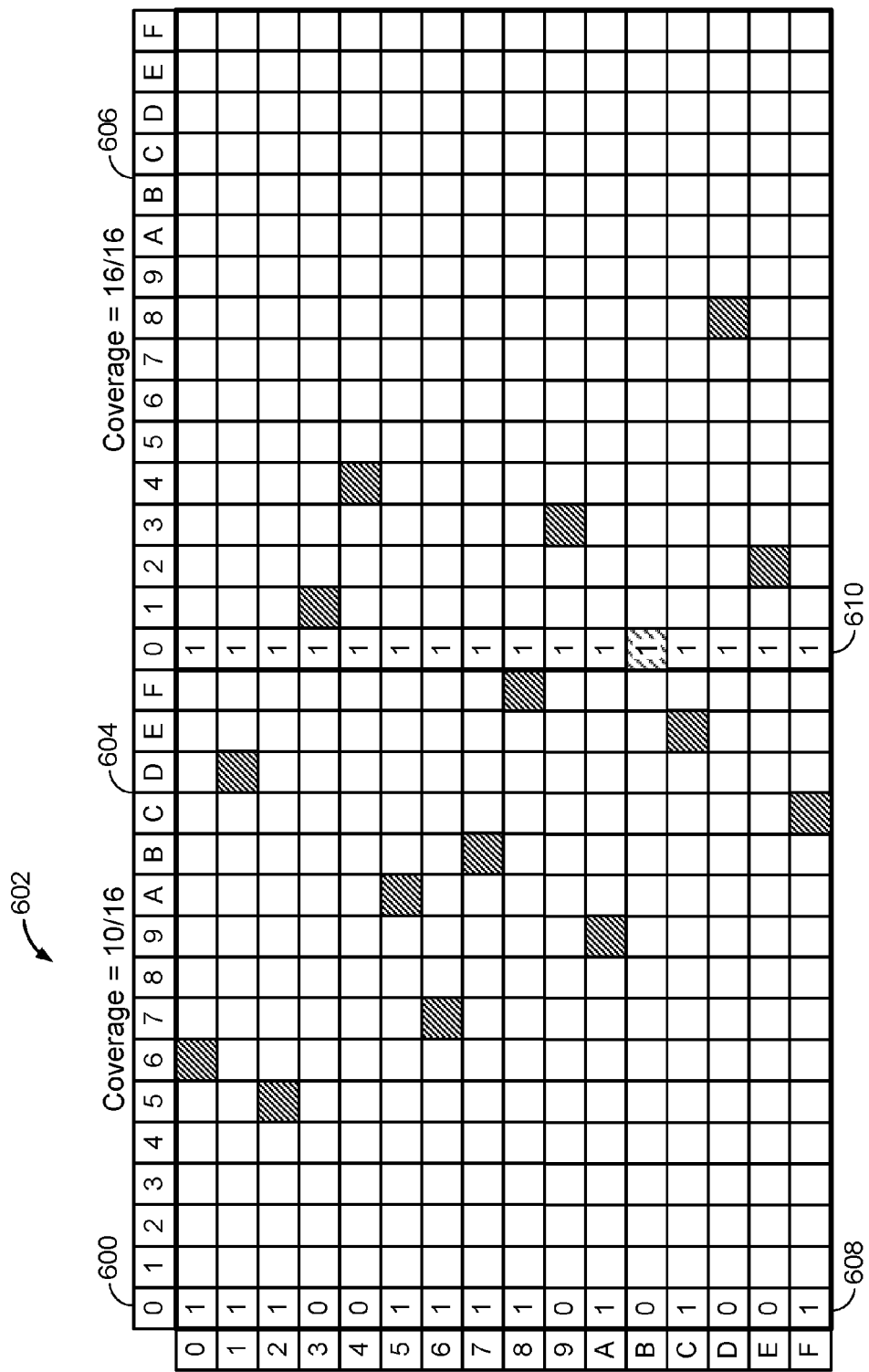
FIG. 19 is a diagram illustrating an example filling process.

FIG. 19 is a diagram illustrating an example filling process. The filling starts from the left edge 600 of tile 602. In an example, the fill process has sixteen internal eight bit winding counters. The winding counter values from the cell buffer may be added to the internal counters. The coverage value may be calculated from the internal counters. There are two supported rules to convert the internal winding counter values to the coverage: odd/even and non-zero. With odd/even rule, every internal winding counter having odd value (1, 3, 5, 7, 9 . . . ) increments the pixel coverage. With non-zero rule, every internal winding counter having non-zero value increments the pixel coverage.

The diagram illustrates the first two pixels 604, 606 of the cell buffer after one upward edge (the edge drawing example above) has been drawn. As the edge was upward, the winding counters are positive ones in the cell buffer, on samples marked red. The winding counters from the cell buffer may be added to the internal winding counters before the coverage calculation. The column 608, 610 on the left edge of the pixel shows the value of internal winding counters after the cell buffer winding counters have been added. The first pixel 604 in the illustrated example has ten samples having one in their winding counter. The final coverage value of the first pixel may be 10/16. The second pixel 606 has six samples having one in their winding counter. As these are added to the internal winding counters it may be seen that now all sixteen internal winding counters are one, so the final coverage of the second pixel is 16/16 (fully covered).

Figure 20A:
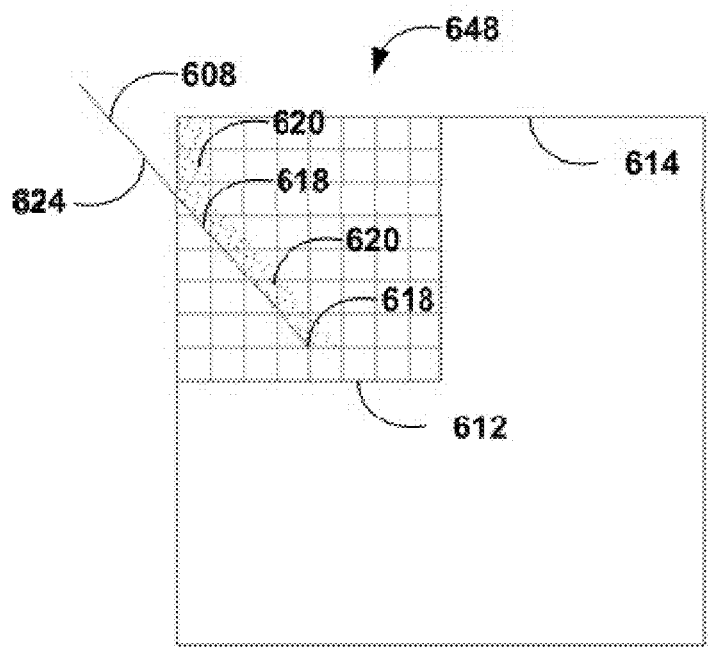
FIGS. 20A-20Z are diagrams illustrating a step by step example in accordance with one or more examples described in this disclosure.
Figure 20B:
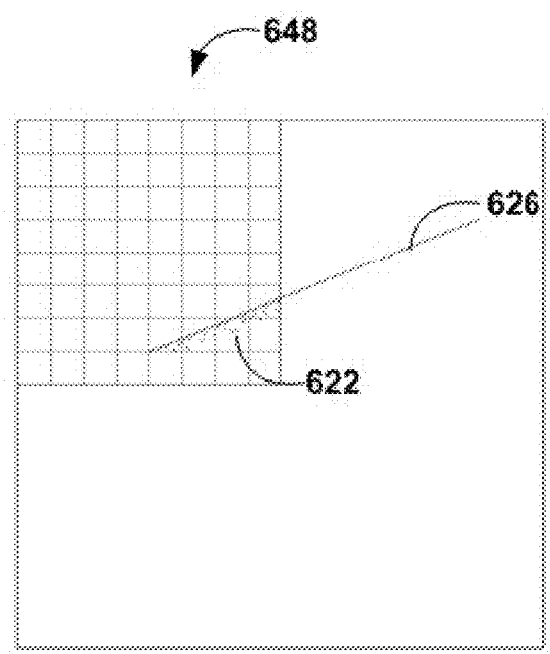
Figure 20C:
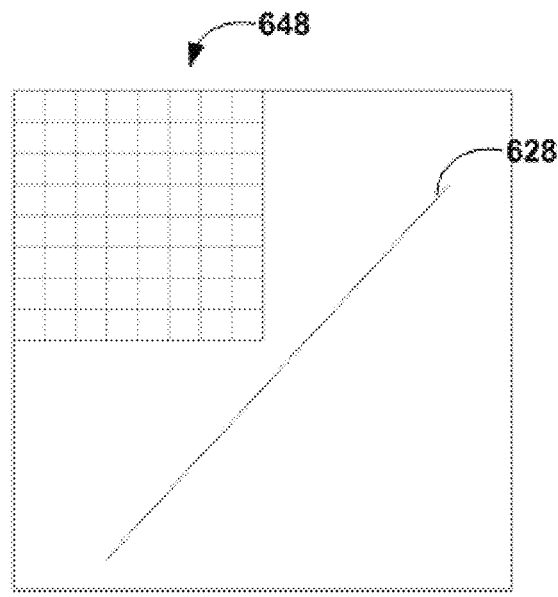
Figure 20D:
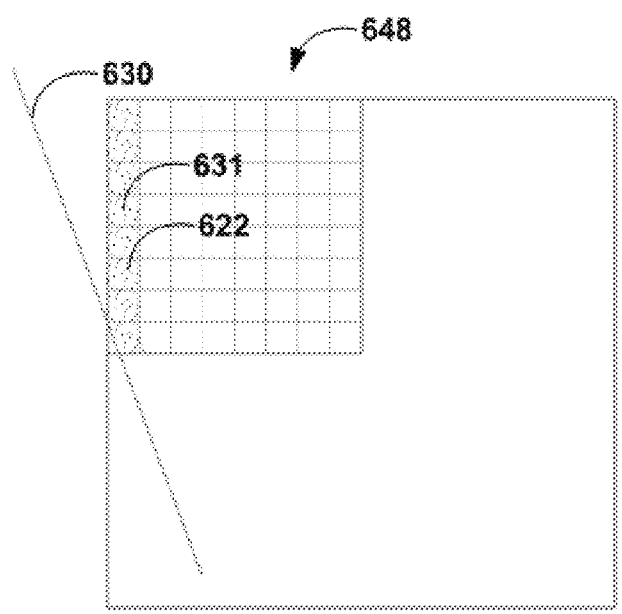
Figure 20E:
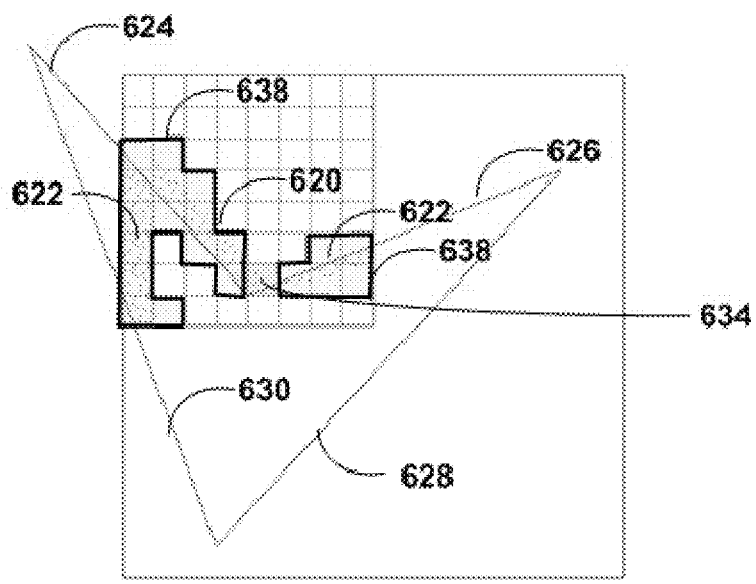
Figure 20F:
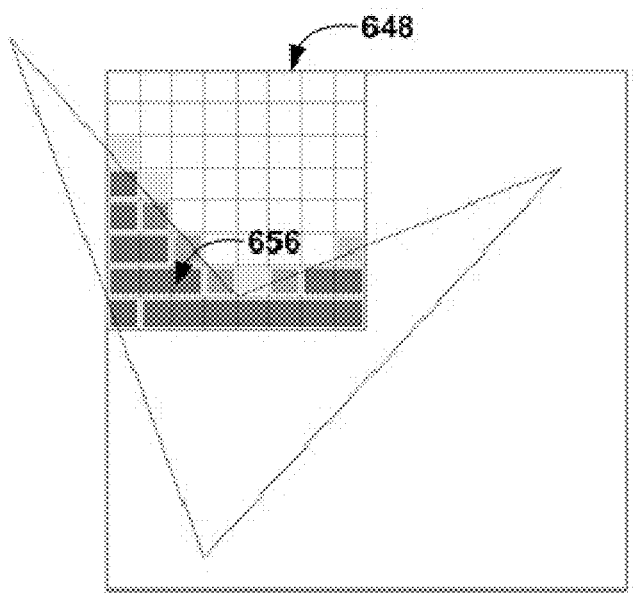
Figure 20G:
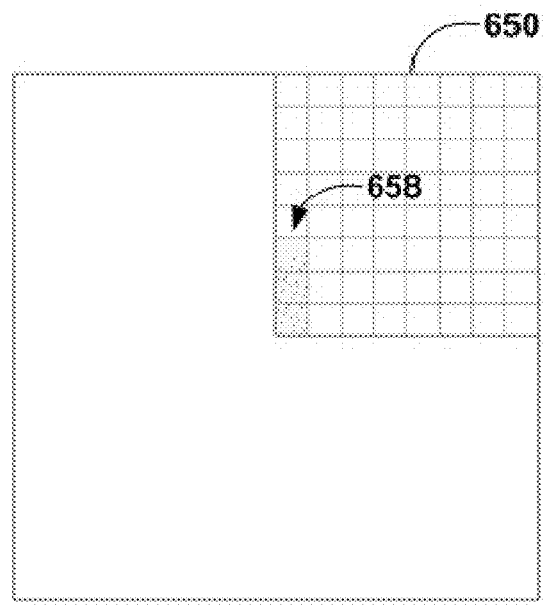
Figure 20H:
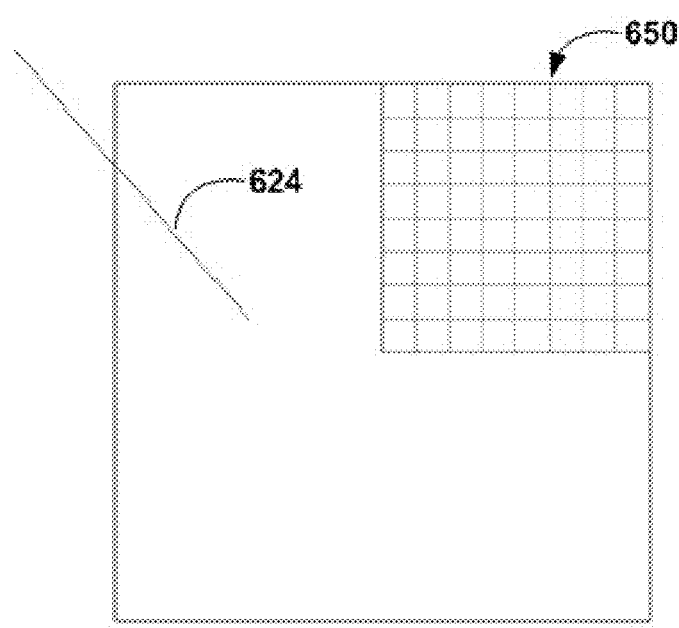
Figure 20I:
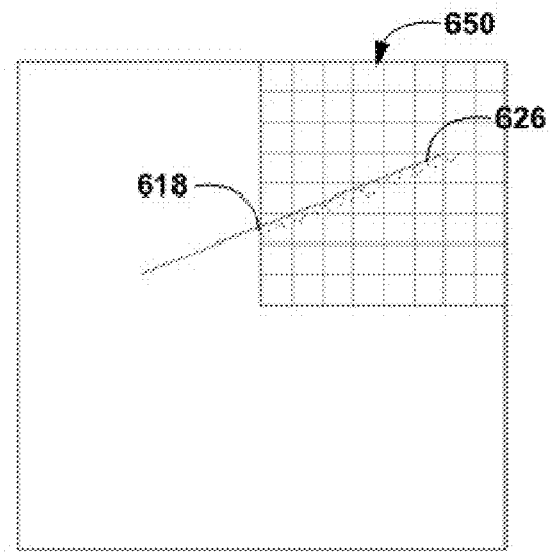
Figure 20J:
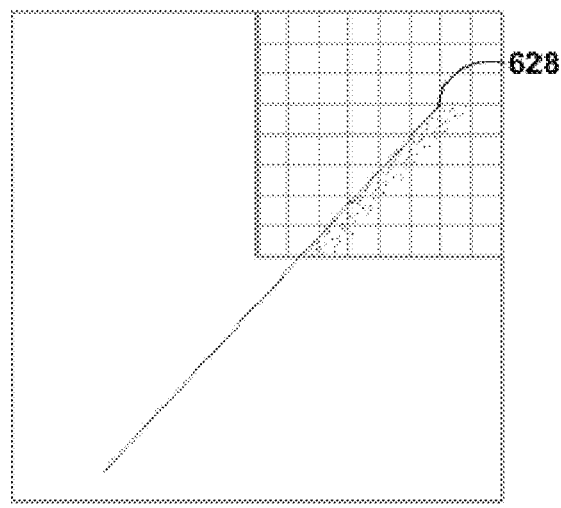
Figure 20K:
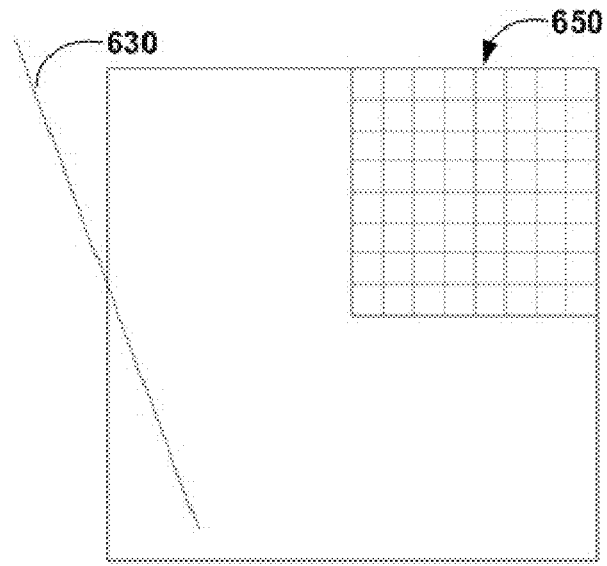
Figure 20L:
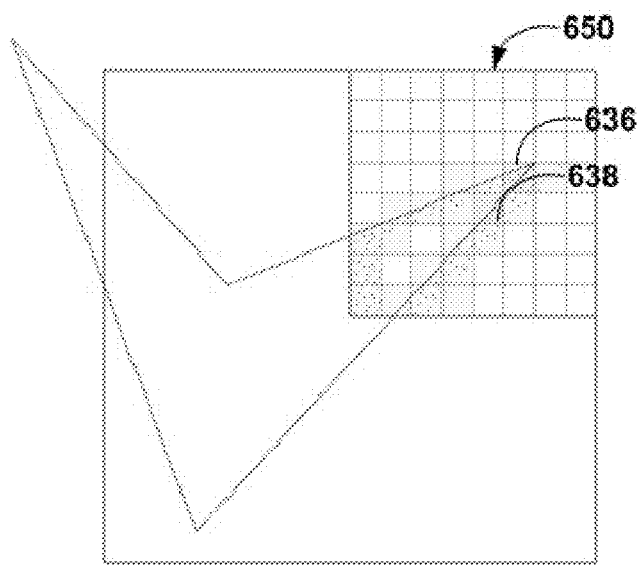
Figure 20M:
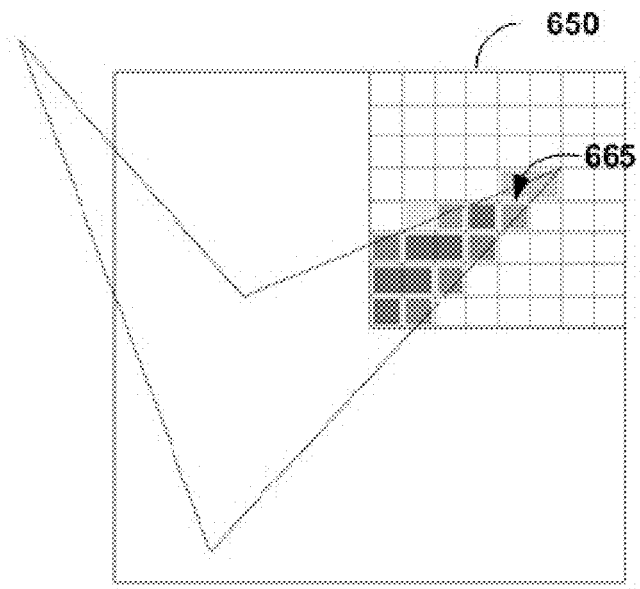
Figure 20N:
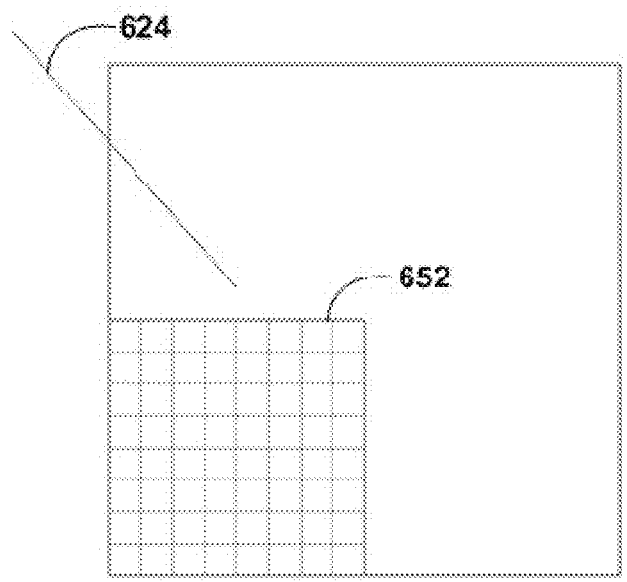
Figure 20O:
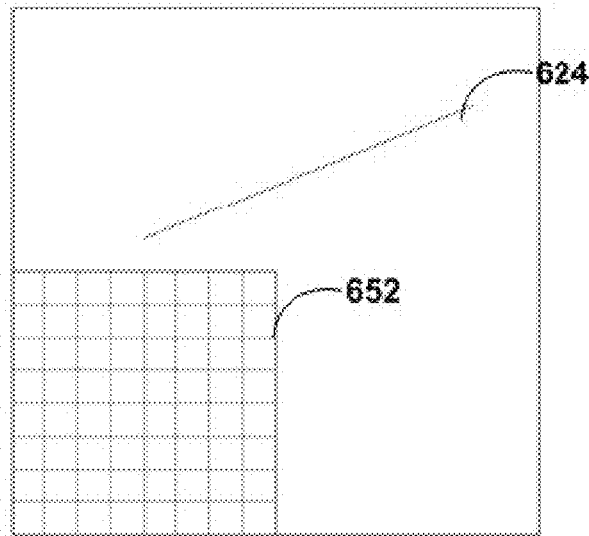
Figure 20P:
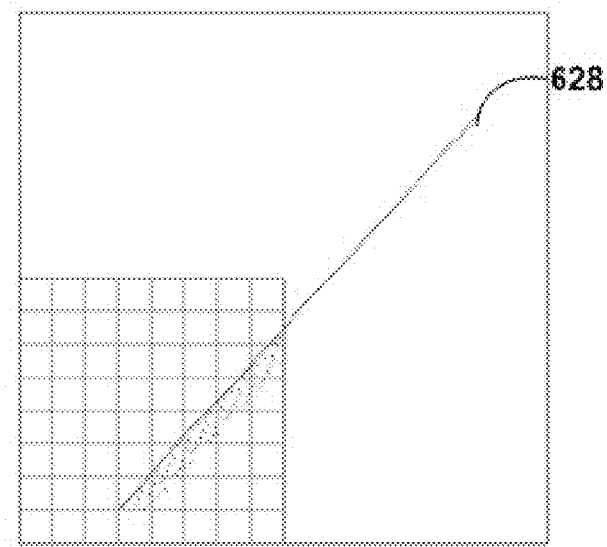
Figure 20Q:
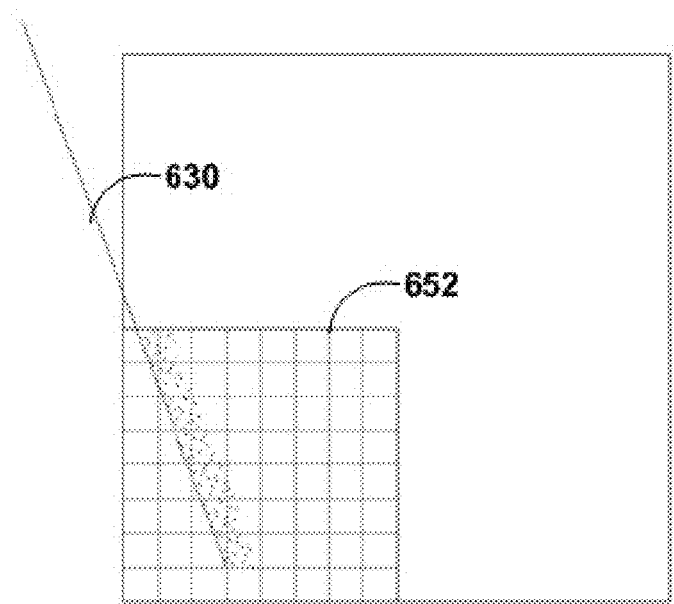
Figure 20R:
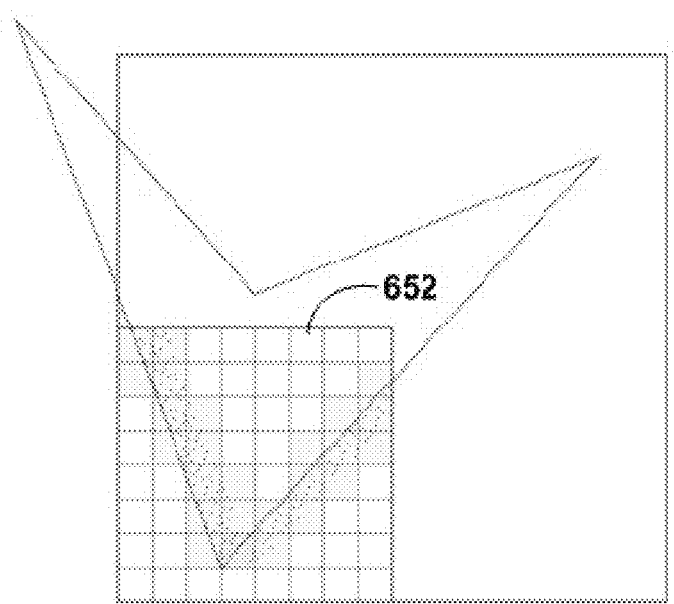
Figure 20S:
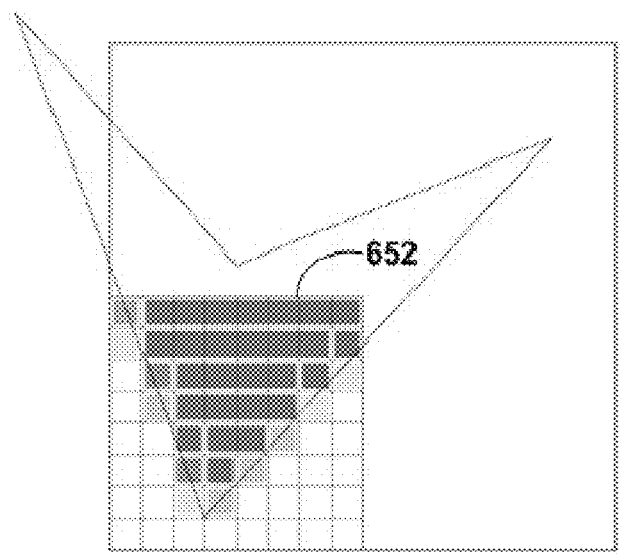
Figure 20T:
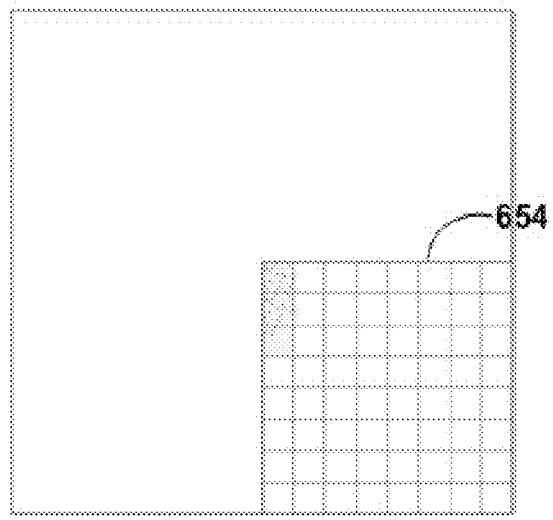
Figure 20U:
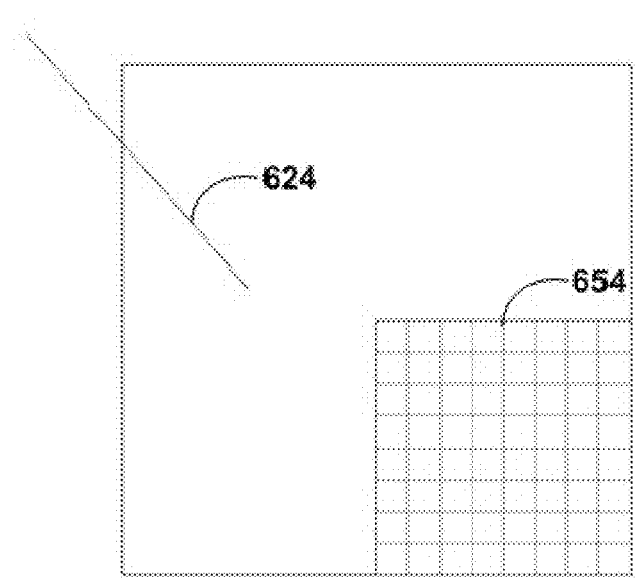
Figure 20V:
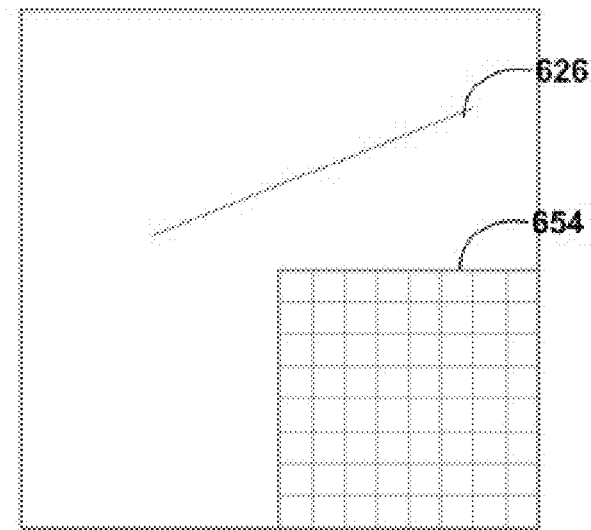
Figure 20W:
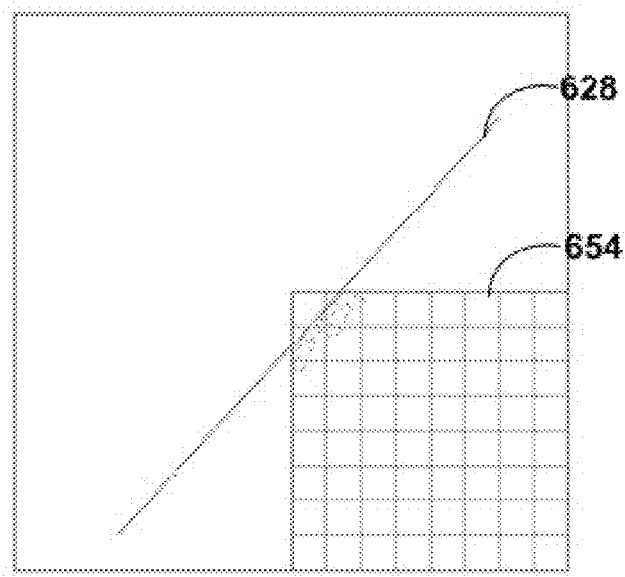
Figure 20X:
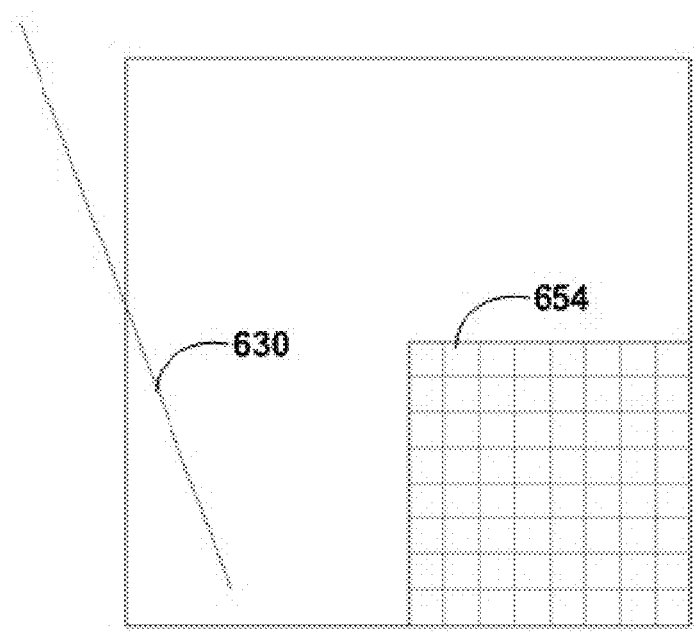
Figure 20Y:
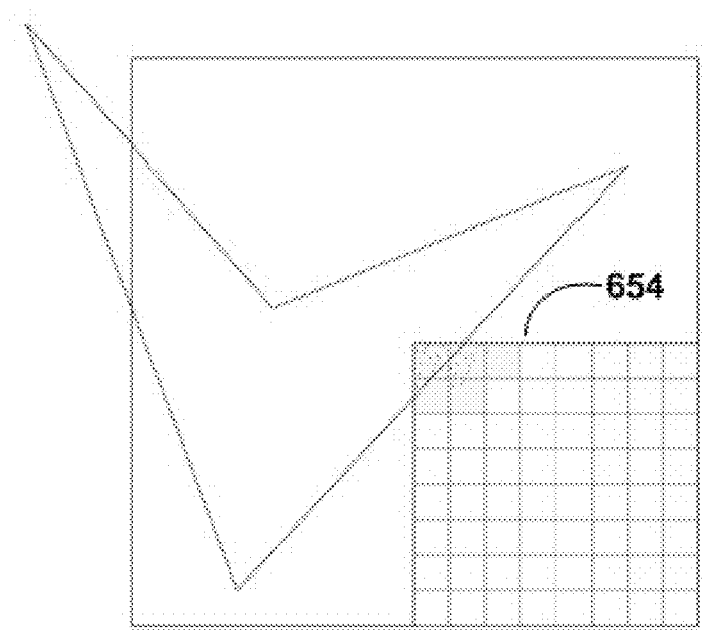
Figure 20Z:
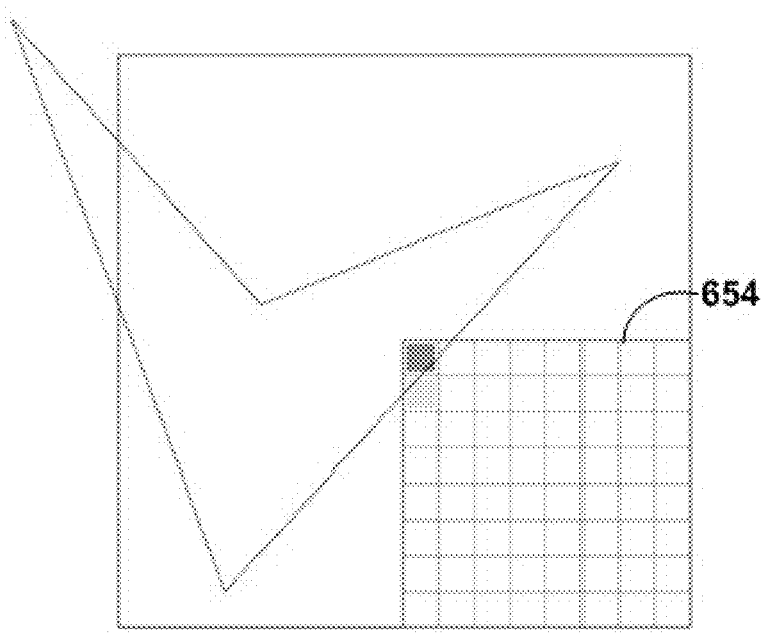

FIGS. 20A-20Z are diagrams illustrating a step by step example in accordance with one or more examples described in this disclosure. In the sequence of diagrams of FIGS. 20A-20Z, a four-vertex polygon is filled. The tile size in this example is 8 by 8 pixels. The currently active tile is shown includes a boundary 612. The total frame buffer size is 16 by 16 pixels (shown as rectangle 614), so have total of four tiles to render. The polygon edges are shown as a line 616. The sub-pixels generated during the edge processing are shown as dots 618. The sample points affected by the edge are shown as 620, 622. The dots 620 will decrement the winding counter value of the corresponding sample point. The dots 622 will increment the winding counter value of the corresponding sample point.

FIG. 20A illustrates the first edge 624 drawn to the cell buffer. This is a left most tile 648. In the illustrated example, the sub-pixels out from the left side are clamped (x coordinate forced) inside the tile 648. This edge is downward, so the affected sample points are shown at 620 (negative), and they decrement the corresponding sample point winding counters. After the first edge 624, there are only negative or zero values present in the winding counters of any pixel.

FIG. 20B illustrates the second edge 626 is upward edge and increments the winding counters. Note that the pixel on coordinates (4, 6) now have positive, negative and zero values present in the sixteen winding counters of that pixel because the first two edges 624, 626 both contribute to the same pixel.

FIG. 20C illustrates the third edge 628, which does not contribute to this tile 648. In other words, third edge 628 is not within tile 648. As illustrated in FIG. 20C, third edge 628 is to the right and below tile 648.

FIG. 20D illustrates the fourth edge 630 is similar to the first edge 624, but here several edge sub-pixels 631 are clamped inside the tile 648. The edge is upward and increments the winding counters.

FIG. 20E illustrates all the edges 624, 626, 628, 630 that may be processed in this example. The figure illustrates the final state of the winding counters. Samples having positive winding value are shown as dots 622, and negative winding values are shown as dots 620. The dirty pixels (having non zero winding values) are indicated by a boarder 638. The pixel in coordinates (4, 6) is shown at as it has both positive and negative values. This information may be used to compress the counter values.

FIG. 20F illustrates that as all the edges for this tile 648 are processed, the fill process can start. The resulting horizontal spans 656 are illustrated with internal white margin so it is easier to see the separate spans.

FIG. 20G illustrates the inherited counter values from the last tile 648. That is the carryover from the tile to the left. Carryover is the counter information from the last column. This is the starting situation of the winding counters in the beginning of this tile 650.

FIG. 20H illustrates that in some examples, the tiles 648, 650 may always processed from left to right. The reason for this is that the winding counter values on the right edge of the last tile 650 may be inherited for the next tile. The first edge 624 does not directly contribute to this tile 650 (indirectly, with the inherited counter values of the last tile 648).

FIG. 20I illustrates the second edge 626 is upward and increments winding counters. The current tile 650 is no longer the left most tile, so illustrated are not clamping the edge sub-pixels inside the tile 650. For all the rest of the tiles to the right, the clip boundary of the tile 650 may be extended to the left by one pixel. This can be seen as the dots 618 outside the tile 650. This is necessary for correct sampling of the edge. However, only the winding counters inside the tile 650 are affected, so the clip boundary is extended only for sampling purposes.

FIG. 20J illustrates the third edge 628 is downward and decrements the winding counters.

FIG. 20K illustrates the fourth edge 630 does not contribute to this tile 650. In other words, no portion of edge 630 is within the tile 650.

FIG. 20L illustrates the state of all the winding counters of this tile 650 just before filling starts. Notice the left side samples which will make the spans start fully covered because of inherited counters from last tile 648. Also, notice the two pixels 636, 638 having both positive and negative winding values.

FIG. 20M illustrates all the edges for this tile 650 are processed, the fill process can start. Resulting separate spans 665 are illustrates in the figure.

FIG. 20N illustrates that the first edge 624 does not contribute to this tile 652. In other words, first edge 624 is not within this tile 652.

FIG. 20O illustrates that the second edge 626 does not contribute to this tile 652.

FIG. 20P illustrates that the third edge 628 is downward and decrements the winding counters.

FIG. 20Q illustrates that the fourth edge 630 is upward and increments the winding counters. Notice the edge 630 does not cross the left edge of the tile 652, so no clamping occurs.

FIG. 20R illustrates that the state of all the winding counters of this tile 652 just before filling starts.

FIG. 20S illustrates that the edges for this tile 652 are processed and the fill process may begin. Resulting separate spans are illustrated here.

FIG. 20T illustrates the inherited counter values from the last tile 652. This is the starting situation of the winding counters in the beginning of this tile 654.

FIG. 20U illustrates that the first edge 624 does not contribute to this tile 654.

FIG. 20V illustrates that the second edge 626 does not contribute to this tile 654.

FIG. 20W illustrates that the third edge 628 is downward and decrements the winding counters.

FIG. 20X illustrates that the fourth edge 630 does not contribute to this tile 654.

FIG. 20Y illustrates the state of all the winding counters of this tile 654 just before filling starts.

FIG. 20Z illustrates that all the edges for this tile 654 are processed, the fill process can start. Resulting separate spans are show here.

FIGS. 21A-D are diagrams illustrating an example stroke flow using a cubic plus a line input. In an example, a pre-processing stage may find the endcaps and joins, and the two endcaps and the join as illustrated by the arrows in FIG. 21B. Tangents may be found from control point differences. These primitives (one line, two caps, one join and one cubic) will be sent to the GPU as follows (Only x and y coordinates matter, and z coordinate on first vertex—highlighted—is primitive type marker):

```
// cap = 6.0f
{ XMFLOAT3( -0.4f, 0.8f, 6.0f ) }, // location
    { XMFLOAT3( 0.8f, 0.0f, 1.0f ) }, //tangent
    { XMFLOAT3( 0.0f, 0.0f, 1.0f ) },
    { XMFLOAT3( 0.0f, 0.0f, 1.0f ) },
```

-continued

```
// line = 2.0f
{ XMFLOAT3( -0.4f, 0.8f, 2.0f) }, // start point
    { XMFLOAT3( 0.4f, 0.8f, 1.0f) },// end point
    { XMFLOAT3( 0.0f, 0.0f, 1.0f) },
    { XMFLOAT3( 0.0f, 0.0f, 1.0f) },
//join = 5.0f
{ XMFLOAT3( 0.4f, 0.8f, 5.0f) }, // location
    { XMFLOAT3( 0.8f, 0.0f, 1.0f) }, // first tangent
    { XMFLOAT3( 0.2f, -0.2f, 1.0f) }, // second tangent
    { XMFLOAT3( 0.0f, 0.0f, 1.0f) },
//cubic = 3.0f
{ XMFLOAT3( 0.4f, 0.8f, 3.0f) }, // first control point
    { XMFLOAT3( 0.6f, 0.6f, 1.0f) }, // second control point
    { XMFLOAT3( 0.6f, 0.2f, 1.0f) }, // third control point
    { XMFLOAT3( 0.0f, 0.0f, 1.0f) }, // fourth control point
    // cap = 6.0f
{ XMFLOAT3( 0.0f, 0.0f, 6.0f) }, // location
    { XMFLOAT3( -0.6f, -0.2f, 1.0f) }, //tangent
    { XMFLOAT3( 0.0f, 0.0f, 1.0f) },
    { XMFLOAT3( 0.0f, 0.0f, 1.0f) },
```

In an example, all primitives may be a path-4 type and the programmer makes a drawAutoIndexed API call.

Figure 21A:
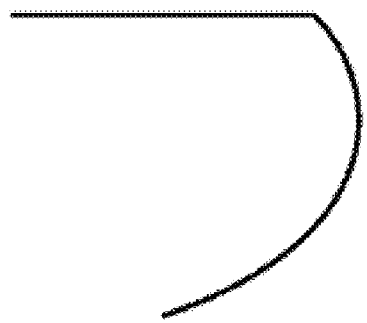
FIGS. 21A-21D are diagrams illustrating another example in accordance with one or more examples described in this disclosure.
Figure 21B:
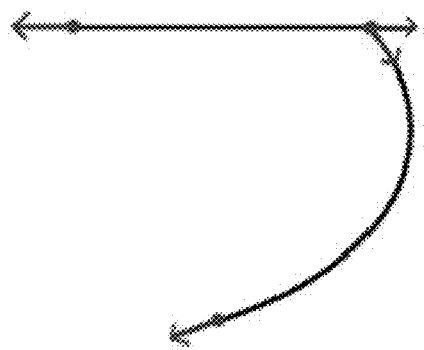
Figure 21C:
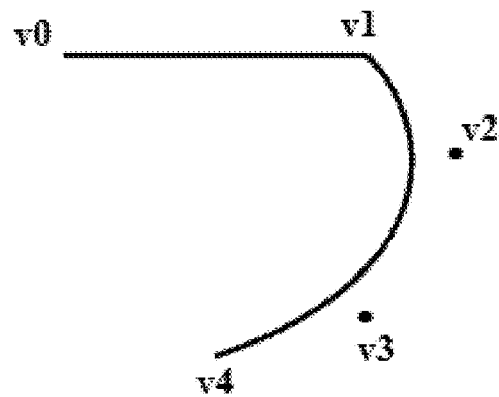

In an example without pre-processing, as illustrated in FIG. 21C five vertices may define the path, primitive types are as follows: [Line, Cubic]. The path is not closed. An example process may make following API call: (1) drawNonIndexedPrimType(numIndices=5, closed=false), (2) IA will start generating primitives based on the primitive types. Since this is an open path, there are caps at the beginning and end of the path.

In an example, output be as follows:

| PrimType | Indices |
| --- | --- |
| Cap__Line | 0, 1 |
| Line | 0, 1 |
| Join__Line__Cubic | 0, 1, 2, 3, 4 |
| Cubic | 1, 2, 3, 4 |
| Cap__Cubic | 4, 3, 2, 1 |

(Note that indices are in reverse order for ending cap)

An example may have four different types of path segments (line, quadratic, cubic, elliptic), we have 4×4=16 join primitive types. In an example a vertex shader 46 may process X and Y coordinates that may have appropriate world/view/projections applied. For simplicity, we assume identity transformation, hence the input remains unchanged. A control point hull shader may perform the following process for caps and join:

```
if( ( join AND (ControlPointId == 1 or 2) ) OR (cap AND ControlPointId
== 1) )
    {
    // convert tangent to angle for faster lerping later
    normalizedTangent = normalize( inputPatch[ControlPointId] )
    angle = acos( normalizedTangent.x )
    if ( normalizedTangent.y < 0 )
        angle = 2.0*PI - angle;
    // save the angle representation in the Z coordinate of the control
point vertex
        output.z = a0;
    }
```

Control points 1 and 2 for joins, and control point 1 for caps contain the tangent data. We convert these tangents to angular representation and save them in the z coordinate, which was not used previously. Hence, the input to tessellator 50 then will be the following:

```
// cap = 6.0f
{ XMFLOAT3( -0.4f, 0.8f, 6.0f) }, // location
    { XMFLOAT3( 0.8f, 0.0f, 0.0f) }, // tangent
    { XMFLOAT3( 0.0f, 0.0f, 1.0f) },
    { XMFLOAT3( 0.0f, 0.0f, 1.0f) },
// line = 2.0f
{ XMFLOAT3( -0.4f, 0.8f, 2.0f) }, // start point
    { XMFLOAT3( 0.4f, 0.8f, 1.0f) }, // end point
    { XMFLOAT3( 0.0f, 0.0f, 1.0f) },
    { XMFLOAT3( 0.0f, 0.0f, 1.0f) },
// join = 5.0f
{ XMFLOAT3( 0.4f, 0.8f, 5.0f) }, // location
    { XMFLOAT3( 0.8f, 0.0f, 0.0f) }, // first tangent
    { XMFLOAT3( 0.2f, -0.2f, 5.5f) }, // second tangent
    { XMFLOAT3( 0.0f, 0.0f, 1.0f) },
    // cubic = 3.0f
{ XMFLOAT3( 0.4f, 0.8f, 3.0f) }, // first control point
    { XMFLOAT3( 0.6f, 0.6f, 1.0f) }, // second control point
    { XMFLOAT3( 0.6f, 0.2f, 1.0f) }, // third control point
    { XMFLOAT3( 0.0f, 0.0f, 1.0f) }, // fourth control point
    // cap = 6.0f
{ XMFLOAT3( 0.0f, 0.0f, 6.0f) }, // location
    { XMFLOAT3( -0.6f, -0.2f, 3.46f) }, // tangent
    { XMFLOAT3( 0.0f, 0.0f, 1.0f) },
    { XMFLOAT3( 0.0f, 0.0f, 1.0f) },
```

An example may include constant HS will determine tessellation levels. For example, assume fixed tessellation, 4× for the cubic, 4× for round caps/joins and 1× for lines. Domain shader 52 may output is a vertex position, normal and type and evaluate tessellated vertices' locations and normals for lines, cubics and elliptic arcs. Domain shader 52 may convert normals to angular form and mark output as line segment. For curves, domain shader 52 may repeated control points might cause us to have zero tangents at curve start and end locations. To correctly determine tangents there, domain shader 52 may treat u=0.0f and 1.0f differently and linear interpolate intermediate values. Linear interpellation of the normal angle for cap and joins, convert back to Cartesian representation. Domain shader 52 may mark output as cap or join as appropriately. For u=0.0f and 1.0f, we directly use the tangents Cartesian representation instead of angular representation, to ensure water-tightness. Again, domain shader 52 may treat u=0.0f and 1.0f differently than intermediate values.

For u=0.0f, lines: Position is the first vertex. Normal is the endpoints difference.

```
// line = 2.0f
{ XMFLOAT3( -0.4f, 0.8f, 2.0f) }, // start point
    { XMFLOAT3( 0.4f, 0.8f, 1.0f) }, // end point
    { XMFLOAT3( 0.0f, 0.0f, 1.0f) },
    { XMFLOAT3( 0.0f, 0.0f, 1.0f) },
```

In an example, output position may be −0.4f, 0.8f (start point), output·norm may be 0.8f, 0.0f, tangent may be end point-start point, normal may be [−tan·y, tan·x], and output. type may be line. For curves: position may be the first control point. Normal may be the difference of first two nonrepeating control points.

```
//cubic = 3.0f
{ XMFLOAT3( 0.4f, 0.8f, 3.0f) }, // first control point
    { XMFLOAT3( 0.6f, 0.6f, 1.0f) }, // second control point
    { XMFLOAT3( 0.6f, 0.2f, 1.0f) }, // third control point
    { XMFLOAT3( 0.0f, 0.0f, 1.0f) }, // fourth control point
```

In an example, output position may be 0.4f, 0.8f (first control point), output·norm may be 0.2f, 0.2f, tangent may be the difference between first two non-equal control points, normal may be [−tan·y, tan·x], and output type may be line. Caps can be the position of the first vertex. Normal may be the Cartesian representation of the tangent vector rotated 90 degrees counterclockwise.

```
// cap = 6.0f
{ XMFLOAT3( −0.4f, 0.8f, 6.0f) }, // location
    { XMFLOAT3( 0.8f, 0.0f, 0.0f) }, // tangent
    { XMFLOAT3( 0.0f, 0.0f, 1.0f) },
    { XMFLOAT3( 0.0f, 0.0f, 1.0f) },
```

In another example, output position may be −0.4f, 0.8f (cap position), output·norm may be 0.0f, 0.8f. The example may use tangent Cartesian representation, normal=[−tan·y, tan·x] and output·type may be cap.

```
// cap = 6.0f
{ XMFLOAT3( 0.0f, 0.0f, 6.0f) }, // location
    { XMFLOAT3( −0.6f, −0.2f, 3.46f) }, // tangent
    { XMFLOAT3( 0.0f, 0.0f, 1.0f) },
    { XMFLOAT3( 0.0f, 0.0f, 1.0f) },
```

In another example, output position may be 0.0f, 0.0f (cap position), output·norm may be 0.2f, −0.6f. The example may use tangent Cartesian representation, normal=[−tan·y, tan·x] and have output·type equal to cap. For joins the position is the first vertex. Normal it is the Cartesian representation of the first tangent vector rotated 90 degrees counterclockwise.

```
// join = 5.0f
{ XMFLOAT3( 0.4f, 0.8f, 5.0f) }, // location
    { XMFLOAT3( 0.8f, 0.0f, 0.0f) }, // first tangent
    { XMFLOAT3( 0.2f, −0.2f, 5.5f) }, // second tangent
    { XMFLOAT3( 0.0f, 0.0f, 1.0f) },
```

In another example, output position may be 0.4f, 0.8f (join position), output·norm may be 0.0f, −0.8f and the example may use the first tangent Cartesian representation, normal= [−tan·y, tan·x] with an output·type=join. For this example u=1.0f, with lines in the position of the last vertex. Normal is the endpoints difference.

```
// line = 2.0f
{ XMFLOAT3( −0.4f, 0.8f, 2.0f) }, // start point
    { XMFLOAT3( 0.4f, 0.8f, 1.0f) }, // end point
    { XMFLOAT3( 0.0f, 0.0f, 1.0f) },
    { XMFLOAT3( 0.0f, 0.0f, 1.0f) },
```

In another example, output position may be 0.4f, 0.8f (end point) and output·norm may be 0.8f, 0.0f. In the example, the tangent may be the end point-start point and the normal may be [−tan·y, tan·x]. The output·type may be line. For curves the position may be the last control point. Normal is the difference of last two nonrepeating control points.

```
// cubic = 3.0f
{ XMFLOAT3( 0.4f, 0.8f, 3.0f) }, // first control point
    { XMFLOAT3( 0.6f, 0.6f, 1.0f) }, // second control point
    { XMFLOAT3( 0.6f, 0.2f, 1.0f) }, // third control point
    { XMFLOAT3( 0.0f, 0.0f, 1.0f) }, // fourth control point
```

In another example, output position may be 0.0f, 0.0f (last control point) and output·norm=0.2f, −0.6f. In the example, the tangent may be difference between first two non-equal control points and the normal=[−tan·y, tan·x]. The output·type may be line. A caps position may be the first vertex. Normal may be the Cartesian representation of the tangent vector rotated 90 degrees clockwise.

```
// cap = 6.0f
{ XMFLOAT3( −0.4f, 0.8f, 6.0f) }, // location
    { XMFLOAT3( 0.8f, 0.0f, 0.0f) }, // tangent
    { XMFLOAT3( 0.0f, 0.0f, 1.0f) },
    { XMFLOAT3( 0.0f, 0.0f, 1.0f) },
```

In another example, output position may be −0.4f, 0.8f (cap position), output·norm may be 0.0f, −0.8f and the example may use tangent Cartesian representation, with normal= [tan·y, −tan·x] and an output·type that may be cap.

```
// cap = 6.0f
{ XMFLOAT3( 0.0f, 0.0f, 6.0f) }, // location
    { XMFLOAT3( −0.6f, −0.2f, 3.46f) }, // tangent
    { XMFLOAT3( 0.0f, 0.0f, 1.0f) },
    { XMFLOAT3( 0.0f, 0.0f, 1.0f) },
```

In another example, output position may be 0.0f, 0.0f (cap position) with output·norm that is −0.2f, 0.6f and with a use tangent Cartesian representation, normal=[tan·y, −tan·x] and an output·type that is cap. For joins the position is the first vertex. Normal is the Cartesian representation of the second tangent vector rotated 90 degrees counterclockwise.

```
// join = 5.0f
{ XMFLOAT3( 0.4f, 0.8f, 5.0f) }, // location
    { XMFLOAT3( 0.8f, 0.0f, 0.0f) }, // first tangent
    { XMFLOAT3( 0.2f, −0.2f, 5.5f) }, // second tangent
    { XMFLOAT3( 0.0f, 0.0f, 1.0f) },
```

In another example, output position may be 0.4f, 0.8f (join position) with output·norm that is 0.2f, 0.2f. The example may use second tangent Cartesian representation, with a normal that is [−tan·y, tan·x] and an output·type that is type join.

In the example, u=i/T (intermediate values), lines may have no intermediate tessellation values for lines and a curve's position may be found using the equation $$C0(1-u)^3 + 3C1(1-u)^2 u + 3C2(1-u) \cdot u^2 + C3 u^3$$

Tangent are found using the derivative of the position equation:

$$-3C0(1-u)^2 - 6C1(1-u)u + 3C1(1-u)^2 - 3C2 u^2 + 6C2(1-u)u + 3C3 u^2$$

```
// cubic = 3.0f
{ XMFLOAT3( 0.4f, 0.8f, 3.0f) }, // first control point
    { XMFLOAT3( 0.6f, 0.6f, 1.0f) }, // second control point
    { XMFLOAT3( 0.6f, 0.2f, 1.0f) }, // third control point
    { XMFLOAT3( 0.0f, 0.0f, 1.0f) }, // fourth control point
```

In another example output·pos may use cubic Bezier formula and output·norm may use cubic Bezier formula derivative to find tangent. The normal may be [−tan·y, tan·x] and the output·type may be line. Caps (Round only) may have no intermediate values for square caps. For round caps, position may be the first vertex. Normal may be found by first linear interpolating the angular tangent with its opposite direction (add PI), then rotating 90 degrees counterclockwise.

```
// cap = 6.0f
{ XMFLOAT3( -0.4f, 0.8f, 6.0f ) }, // location
    { XMFLOAT3( 0.8f, 0.0f, 0.0f) }, // tangent
    { XMFLOAT3( 0.0f, 0.0f, 1.0f) },
    { XMFLOAT3( 0.0f, 0.0f, 1.0f) },
```

In another example, output position may be −0.4f, 0.8f (cap position). The output·norm may be −sin(lerpedAngle), cos(lerpedAngle) with lerp angle with (angle+PI), (1−u)*angle+u*(angle+PI), tangent=cos(lerpedAngle), sin(lerpedAngle), normal=[−tan·y, tan·x], and output·type=cap.

```
// cap = 6.0f
{ XMFLOAT3( 0.0f, 0.0f, 6.0f ) }, // location
    { XMFLOAT3( -0.6f, -0.2f, 3.46f) }, // tangent
    { XMFLOAT3( 0.0f, 0.0f, 1.0f) },
    { XMFLOAT3( 0.0f, 0.0f, 1.0f) },
```

In another example, output position may be 0.0f, 0.0f (cap position), output·norm may be −sin(lerpedAngle), cos(lerpedAngle), lerp angle with (angle+PI), (1−u)*angle+u*(angle+PI), tangent=cos(lerpedAngle), sin(lerpedAngle), normal=[−tan·y, tan·x], and output·type=cap. For joins, position may be the first vertex. Normal may be the Cartesian representation of the second tangent vector rotated 90 degrees counterclockwise.

```
// join = 5.0f
{ XMFLOAT3( 0.4f, 0.8f, 5.0f ) }, // location
    { XMFLOAT3( 0.8f, 0.0f, 0.0f) }, // first tangent
    { XMFLOAT3( 0.2f, -0.2f, 5.5f) }, // second tangent
    { XMFLOAT3( 0.0f, 0.0f, 1.0f) },
```

In another example, output position may be 0.4f, 0.8f (join position), output·norm may be −sin(lerpedAngle), cos(lerpedAngle), lerp first tangent angle with second tangent angle, (1−u)*firstAngle+u*secondAngle, tangent may be=cos(lerpedAngle), sin(lerpedAngle), and normal=[−tan·y, tan·x]. The output type may be join.

Figure 21D:
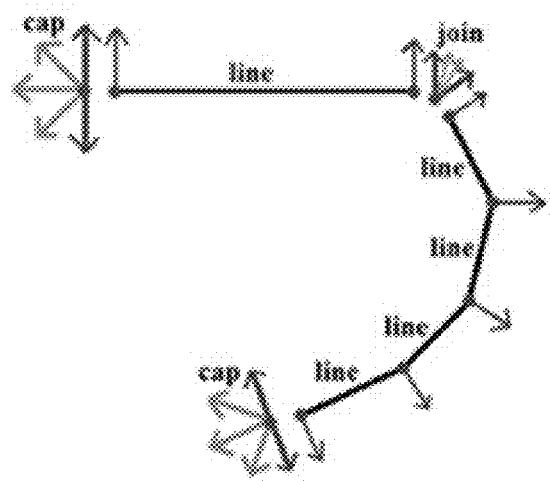
Figure 22A:
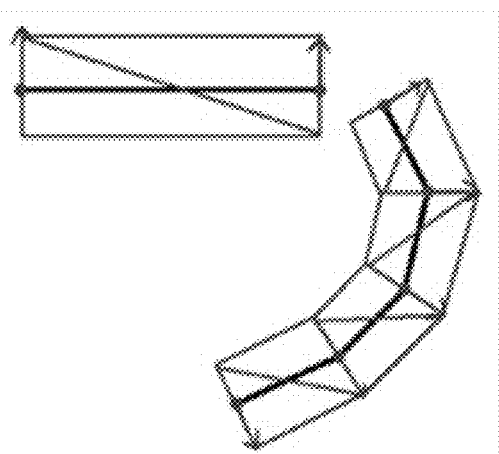
FIGS. 22A-22B are diagrams illustrating another example in accordance with one or more examples described in this disclosure.
Figure 22B:
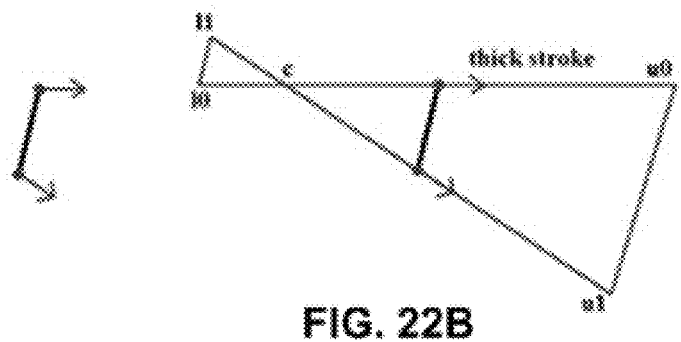

The example of FIG. 21D may have the illustrated line segments, caps, and joins to feed into geometry shader 54. In examples without dashing, and in which re-tessellation/cusps are not needed a single pass method may be used and the inputs discussed below may be sent to geometry shader 54:

In this example, input coordinates are still two-dimensional. Output will be 4 dimensional (SV_Position). The line type segments in both normal directions at endpoints to create stroke area may be thickened as illustrated in FIGS. 22A-B. In some examples, a quad may be determined for which the output may be two triangles. In some other examples, where the curvature is high compared to line length and/or stroke width is thick, a "butterfly" may be determined, as illustrated in FIG. 22B. In the example, strokewidth is not too high to cause butterflies. In the butterfly case, the center c, and send two triangles (u0, u1, c) and (l0, l1, c) may be found. There may be rare bleeding issue due to t-joints. To eliminate t-joints, two extra triangles: (u0,l0, c) and (u1,l1, c) may be output. These four triangles can be packed into eight vertices using triangle strip primitive type. It may be a rare phenomenon. Some examples may use the two triangle (maxvertices: 6), while other examples may use the 4-triangle (maxvertices: 8) approach.

Figure 23A:
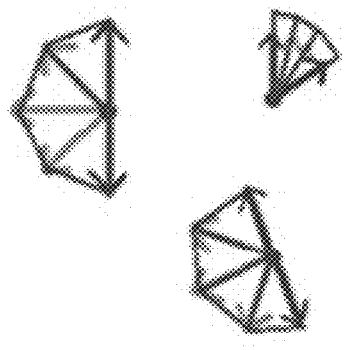
FIGS. 23A-23C are diagrams illustrating another example in accordance with one or more examples described in this disclosure.
Figure 23B:
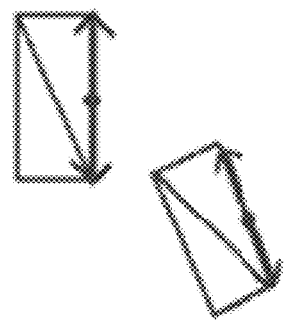
Figure 23C:
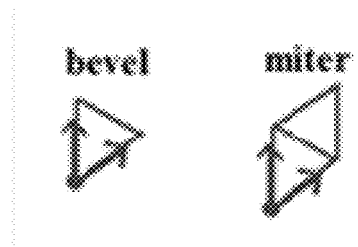

FIGS. 23A-23C illustrate an example for create one triangle for round caps/joins (tessellated). Each of the following caps/join will have four different geometry shader 54 instances, hence four triangles show. If the caps were square, they would look like like the illustrated example of FIG. 23B. In an example bevel and miter join would look like the example of FIG. 23C (one gs instance). In the example z coordinate from the constant buffer to every output vertex may be added.

Figure 24:
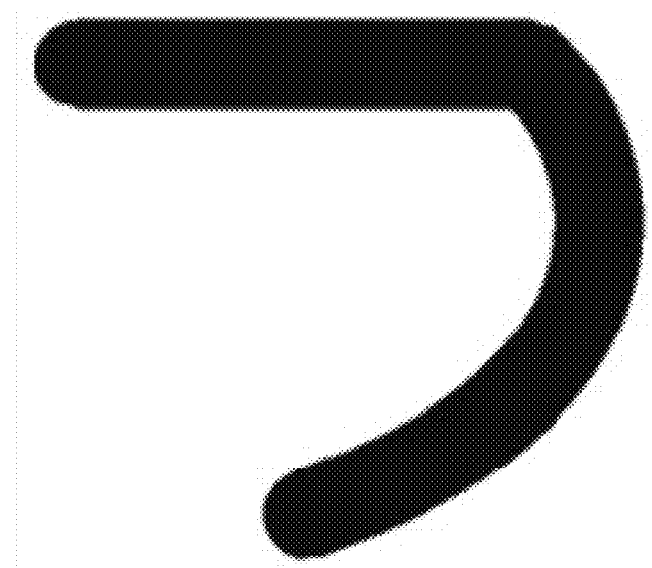
FIG. 24 is a diagram illustrating an example curve in accordance with one or more examples described in this disclosure.
Figure 25:
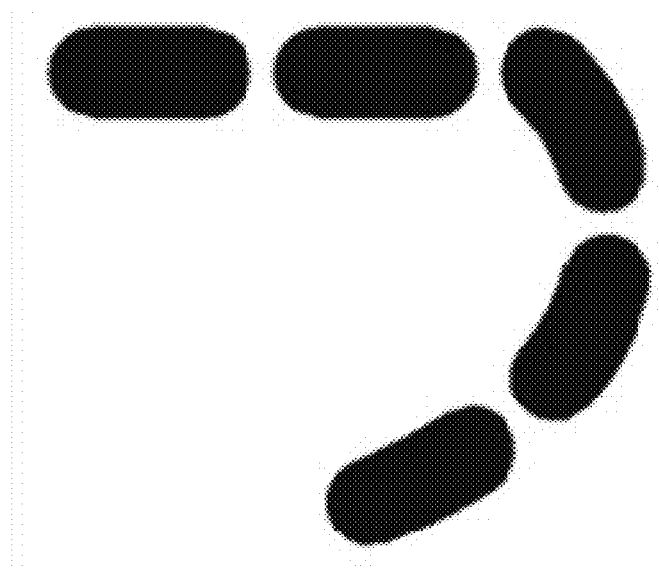
FIG. 25 is a diagram illustrating an example curve in accordance with one or more examples described in this disclosure.
Figure 26A:
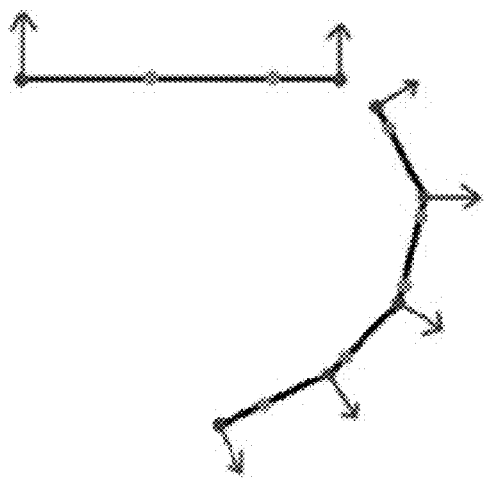
FIGS. 26A-26C are diagrams illustrating an example curve processed in accordance with one or more examples described in this disclosure.
Figure 26B:
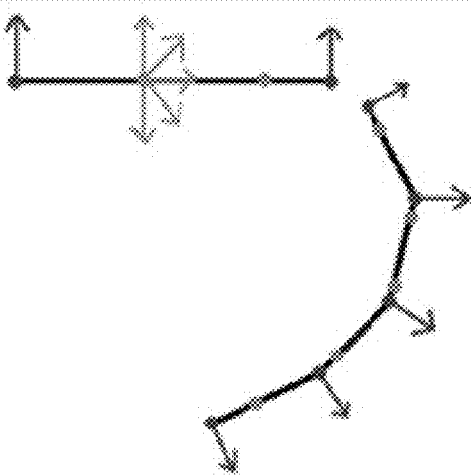
Figure 26C:
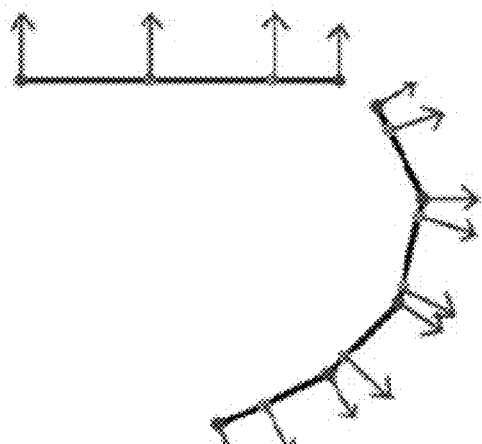

In an example, the pixel shader may return stroke color. The result may be (round cap/join used), as illustrated in FIG. 24. For the pixel shader, on single pass solution, the result may be cut locations that may not accurately match FIG. 24, as illustrated in FIG. 25

FIG. 26A-26D illustrates dashing and handle cusp cases. An example may not use the GS, and stream output the following from domain shader 52 to a second pass hull shader. The (HS') Dash/Cusp Hull Shader (1) compute tessellator inputs: Segment Length, Re-Tessellation Delta, Inverse of Length, SV_PrimType. The segment length is the Length of the line segment. It will be zero for caps/joins. Re-Tessellation Delta is the length of the line segment divided by re-tessellation amount. The maximum length of a line segment to come out of tessellator. The re-tessellation amount is equal to the angle between normals/RETESSELLATION_ANGLE (fixed). The delta is the length divided by the re-tessellation amount. The inverse of length is 1.0f/Segment Length. Not used for caps/joins.

In an example, a modified tessellator may be used. Caps from first rendering pass will essentially bypass the tessellation on second pass. They go all the way to the GS unchanged. Joins will either be dropped or sent unchanged, depending of if they land on a dash on empty space. In the example, the only join we have lands on a dash are so it is kept. The modified tessellator may cut the line segment according to the dash pattern and re-tessellation delta, using u coordinates. Cut locations are marked with dots, as illustrated in FIG. 27A. U coordinates to be sent to domain shader 52 will be the ratio of cut location distance from starting point divided by the segment length. If a dash cut happens to be longer than re-tessellation delta, we would cut first at the re-tessellation delta length. In other words, no new line segment can be longer than the re-tessellation delta of its parent segment. Set primitive type to be line.

Figure 27:
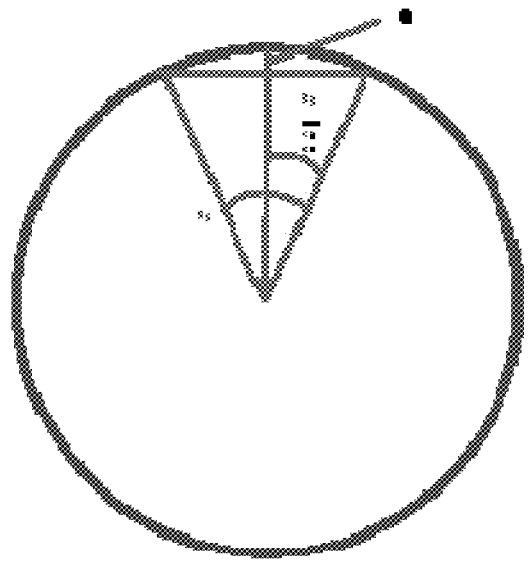
FIG. 27 is a diagram illustrating an example in accordance with one or more examples described in this disclosure.

The modified tessellator may then create caps at every cut location using v coordinates. Round caps will be generated in a similar fashion to round caps from the first rendering pass. The modified tessellator may use v coordinates to handle the normal rotation at cap locations. Following illustrates the round cap on the first cut location. Every dash cut location will have a cap. Re-tessellation cuts will not have dashes, as illustrated in FIG. 27 B.

In an example a (DS') Dash/Cusp Domain Shader (Line Segment, u, v) may be used. Linear interpretation of normals and positions at tessellation locations may be performed by the Dash/Cusp Domain Shader. The Dash/Cusp Domain Shader may convert normals from angular form back to Cartesian form with u is used to lerp position and normal angle and v coordinate is used to rotate the normal, so as to create round cap tessellation as illustrated in FIG. 27C. Geometry shader 54 may use a single pass solution. The pixel shader may use a single pass solution. Result may be cut locations that may not accurately match above illustrations, which are only examples.

Figure 28:
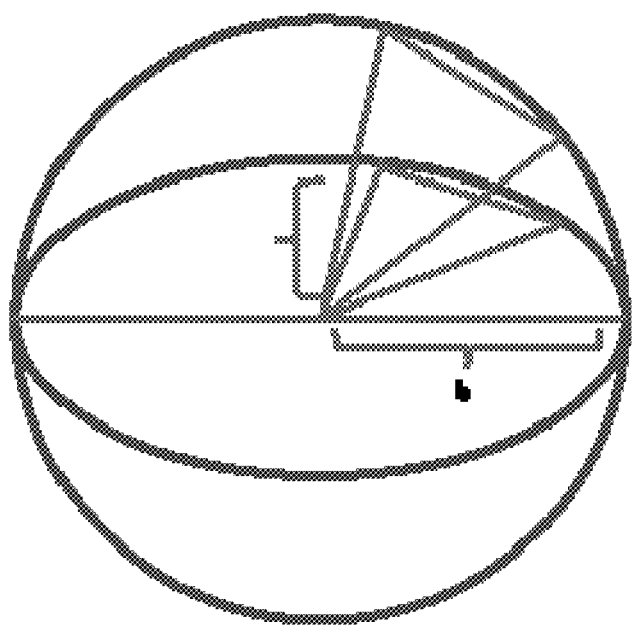
FIG. 28 is a diagram illustrating an example curve in accordance with one or more examples described in this disclosure.

FIG. 28 illustrates an example of finding an optimal tessellation factor. For example, the tessellation factor for elliptic arcs may be found by first finding the optimal tessellation factor for a circle. To determine the tessellation factor, largest angle may be found so that the difference between the line approximation and the arc is less than half pixel. The difference between the line and the arc is:

$$e = r - r\cos\frac{\theta}{2}$$

So:

$$\theta = 2\cos^{-1}\left(1 - \frac{e}{r}\right) = 2\cos^{-1}\left(1 - \frac{p}{2r}\right)$$

where p is the pixel size.

The tessellation factor is $\alpha/\theta$, where $\alpha$ is the angle of the arc.

For an ellipse, the parameterized equation is:

$$(x,y) = (a\cdot\sin(\theta), b\cdot\cos(\theta)), \text{ assume } b>a$$

It could be treated as a circle scaled along the x-direction by a factor of a/b, which is smaller than 1. So it's safe to say that the error of the tessellated ellipse will be smaller than the error of a tessellated circle of radius b using the same tessellation factor. So w the same formula of arc may be used:

$$\theta = 2\cos^{-1}\left(1 - \frac{e}{r}\right) = 2\cos^{-1}\left(1 - \frac{p}{2r}\right),$$

where r=max(a, b)

Figure 29:
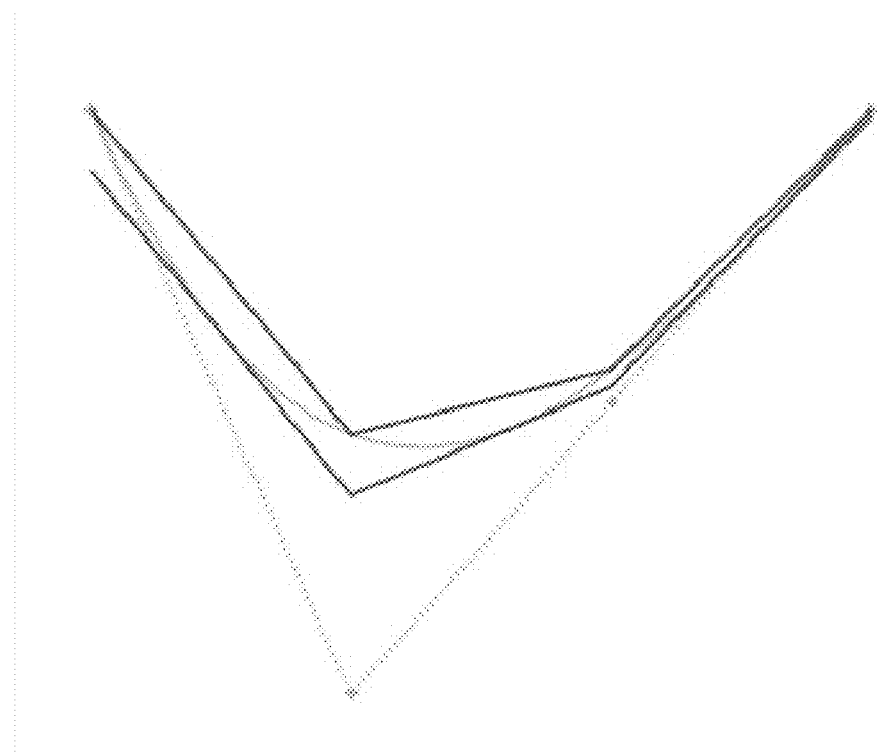
FIG. 29 is a diagram illustrating an example curve in accordance with one or more examples described in this disclosure.

In another example, the tessellation factor for cubic and quadratic Bezier curves may be found. Quadratic curves can be converted to cubics before processing. A technique called subdividable linear efficient variety enclosure (SLEVEs) may be used to estimate the tessellation factor of cubic curves, as illustrated in FIG. 29.

Given a polynomial function and the number of segments (tessellation factor), SLEVEs can efficiently compute a piecewise linear bound of the curve with uniform knots. So with SLEVEs we can estimate the error of the piecewise linear approximation of a curve. In addition, SLEVEs guarantee that as the tessellation factor increase, the bounding width (error) will decrease quadratically. So given a required error, we can estimate a safe tessellation factor. The whole algorithm follows:
1. For the input curve, calculate its SLEVE with an initial tessellation factor $t_0$ (6 for example).
2. Get the maximum error w for this initial SLEVE.
3. Given the required error e, calculate the final tessellation factor using this formula:

$$t_0 \times \sqrt{\frac{w}{e}}$$

For more detail about the computing of SLEVEs and its error, please refer to these 2 papers: Efficient Pixel-Accurate Rendering of Curved Surfaces. Young In Yeo, Lihan Bin and Jörg Peters, I3D 2012 and Mid-structures of subdividable linear efficient function enclosures linking curved and linear geometry. PETERS, J. 2004. In Proceedings of SIAM conference, Seattle, November 2003, each of which is incorporated herein by reference.

Tessellation factor for Stroke for Arc and Ellipse, may simply add the stroke width to the radius to calculate the tessellation factor. For Cubic, the stroke line is no longer a polynomial curve. It has square root and it's a rational function. So we can no longer using SLEVEs to bound it. Actually, theoretically there may not exist a big enough tessellation factor for cubic. Imagine a cubic with a sharp cusp, where the normal is no longer continuous through the curve. For this case not matter what tessellation factor we set the error will be big. In our implementation, in order to solve this problem, we re-tessellate the curve and interpolate the normal if we found the two normal at the endpoints of a segment is too different. We think this also will help in other case even if we don't have a safe tessellation factor, so for stoke we use the same tessellation factor as filling.

Comparing the optimal tessellation to reference implementation, in the conformance test, the reference implementation uses a fixed tessellation factor 256 for all curves, which is very high considering all the test case is smaller than 64 by 64 pixel. In our implementation, a fixed tessellation factor 64 can pass all the tests.

Figure 30:
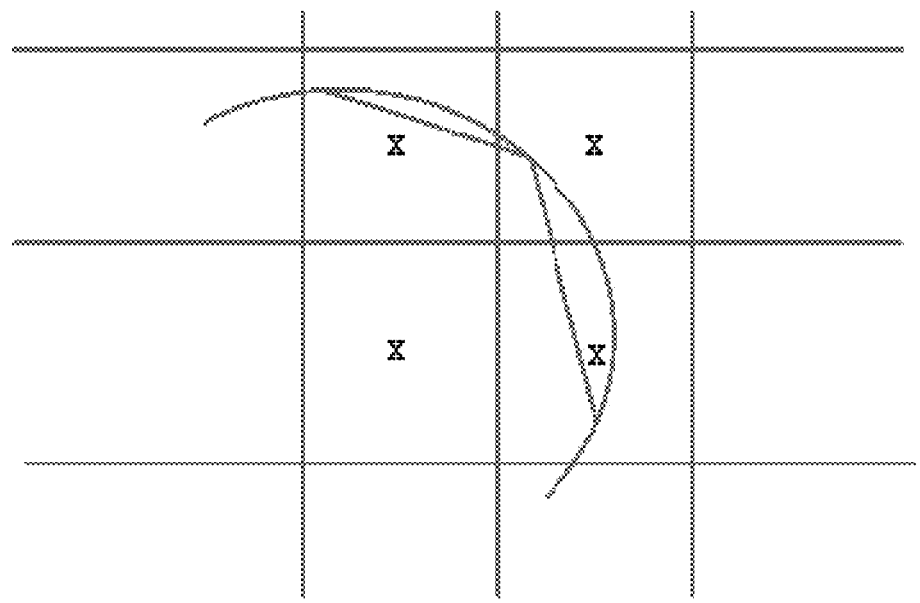
FIG. 30 is a diagram illustrating an example curve in accordance with one or more examples described in this disclosure.

After applying the above optimized tessellation factor estimation with required error equals to half pixel size, much smaller tessellation factor in most of the conformance test are calculated. In some cases the test may be failed because the small bounded error doesn't guarantee the output to be exactly same. It can only guarantee the difference will be no more than 1 pixel along the boundary. Consider the illustration of FIG. 30.

For the lower right pixel, the center of the pixel sits right between the real curve and the tessellated curve. So the output will have 1 pixel difference. We try to decrease the required error from half pixel to ⅛ a pixel and we pass almost all the test case (only for one test case we fail by one pixel).

In addition to smaller tessellation factor, the optimized tessellation factor can adaptively change to guarantee the render quality when use zoom in, which cannot be achieved by fixed tessellation factor. So if there is a curve that requires more than 256 tessellated line segments to be pixel-accurate, we will actually beat the reference implementation.

Figure 31:
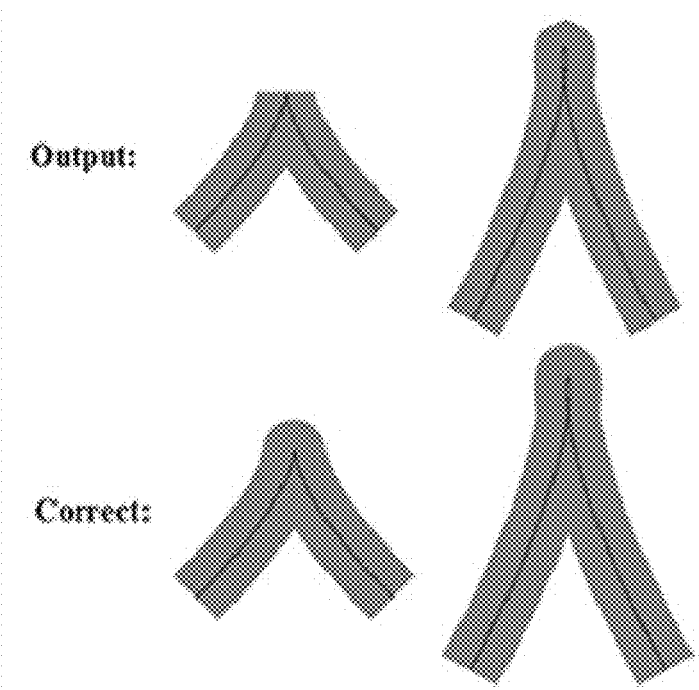
FIG. 31 is a diagram illustrating example outputs in accordance with one or more examples described in this disclosure.

FIGS. 31-34 illustrate examples of re-tessellation and cutting. Line segments from first rendering pass can have too much deviation in normal directions. If a curve has high curvature at certain parts, these parts will have such line segments after tessellation. No matter how high is our tessellation level, we will still have line segments with normals wide apart. Simply stroking these line segments will result in visual artifacts, as illustrated in FIG. 31.

Figure 32:
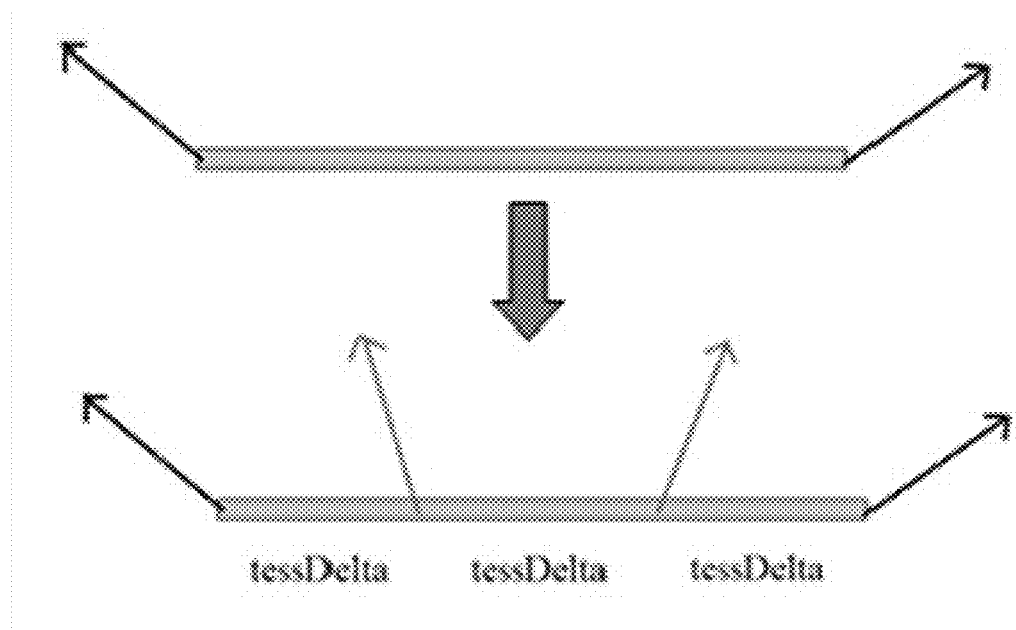
FIG. 32 is a diagram illustrating an example line segment in accordance with one or more examples described in this disclosure.

As illustrated in FIG. 32, an example may include re-tesselation on these line segments to correct this problem. In the example, a maximum angular deviation in normals determines the re-tessellation level. Then the line length may be divided by this re-tessellation level to find the length of the desired re-tessellated lines (tessDelta). New normal are found by linear interpolating angular representation of the endpoint normals, then converting back to Cartesian representation.

Figure 33:
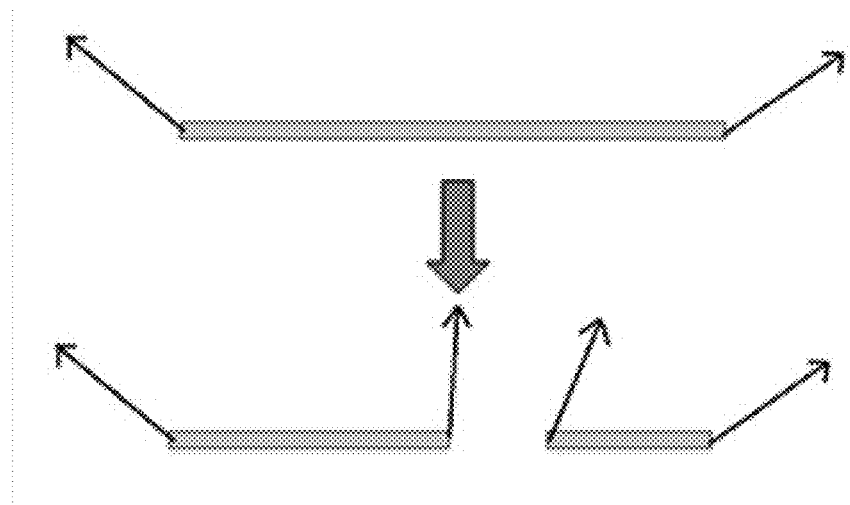
FIG. 33 is a diagram illustrating an example line segment in accordance with one or more examples described in this disclosure.
Figure 34:
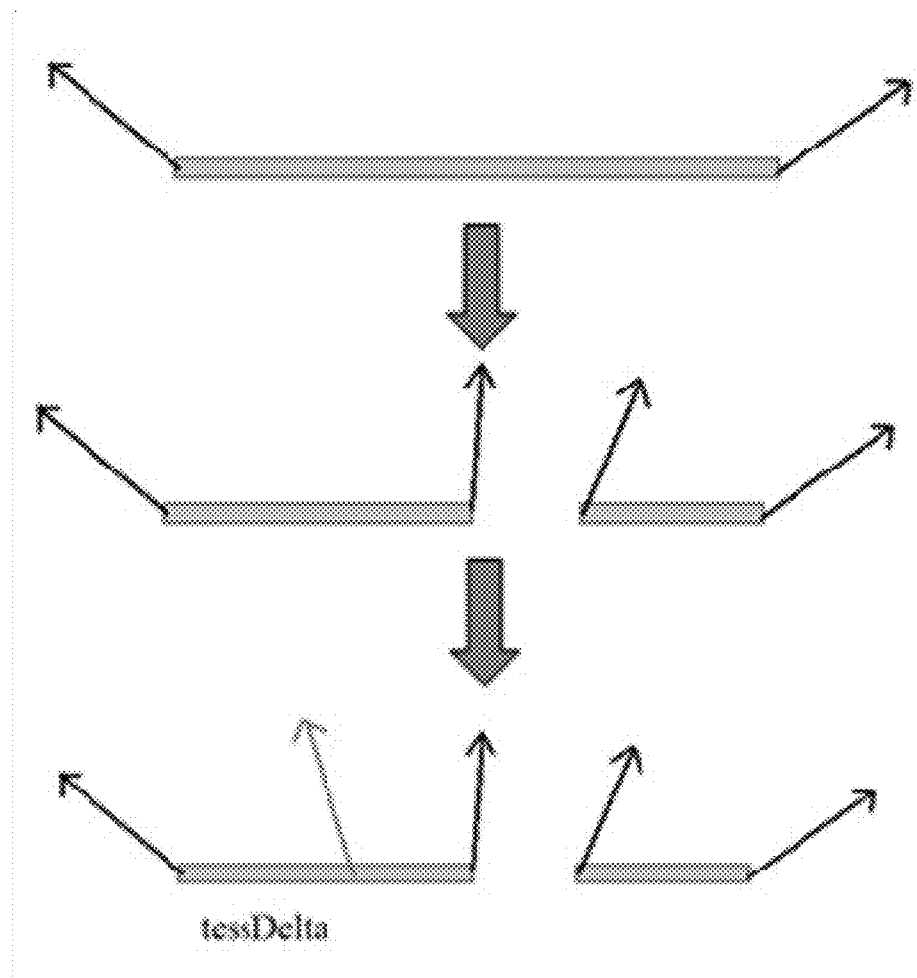
FIG. 34 is a diagram illustrating an example line segment in accordance with one or more examples described in this disclosure.

In the example line segments may also be according to a dash pattern, as illustrated in FIG. 33. By start cutting according to the dash pattern, but if a new line segment is larger than 'tessDelta', it is cut at 'tessDelta' lengths too as illustrated in FIG. 34.

Figure 35:
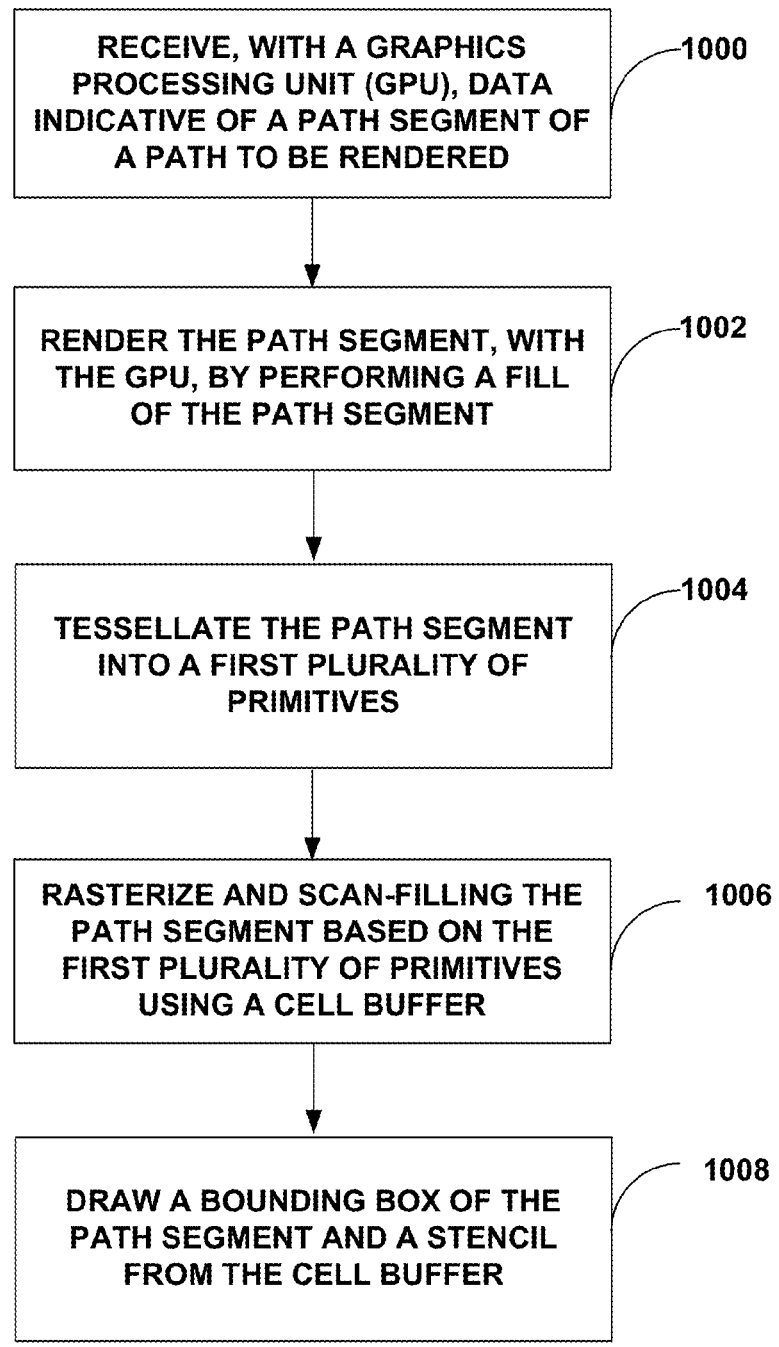
FIG. 35 is a flowchart illustrating an example method in accordance with one or more examples described in this disclosure.

FIG. 35 is a flowchart illustrating an example method in accordance with one or more examples described in this disclosure. In the illustrated example, GPU 12 receives data indicative of a path segment of a path to be rendered (1000). In the illustrated example, the GPU 12 renders the path segment by performing a fill of the path segment (1002). In the illustrated example, the GPU 12 filling the path segment includes tessellating the path segment into a first plurality of primitives (1004). In the illustrated example, the GPU 12 rasterizes and scan-filling the path segment based on the first plurality of primitives using a cell buffer (1006). In the illustrated example, the GPU 12 draws a bounding box of the path segment and a stencil from the cell buffer (1008). Additionally, in some examples, the path segment may be rendered without using a central processing unit (CPU).

In some examples, the first plurality of primitives and the second plurality of primitives may be the same primitives. The plurality of primitives may include a plurality of line segments. Additionally, the path segment comprises one of a line, an elliptic arc, a quadratic Bézier curve and a cubic Bézier curve.

In an example, the GPU 12 may further be configured to determine how a graphical shape with more than one closed outline will be filled based on an odd-even rule. The odd-even rule determines if a point should be considered inside by drawing a ray from the point to infinity in any direction and counting the number of path segments from the given shape that the ray crosses, if the number of path segments is odd the point is considered inside the curve, if the number of path segments is even the point is considered outside the curve.

GPU 12 may determine how a graphical shape with more than one closed outline will be filled based on a non-zero rule. The non-zero winding rule determines the direction of stroke for each part of the curve, for a given curve C and a given point P, the non-zero winding rule determines if a point should be considered inside by (1) construct a straight line out from P in any direction towards infinity, (2) find all the intersections of C with this ray, and (3) score up the winding number and wherein scoring the winding number includes: (1) for every clockwise intersection, the curve passing through the ray from left to right, as viewed from P, subtract 1, (2) for every counter-clockwise intersection, curve passing from right to left, as viewed from P, add 1, if the total winding number is zero, P is outside C, otherwise, it is inside.

Figure 36:
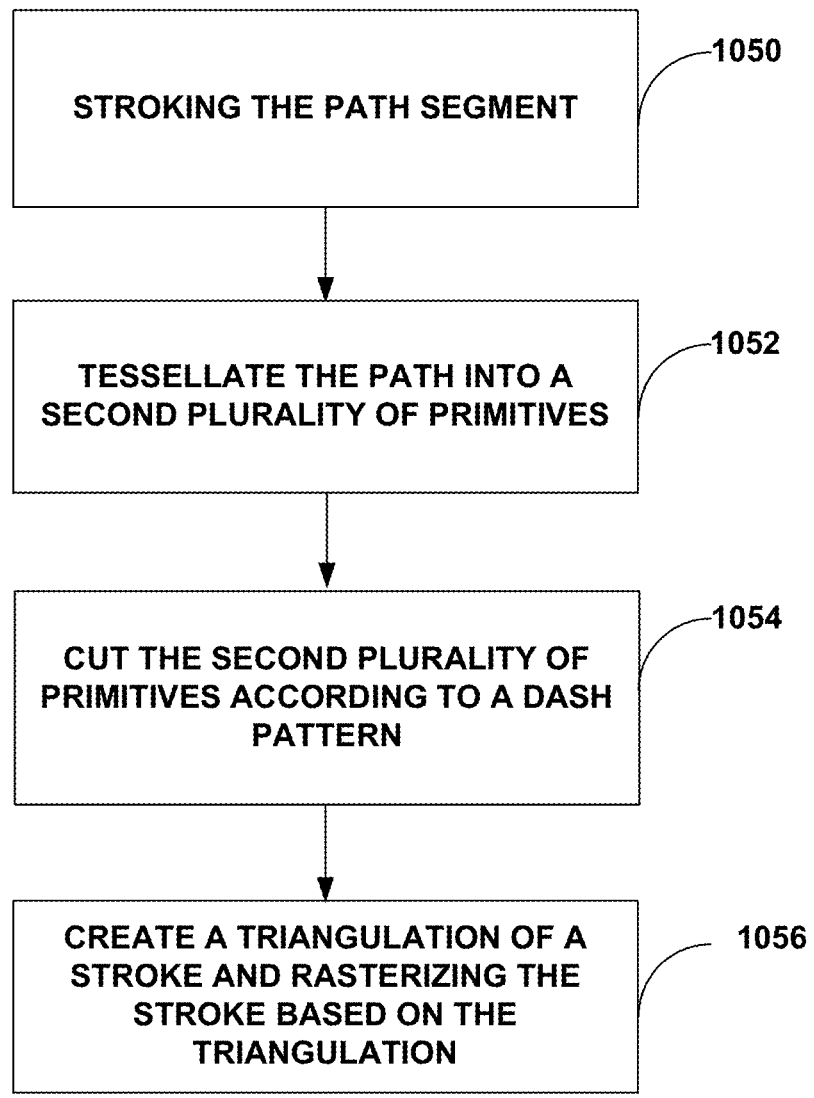
FIG. 36 is a flowchart illustrating an example method in accordance with one or more examples described in this disclosure.

FIG. 36 is a flowchart illustrating an example method in accordance with one or more examples described in this disclosure. A GPU 12 strokes the path segment (1050). For example, GPU 12 may tessellate the path into a second plurality of primitives (1052). Additionally, GPU 12 may cut the second plurality of primitives according to a dash pattern (1054). GPU 12 may create a triangulation of a stroke and rasterizing the stroke based on the triangulation (1056).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of path rendering comprising:
receiving, with a graphics processing unit (GPU), data indicative of a path segment of a path to be rendered; and
rendering the path segment, with the GPU, wherein rendering the path segment comprises filling the path segment and stroking the path segment, wherein filling the path segment comprises:
tessellating, with the GPU, the path segment into a first plurality of primitives including a triangle per primitive,
storing the first plurality of primitives in a stencil buffer, and
drawing a bounding box of the path segment and rendering the bounding box with a stencil test enabled for the first plurality of primitives stored in the stencil buffer; and
wherein stroking the path segment comprises:
tessellating, with the GPU, the path into a second plurality of primitives,
determining that a difference in angles between at least two normals in the second plurality of primitives is wider than a maximum angular deviation threshold,
in response to determining that the difference in angles between the at least two normal in the second plurality of primitives is wider than the maximum angular deviation threshold, re-tessellating, with the GPU, the second plurality of primitives,
cutting, with the GPU, the second plurality of primitives according to a dash pattern,
creating, with the GPU, a cap at a location of a cut, and
creating, with the GPU, a triangulation of a stroke and rasterizing the stroke based on the triangulation.

2. The method of claim 1, wherein drawing the bounding box comprises drawing the bounding box of the path segment using a fill color.

3. The method of claim 1, wherein the path segment is rendered without using a central processing unit (CPU).

4. The method of claim 1, wherein the plurality of primitives comprises a plurality of line segments.

5. The method of claim 1, wherein the data indicative of the path segment comprises one of a line, an elliptic arc, a quadratic Bezier curve and a cubic Bezier curve.

6. The method of claim 1, further comprising determining how a graphical shape including the path segment and having more than one closed outline will be filled based on an odd-even rule.

7. The method of claim 6, wherein the odd-even rule determines if a point should be considered inside by drawing a ray from the point to infinity in any direction and counting the number of path segments from the given shape that the ray crosses, if the number of path segments is odd the point is considered inside the curve, if the number of path segments is even the point is considered outside the curve.

8. The method of claim 1, further comprising determining how a graphical shape including the path segment and having more than one closed outline will be filled based on a non-zero rule.

9. The method of claim 8, wherein the non-zero rule determines the direction of stroke for each part of the curve, for a given curve C and a given point P, the non-zero winding rule determines if a point should be considered inside by (1) construct a straight line out from P in any direction towards infinity, (2) find all the intersections of C with this ray, and (3) score up the winding number and wherein scoring the winding number includes: (1) for every clockwise intersection, the curve passing through the ray from left to right, as viewed from P, subtract 1, (2) for every counter-clockwise intersection, curve passing from right to left, as viewed from P, add 1, if the total winding number is zero, P is outside C, otherwise, it is inside.

10. The method of claim 1, wherein the data indicative of a path segment comprises a line and stroking comprises widening the line by thickening the line in two directions perpendicular to the line.

11. The method of claim 1, wherein the data indicative of a path segment comprises a curve and stroking further comprises:
splitting the curve into line segments;
determining a stroke width; and
creating a pair of triangle strips positioned to widen at least one of the line segments.

12. The method of claim 1, wherein the GPU implements a DirectX11 application programming interface for handling graphics tasks.

13. The method of claim 12, wherein the GPU further implements a draw call function configured to process a number of indices and path segment types.

14. The method of claim 13, wherein the GPU further implements an information primitive type to allow for the production of triangles for strokes and lines for fill.

15. The method of claim 1, wherein tessellating the path segment comprises tessellating the path segment using a fixed-function tessellation engine of the GPU and a domain shader program executing on a shader unit of the GPU.

16. An apparatus configured to perform graphics processing comprising:
a memory unit configured to store data indicative of a path segment of a path to be rendered; and
a graphics processing unit (GPU) configured to:
receive the data indicative of the path segment of the path to be rendered; and
render the path segment, wherein to render the path segment the GPU is configured to fill the path segment and stroke the path segment, wherein to fill the path segment, the GPU is configured to:
tessellate the path segment into a first plurality of primitives including a triangle per primitive,
store the first plurality of primitives in a stencil buffer, and
draw a bounding box of the path segment and render the bounding box with a stencil test enabled for the first plurality of primitives stored in the stencil buffer; and
wherein to stroke the path segment, the GPU is configured to:
tessellate the path into a second plurality of primitives,
determine that a difference in angles between at least two normals in the second plurality of primitives is wider than a maximum angular deviation threshold,
in response to determining that the difference in angles between the at least two normal in the second plurality of primitives is wider than the maximum angular deviation threshold, re-tessellate the second plurality of primitives,
cut the second plurality of primitives according to a dash pattern,
create a cap at a location of a cut,
create a triangulation of a stroke and rasterizing the stroke based on the triangulation.

17. The apparatus of claim 16, the graphics processing unit further configured to draw a bounding box of the path segment using a fill color.

18. The apparatus of claim 16, the graphics processing unit further configured to render the path segment without using a central processing unit (CPU).

19. The apparatus of claim 16, wherein the plurality of primitives comprises a plurality of line segments.

20. The apparatus of claim 16, wherein the path segment comprises one of a line, an elliptic arc, a quadratic Bezier curve and a cubic Bezier curve.

21. The apparatus of claim 16, the graphics processing unit further configured to determine how a graphical shape including the path segment and having more than one closed outline will be filled based on an odd-even rule.

22. The apparatus of claim 21, wherein the odd-even rule determines if a point should be considered inside by drawing a ray from the point to infinity in any direction and counting the number of path segments from the given shape that the ray crosses, if the number of path segments is odd the point is considered inside the curve, if the number of path segments is even the point is considered outside the curve.

23. The apparatus of claim 16, the graphics processing unit further configured to determine how a graphical shape including the path segment and having more than one closed outline will be filled based on a non-zero rule.

24. The apparatus of claim 16, wherein the non-zero rule determines the direction of stroke for each part of the curve, for a given curve C and a given point P, the non-zero winding rule determines if a point should be considered inside by (1) construct a straight line out from P in any direction towards infinity, (2) find all the intersections of C with this ray, and (3) score up the winding number and wherein scoring the winding number includes: (1) for every clockwise intersection, the curve passing through the ray from left to right, as viewed from P, subtract 1, (2) for every counter-clockwise intersection, curve passing from right to left, as viewed from P, add 1, if the total winding number is zero, P is outside C, otherwise, it is inside.

25. The apparatus of claim 16, wherein the data indicative of the path segment comprises a line and stroking comprises widening the line by thickening the line in two directions perpendicular to the line.

26. The apparatus of claim 16, wherein the path segment comprises a curve and the graphics processing unit is further configured to stroke by:
   splitting the curve into line segments;
   determining a stroke width; and
   creating a pair of triangle strips positioned to widen at least one of the line segments.

27. The apparatus of claim 16, wherein the graphics processing unit is further configured to implement a DirectX11 application programming interfaces for handling graphics tasks.

28. The apparatus of claim 27, the graphics processing unit further configured to implement a draw call function configured to process a number of indices and path segment types.

29. The apparatus of claim 28, the graphics processing unit further configured to implement an information primitive type to allow for the production of triangles for strokes and lines for fill.

30. The apparatus of claim 16, the graphics processing unit further configured to tessellate the path segment using a fixed-function tessellation engine of the GPU and a domain shader program executing on a shader unit of the GPU.

31. An apparatus comprising a graphics processing unit (GPU), the GPU comprising:
   means for receiving data indicative of a path segment of a path to be rendered; and
   means for rendering the path segment, wherein rendering the path segment comprises means for filling the path segment and means for stroking the path segment, wherein the means for filling the path segment comprises:
      means for tessellating the path segment into a first plurality of primitives including a triangle per primitive,
      means for storing the first plurality of primitives in a stencil buffer, and
      means for drawing a bounding box of the path segment and means for rendering the bounding box with a stencil test enabled for the first plurality of primitives stored in the stencil buffer; and
   wherein the means for stroking the path segment comprises:
      means for tessellating the path into a second plurality of primitives,
      means for determining that a difference in angles between at least two normals in the second plurality of primitives is wider than a maximum angular deviation threshold,
      means for re-tessellating the second plurality of primitives in response to determining that the difference in angles between the at least two normal in the second plurality of primitives is wider than the maximum angular deviation threshold,
      means for cutting the second plurality of primitives according to a dash pattern,
      means for creating a cap at a location of a cut, and
      means for creating a triangulation of a stroke and rasterizing the stroke based on the triangulation.

32. The apparatus of claim 31, wherein the means for drawing the bounding box comprises means for drawing the bounding box of the path segment using a fill color.

33. The apparatus of claim 31, wherein the path segment is rendered without using a central processing unit (CPU).

34. The apparatus of claim 31, wherein the plurality of primitives comprises a plurality of line segments.

35. A non-transitory computer readable storage medium storing instructions that upon execution by one or more processors cause the one or more processors to:
   receive data indicative of a path segment of a path to be rendered; and
   render the path segment, wherein the instructions that cause the one or more processors to render comprise instructions that cause the one or more processors to fill the path segment and stroke the path segment, wherein the instructions that cause the one or more processors to fill the path segment comprise instructions that cause the one or more processors to:
      tessellate the path segment into a first plurality of primitives including a triangle per primitive,
      store the first plurality of primitives in a stencil buffer, and
      draw a bounding box of the path segment and render the bounding box with a stencil test enabled for the first plurality of primitives stored in the stencil buffer; and
   wherein the instructions that cause the one or more processors to stroke the path segment comprises instructions that cause the one or more processors to:
      tessellate the path into a second plurality of primitives,
      determine that a difference in angles between at least two normals in the second plurality of primitives is wider than a maximum angular deviation threshold,
      in response to determining that the difference in angles between the at least two normal in the second plurality of primitives is wider than the maximum angular deviation threshold, re-tessellate the second plurality of primitives,
      cut the second plurality of primitives according to a dash pattern,
      create a cap at a location of a cut, and
      create a triangulation of a stroke and rasterizing the stroke based on the triangulation.

36. The non-transitory computer readable storage medium of claim 35, wherein the instructions that cause the one or more processors to draw the bounding box comprise instructions that cause the one or more processors to draw the bounding box of the path segment using a fill color.

37. The non-transitory computer readable storage medium of claim 35, wherein the path segment is rendered without using a central processing unit (CPU).

38. The non-transitory computer readable storage medium of claim 35, wherein the plurality of primitives comprises a plurality of line segments.

39. The non-transitory computer readable storage medium of claim 35, wherein the data indicative of the path segment comprises one of a line, an elliptic arc, a quadratic Bezier curve and a cubic Bezier curve.

40. The non-transitory computer readable storage medium of claim 35, wherein the instructions, upon execution by the one or more processors cause the one or more processors to determine how a graphical shape including the path segment and having more than one closed outline will be filled based on an odd-even rule.

* * * * *